US008516300B2

(12) United States Patent
Mangione-Smith

(10) Patent No.: US 8,516,300 B2
(45) Date of Patent: *Aug. 20, 2013

(54) MULTI-VOTAGE SYNCHRONOUS SYSTEMS

(75) Inventor: William Henry Mangione-Smith, Kirkland, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/321,027

(22) Filed: Jan. 13, 2009

(65) Prior Publication Data

US 2009/0150713 A1    Jun. 11, 2009

Related U.S. Application Data

(63) Continuation-in-part of application No. 11/384,237, filed on Mar. 17, 2006, now Pat. No. 7,512,842, and a continuation-in-part of application No. 11/384,236, filed on Mar. 17, 2006, now Pat. No. 7,653,834, and a continuation-in-part of application No. 11/364,130, filed on Feb. 28, 2006, now Pat. No. 7,493,516, and a continuation-in-part of application No. 11/364,573, filed on Feb. 28, 2006, now Pat. No. 7,607,042, and a continuation-in-part of application No. 11/364,131, filed on Feb. 28, 2006, and a continuation-in-part of application No. 11/343,927, filed on Jan. 31, 2006, now Pat. No. 8,214,191, and a continuation-in-part of application No. 11/343,745, filed on Jan. 31, 2006, and a continuation-in-part of application No. 11/324,174, filed on Dec. 30, 2005, and a continuation-in-part of application No. 11/291,503, filed on Nov. 30, 2005, and a continuation-in-part of application No. 11/292,207, filed on Nov. 30, 2005, and a continuation-in-part of application No. 11/292,296, filed on Nov. 30, 2005, and a continuation-in-part of application No. 11/292,323, filed on Nov. 30, 2005, now abandoned, and a continuation-in-part of application No. 11/214,449, filed on Aug. 29, 2005, now Pat. No. 7,539,852, and a continuation-in-part of application No. 11/214,458, filed on Aug. 29, 2005, now Pat. No. 7,774,558, and a continuation-in-part of application No. 11/214,459, filed on Aug. 29, 2005, now Pat. No. 7,877,584.

(51) Int. Cl.
*G06F 11/00* (2006.01)
(52) U.S. Cl.
USPC .......................................................... 714/14
(58) Field of Classification Search
USPC ............. 714/10, 2, 25, 37, 38.1, 14; 713/300
See application file for complete search history.

(56) References Cited

U.S. PATENT DOCUMENTS 4,484,275 A    11/1984    Katzman et al.
4,639,864 A    1/1987    Katzman et al.

(Continued)

OTHER PUBLICATIONS

U.S. Appl. No. 12/319,696, Ferren et al.

(Continued)

*Primary Examiner* — Yair Leibovich

(57) ABSTRACT

Embodiments include a system, a device, and a method. A computing system includes a synchronous circuit. The synchronous circuit includes a first subcircuit powered by a first power plane having a first power plane voltage and a second subcircuit powered by a second power plane having a second power plane voltage. The system also includes an error detector operable to detect an incidence of a computational error occurring in the first subcircuit. The system further includes a controller operable to change the first power plane voltage based upon the detected incidence of a computational error. The system may include a power supply operable to provide a selected one of at least two voltages to the first power plane in response to the controller.

45 Claims, 59 Drawing Sheets

(56) References Cited

U.S. PATENT DOCUMENTS

| | | | |
|---|---|---|---|
| 4,654,819 A | 3/1987 | Stiffler et al. | |
| 4,672,537 A | 6/1987 | Katzman et al. | |
| 4,751,639 A | 6/1988 | Corcoran et al. | |
| 4,763,244 A | 8/1988 | Moyer et al. | |
| 4,800,489 A | 1/1989 | Moyer et al. | |
| 4,807,116 A | 2/1989 | Katzman et al. | |
| 4,817,091 A | 3/1989 | Katzman et al. | |
| 4,819,154 A | 4/1989 | Stiffler et al. | |
| 4,847,755 A | 7/1989 | Morrison et al. | |
| 4,891,787 A | 1/1990 | Gifford | |
| 5,084,891 A | 1/1992 | Ariyavisitakul et al. | |
| 5,212,777 A | 5/1993 | Gove et al. | |
| 5,475,856 A | 12/1995 | Kogge | |
| 5,526,313 A * | 6/1996 | Etoh et al. | 365/205 |
| 5,535,405 A | 7/1996 | Byers et al. | |
| 5,691,870 A * | 11/1997 | Gebara | 361/86 |
| 5,764,953 A | 6/1998 | Collins et al. | |
| 5,768,551 A | 6/1998 | Bleiweiss et al. | |
| 5,774,736 A * | 6/1998 | Wright et al. | 713/330 |
| 5,966,528 A | 10/1999 | Wilkinson et al. | |
| 6,021,489 A | 2/2000 | Poplingher | |
| 6,052,773 A | 4/2000 | DeHon et al. | |
| 6,098,030 A | 8/2000 | McMinn | |
| 6,199,095 B1 | 3/2001 | Robinson | |
| 6,205,537 B1 | 3/2001 | Albonesi | |
| 6,216,236 B1 | 4/2001 | Miyao et al. | |
| 6,247,118 B1 | 6/2001 | Zumkehr et al. | |
| 6,324,643 B1 | 11/2001 | Krishnan et al. | |
| 6,347,341 B1 | 2/2002 | Glassen et al. | |
| 6,374,349 B1 | 4/2002 | McFarling | |
| 6,427,206 B1 | 7/2002 | Yeh et al. | |
| 6,496,056 B1 | 12/2002 | Shoji | |
| 6,519,654 B1 | 2/2003 | Fang et al. | |
| 6,571,373 B1 | 5/2003 | Devins et al. | |
| 6,625,750 B1 | 9/2003 | Duso et al. | |
| 6,763,452 B1 | 7/2004 | Hohensee et al. | |
| 6,766,419 B1 | 7/2004 | Zahir et al. | |
| 6,772,356 B1 * | 8/2004 | Qureshi et al. | 713/321 |
| 6,877,084 B1 | 4/2005 | Christie | |
| 6,924,790 B1 | 8/2005 | Bi | |
| 6,954,845 B2 | 10/2005 | Arnold et al. | |
| 6,954,923 B1 | 10/2005 | Yates, Jr. et al. | |
| 6,959,372 B1 | 10/2005 | Hobson et al. | |
| 7,093,147 B2 | 8/2006 | Farkas et al. | |
| 7,526,674 B2 | 4/2009 | Bailey et al. | |
| 7,774,671 B2 | 8/2010 | Dempsey | |
| 7,886,164 B1 | 2/2011 | Alben et al. | |
| 8,020,038 B2 | 9/2011 | Riedlinger et al. | |
| 2001/0011346 A1 | 8/2001 | Yoshimi | |
| 2001/0020267 A1 | 9/2001 | Koino | |
| 2001/0021974 A1 | 9/2001 | Lee | |
| 2001/0025338 A1 | 9/2001 | Zumkehr et al. | |
| 2001/0032309 A1 | 10/2001 | Henry et al. | |
| 2001/0047467 A1 | 11/2001 | Yeh et al. | |
| 2002/0032718 A1 | 3/2002 | Yates et al. | |
| 2002/0059054 A1 | 5/2002 | Bade et al. | |
| 2002/0087828 A1 | 7/2002 | Armilli et al. | |
| 2002/0095666 A1 | 7/2002 | Tabata et al. | |
| 2002/0112227 A1 | 8/2002 | Kramskoy et al. | |
| 2002/0124196 A1 | 9/2002 | Morrow et al. | |
| 2002/0144247 A1 | 10/2002 | Tirumalai et al. | |
| 2002/0184385 A1 | 12/2002 | Kato | |
| 2003/0005265 A1 | 1/2003 | Barowski et al. | |
| 2003/0005419 A1 | 1/2003 | Pieper et al. | |
| 2003/0074649 A1 | 4/2003 | Poulsen et al. | |
| 2003/0079113 A1 | 4/2003 | Nguyen et al. | |
| 2003/0101443 A1 | 5/2003 | Kosche et al. | |
| 2003/0135771 A1 | 7/2003 | Cupps et al. | |
| 2003/0200537 A1 | 10/2003 | Barsness et al. | |
| 2003/0200539 A1 | 10/2003 | Fu et al. | |
| 2004/0003309 A1 | 1/2004 | Cai et al. | |
| 2004/0073894 A1 | 4/2004 | Chen et al. | |
| 2004/0073899 A1 | 4/2004 | Luk et al. | |
| 2004/0093591 A1 | 5/2004 | Kalogeropulos et al. | |
| 2004/0103410 A1 | 5/2004 | Sakai | |
| 2004/0153749 A1 | 8/2004 | Schwarm et al. | |
| 2004/0174944 A1 | 9/2004 | Uht | |
| 2004/0225871 A1 | 11/2004 | Irie et al. | |
| 2005/0005203 A1 | 1/2005 | Czajkowski | |
| 2005/0066153 A1 | 3/2005 | Sharangpani et al. | |
| 2005/0086650 A1 | 4/2005 | Yates, Jr. et al. | |
| 2005/0093607 A1 | 5/2005 | Marshall et al. | |
| 2005/0132238 A1 * | 6/2005 | Nanja | 713/300 |
| 2005/0138478 A1 | 6/2005 | Safford et al. | |
| 2005/0149915 A1 | 7/2005 | Wu et al. | |
| 2005/0155026 A1 | 7/2005 | DeWitt et al. | |
| 2005/0240814 A1 | 10/2005 | Sasakura et al. | |
| 2005/0246613 A1 | 11/2005 | Blaauw et al. | |
| 2005/0278520 A1 | 12/2005 | Hirai et al. | |
| 2006/0020838 A1 | 1/2006 | Tschanz et al. | |
| 2006/0020852 A1 | 1/2006 | Bernick et al. | |
| 2006/0026543 A1 | 2/2006 | Jayaraman et al. | |
| 2006/0101303 A1 | 5/2006 | Bower, III et al. | |
| 2006/0181857 A1 | 8/2006 | Belady et al. | |
| 2006/0202713 A1 | 9/2006 | Shumarayev | |
| 2006/0202714 A1 | 9/2006 | Hoang et al. | |
| 2006/0206882 A1 | 9/2006 | Illowsky et al. | |
| 2006/0212753 A1 | 9/2006 | Sato | |
| 2007/0006178 A1 | 1/2007 | Tan | |
| 2007/0050556 A1 | 3/2007 | Ferren et al. | |
| 2007/0050557 A1 | 3/2007 | Ferren et al. | |
| 2007/0050558 A1 | 3/2007 | Ferren et al. | |
| 2007/0050581 A1 | 3/2007 | Mangione-Smith | |
| 2007/0050604 A1 | 3/2007 | Ferren et al. | |
| 2007/0050605 A1 | 3/2007 | Ferren et al. | |
| 2007/0050606 A1 | 3/2007 | Ferren et al. | |
| 2007/0050607 A1 | 3/2007 | Ferren et al. | |
| 2007/0050608 A1 | 3/2007 | Ferren et al. | |
| 2007/0050609 A1 | 3/2007 | Ferren et al. | |
| 2007/0050659 A1 | 3/2007 | Ferren et al. | |
| 2007/0050660 A1 | 3/2007 | Ferren et al. | |
| 2007/0050661 A1 | 3/2007 | Ferren et al. | |
| 2007/0050672 A1 | 3/2007 | Mangione-Smith | |
| 2007/0055848 A1 | 3/2007 | Ferren et al. | |
| 2007/0067611 A1 | 3/2007 | Ferren et al. | |
| 2007/0074173 A1 | 3/2007 | Ferren et al. | |
| 2007/0255992 A1 * | 11/2007 | Sasagawa | 714/736 |
| 2009/0115468 A1 * | 5/2009 | Berthold et al. | 327/141 |
| 2009/0138737 A1 * | 5/2009 | Kim et al. | 713/322 |
| 2010/0058107 A1 | 3/2010 | Blaauw et al. | |

OTHER PUBLICATIONS

U.S. Appl. No. 12/454,633, Ferren et al.
U.S. Appl. No. 11/541,473, Ferren et al.
U.S. Appl. No. 11/541,450, Ferren et al.
U.S. Appl. No. 11/540,910, Ferren et al.
U.S. Appl. No. 11/526,190, Ferren et al.
U.S. Appl. No. 11/526,145, Ferren et al.
U.S. Appl. No. 11/364,573, Ferren et al.
U.S. Appl. No. 11/364,133, Ferren et al.
U.S. Appl. No. 11/364,130, Ferren et al.
U.S. Appl. No. 11/343,927, Ferren et al.
U.S. Appl. No. 11/343,745, Ferren et al.
U.S. Appl. No. 11/324,174, Ferren et al.
U.S. Appl. No. 11/292,323, Ferren et al.
U.S. Appl. No. 11/292,296, Ferren et al.
U.S. Appl. No. 11/292,207, Ferren et al.
U.S. Appl. No. 11/291,503, Ferren et al.
U.S. Appl. No. 11/214,459, Ferren et al.
U.S. Appl. No. 11/214,458, Ferren et al.
U.S. Appl. No. 11/214,449, Ferren et al.
U.S. Appl. No. 11/384,237, Ferren et al.
Albonesi, David H., "Dynamic IPC/Clock Rate Optimization", 1998, pp. 282-292, 25th International Symposium on Computer Architecture, IEEE Computer Society.
Austin, Todd; "DIVA: A Reliable substrate for Deep Submicron Microarchitecture Design"; Advanced Computer Architecture Lab; pp. 1-12; University of Michigan; located at http://huron.cs.ucdavis.edu/Micro32/presentations/p_austin.pdf; printed on Feb. 6, 2006.
Austin, Todd; "DIVA: A Reliable substrate for Deep Submicron Microarchitecture Design"; ACM Portal; Bearing dates of 1999 and 2006; pp. 1-6; Association for Computing Machinery; located at http://portal.acm.org/citation.cfm?id=320111; printed on Feb. 6, 2006.

Bala, Vasanth; Duesterwald, Evelyn; Banerjia, Sanjeev; "Dynamo: A Transparent Dynamic Optimization System"; Hewlett-Packard Labs; Bearing a date of 2000, printed on Nov. 10, 2005; pp. 1-12; ACM; Vancouver, Canada.

Balasubramanian, Rajeev; Albonesi, David; Buyuktosunoglu, Alper; Dwarkadas, Sandhya, "Dynamic Memory Hierarchy Performance Optimization", 2000, pp. 1-11, IEEE.

Balasubramanian, Rajeev; Albonesi, David; Buyuktosunoglu, Alper; Dwarkadas, Sandhya, "Memory Hierarchy Reconfiguration for Energy and Performance in General-Purpose Processor Architectures", 2000, pp. 1- 13, IEEE.

"Bayes' theorem"; Facts, Info and Encyclopedia article; pp. 1-6; located at: http://absoluteastronomy.com/encyclopedia/b/ba/bayes_theorem1.htm; printed on Aug. 27, 2005.

"Bayes' theorem"; Wikipedia, the free encyclopedia; pp. 1-6; located at: http://en.wikipedia.org/wiki/Bayes_theorem; printed on Aug. 27, 2005.

"Bayesian inference"; Wikipedia, the free encyclopedia; pp. 1-9; located at: http://en.wikipedia.org/wiki/Bayesian_inference#Evidence_and_the_scientific method; printed on Aug. 27, 2005.

"Bayesian logic"; a Whatis.com definition; p. 1; located at: http://whatis.techtarget.com/definition/0,,sid9_gci548993,00.html; printed on Aug. 19, 2005.

"Bayesian probability"; Wikipedia, the free encyclopedia; pp. 1-4; located at: http://en.wikipedia.org/wiki/Bayesianism; printed on Aug. 27, 2005.

Calder, Brad; Grunwald, Dirk; Lindsay, Donald; Martin, James; Mozer, Michael; Zorn, Benjamin; "Corpus-based Static Branch Prediction"; pp. 1-14; located at: http://www.cse.ucsd.edu/~calder/papers/PLDI95-ESP.pdf.

Chang, Po-Yung et al.; "Branch Classification: a New Mechanism for Improving Branch Prediction Performance"; International Journal of Parallel Programming; 1994; pp. 22-31; Ann Arbor, USA.

Chatterjee, Saugata; Weaver, Chris; Austin, Todd; "Efficient Checker Processor Design"; pp. 1-11; University of Michigan; located at http://www.eecs.umich.edu/~taustin/papers/MICRO33-divadesign.pdf; printed on Feb. 6, 2006.

"Cisco 12000 Single Event Upset Failures Overview and Work Around Summary"; Cisco Systems; Bearing dates of Aug. 15, 2003, Dec. 13, 2004, and 1992-2005; pp. 1-2; printed on Feb. 17, 2006; located at http://www.cisco.com/en/US/products/hw/routers/ps167/products_field_notice09186a00801b3df8.shtml.

Conte, Thomas M.; Sathaye, Sumedh W.; Banerjia, Sanjeev; "A Persistent Rescheduled-Page Cache for Low Overhead Object Code Compatibility in VLIW Architectures"; Bearing a date of 1996, printed on Nov. 10, 2005; pp. 4-13; IEEE.

"Core Plane Voltage"; The PC Guide; bearing dates of Apr. 17, 2001 and 1997-2004; pp. 1; located at http://www.pcguide.com/ref/mbsys/bios/set/cpuCore-c.html; printed on Mar. 1, 2006.

"Cosmic ray"; Wikipedia, the free encyclopedia; Bearing a date of Feb. 9, 2006; pp. 1-3; printed on Feb. 17, 2006; located at http://en.wikipedia.org/wiki/Cosmic_ray.

"CPU Power Plane"; The PC Guide; bearing dates of Apr. 17, 2001 and 1997-2004; pp. 1; located at http://www.pcguide.com/ref/mbsys/bios/set/cpuPower-c.html; printed on Mar. 1, 2006.

Dehnert, James C.; Grant, Brian K.; Banning, John P.; Johnson, Richard; Kistler, Thomas; Klaiber, Alexander; Mattson, Jim; "The Transmeta Code Morphing™ Software: Using Speculation, Recovery, and Adaptive Retranslation to Address Real-Life Challenges"; Proceedings of the First Annual IEEE/ACM International Symposium on Code Generation and Optimization, Mar. 27-29, 2003, San Francisco, California; Bearing a date of 2003, printed on Nov. 10, 2005; pp. 1-10; IEEE.

Ernst, Dan; Kim, Nam Sung; Das, Shidhartha; Pant, Sanjay; Pham, Toan; Rao, Rajeev; Ziesler, Conrad; Blaauw, David; Austin, Todd; Mudge, Trevor; Flautner, Krisztian; "Razor: A Low-Power Pipeline Based on Circuit-Level Timing Speculation"; Abstract; Bearing a date of Jun. 6, 2003; pp. 1-23; located at http://www.gigascale.org/pubs/426/razor.submit.authors.pdf; printed on Jul. 7, 2006.

Evers, Marius; Chang, Po-Yung; Patt, Yale N.; "Using Hybrid Branch Predictors to Improve Branch Prediction Accuracy in the Presence of Context Switches"; 1996; pp. 3-11; Proceedings of the 23$^{rd}$ annual international symposium on computer architecture; ACM Press.

"Exception Handling"; Wikipedia the Free Encyclopedia; Bearing a date of Nov. 2, 2005, printed on Nov. 3, 2005; pp. 1-8; located at http://en.wikipedia.org/wiki/Exception_handling.

Fisher, Joseph A.; "Walk-Time Techniques: Catalyst for Architectural Change"; Computer; Bearing dates of Sep. 1997 and 1997, printed on Nov. 10, 2005; pp. 40-42; IEEE.

Georgi, Shirley; "The 41$^{st}$ Power Sources Conference a Challenge to Create Portable Power Sources for a Victorious Military"; pp. 1-4; located at http://www.batteriesdigest.com/power_sources_military.htm; printed on Mar. 15, 2006.

Gomez, Faustino J.; Burger, Doug; Miikkulainen, Risto; "A Neuroevolution Method for Dynamic Resource Allocation on a Chip Multiprocessor"; bearing a date of 2001; pp. 1-6; printed on Aug. 25, 2005.

Gummaraju et al.; "Branch Prediction in Multi-Threaded Processors"; 2000; pp. 179-188; IEEE.

Harris, Tim; Marlow, Simon; Jones, Simon Peyton; Herlihy, Maurice; "Composable Memory Transactions"; PPoPP'05; Bearing dates of Jun. 15-17, 2005 and 2005, printed on Oct. 6, 2005; pp. 1-13; Chicago, Illinois; ACM.

Hazelwood, Kim; Smith, Michael D.; "Characterizing Inter-Execution and Inter-Application Optimization Persistence"; printed on Jan. 30, 2006; pp. 1-8; Harvard University; located at www.cs.virginia.edu/kim/docs/traces.pdf.

"Infrastructure for Profile Driven Optimizations"; GNU Project; Bearing dates of Aug. 29, 2001 and Jul. 11, 2005, printed on Nov. 9, 2005; pp. 1-4; Free Software Foundation, Inc.; located at http://gcc.gnu.org/news/profiledriven.html.

Jacobsen, Erik; Rotenberg, Eric; Smith, J. E.; "Assigning Confidence to Conditional Branch Predictions"; Proceedings of the 29$^{th}$ Annual International Symposium on Microarchitecture; pp. 1-12; bearing a date of Dec. 2-4, 1996, Paris, France; IEEE; USA.

Juan, Toni; Sanjeevan, Sanji; Navarro, Juan J., "Dynamic History-Length Fitting: A Third Level of Adaptivity for Branch Prediction", bearing a date of 1998, pp. 155-166, IEEE.

Kaeli, David; "Profile-guided Instruction and Data Memory Layout"; pp. 1-12; located at: http://www.ece.neu.edu/info/architecture/publications/Tufts.pdf; printed on Dec. 12, 2005.

Klauser, Artur; Paithankar, Abhijit; Grunwald, Dirk; "Selective Eager Execution on the PolyPath Architecture"; pp. 1-10; University of Colorado, Department of Computer Science, Boulder, Colorado; bearing a date of Jul. 1998; IEEE; ISCA.

Knies, Rob; "Concurrent Programming Enters Atomic Age"; Microsoft Research News and Highlights; Bearing a date of 2005, printed on Oct. 6, 2005; pp. 1-3; Microsoft Corporation; located at http://research.microsoft.com/displayArticle.aspx?id=1313.

Kundu, Partha, et al.; "A Case for Shared Instruction Cache on Chip Multiprocessors running OLTP"; ACM SIGARCH Computer Architecture News; Jun. 2004; pp. 11.

Lount, Peter William; "Dynamic Runtime Type-Object-Class Inference"; Smalltalk.org™; Bearing dates of Nov. 23, 2005 and 2004, printed on Nov. 23, 2005; pp. 1-3; version 1, Sep. 14, 2005; located at http://www.smalltalk.org/articles/article_20050914_a2_Dynamic_Type-Object-Class_Inference.html.

Machanick, Philip; "Macintelligence: Instruction Basics"; MacOPINION Bearing a date of Jul. 3, 2001, printed on Nov. 16, 2005; pp. 2-6; located at http://www.macopinion.com/columns/intelligence/01/07/03/.

McFarling, Scott; "Combining Branch Predictors"; WRL Technical Note TN-36; Jun. 1993; pp. 1-29; located at: http://www.hpl.hp.com/techreports/Compaq-DEC/WRL-TN-36.pdf; printed on Aug. 30, 2005.

Mitra et al.; "Robust System Design from Unreliable Components"; 2005 Penn State University; retrieved Sep. 17, 2007; pp. 1-252; located at http://www.cse.psu.edu/~yuanxie/isca05.pdf.

Moore, Charles W.; "The PowerBook Mystique Laptop Batteries, and Why the Portable Power Source Future May Be Something Other (Plus Mailbag)"; PowerBookCentral.com; bearing dates of 1996-

2006; pp. 1-10; Macmarkets; located at http://powerbookcentral.com/columns/hildreth_moore/batt.shtml; printed on Mar. 15, 2006.

Nair et al.; "Exploiting Instruction Level Parallelism in Processors by Caching Scheduled Groups"; May 1997; pp. 13-25.

Patel, Sanjay J., Lumetta, Steven S.; "rePlay: A Hardware Framework for Dynamic Optimization"; bearing a date of Jun. 2001; pp. 590-607; IEEE Transactions on Computers; vol. 50, No. 6; IEEE.

PCT International Search Report; International App. No. PCT/US07/02296; May 21, 2008; pp. 1-3.

"Performance and Tuning: Basics"; Sybase; Adaptive Server Enterprise; Bearing dates of Aug. 2003, and 1989-2003; pp. 40-43 (6 pages total); 12.5.1; printed on Mar. 22, 2006.

"Performance Management Guide: Performance Overview of the Virtual Memory Manager (VMM)"; printed on Nov. 1, 2005; pp. 1-11; located at http://publibn.boulder.ibm.com/doc_link/en_US/a_doc_lib/aixbman/prftungd/2365c22.htm.

"Profile-Based Optimization: HP C Programmer's Guide"; HP 3000 Manuals; printed on Nov. 9, 2005; pp. 1-4; located at http://docs.hp.com/cgi-bin/doc3k/B9243490008.113256/29.

Rotenberg, Eric et al.; "Trace Cache: a Low Latency Approach to High Bandwidth Instruction Fetching"; International Symposium on Microarchitecture; 1996; pp. 24-34; IEEE.

Sato, Toshinori; "Data Dependence Speculation Using Data Address Prediction and its Enhancement with Instruction Reissue"; $24^{th}$ EUROMICRO Conference; Bearing a date of 1998; pp. 1-2 (pp. 10285); vol. 1; IEEE, Inc.; located at: http://csdl2.computer.org/persagen/DLAbsToc.jsp?resourcePath=/dl/proceedings/&toc=comp/proceedings/euromicro/1998/8646/01/8646toc.xml&DOI=10.1109/EURMIC.1998.711812; printed on Dec. 8, 2005.

"Semantics of the TASK_REGION Construct"; bearing a date of Feb. 10, 2006; printed on Mar. 22, 2006; p. 1; Google.com; located at http://72.14.203.104/search?q=cache:mpmaTDSemccJ:dacnet.rice.edu/Depts/versions/.

Shen et al.; "Modern Processor Design: Fundamentals of Superscalar Processors"; 2002; McGraw Hill; Beta Edition; p. 423 (3 pages included).

Sites, Richard L.; Chernoff, Anton; Kirk, Matthew B.; Marks, Maurice P.; Robinson, Scott G.; "Binary Translation"; Communications of the ACM; Bearing a date of Feb. 1993, printed on Nov. 10, 2005; pp. 69-81; vol. 36, No. 2; ACM.

Sodani, Avinash et al.; "Dynamic Instruction Reuse"; ISCA; Jun. 1997; pp. 112; ACM Press.

"Speculative Execution"; Wikipedia the Free Encyclopedia; Bearing a date of Aug. 3, 2005, printed on Oct. 7, 2005; pp. 1-1; located at http://en.wikipedia.org/wiki/Speculative_execution.

Storkey, Amos; Amos Storkey-Research-Belief Networks; "Tutorial: Introduction to Belief Networks"; 2000-2005; pp. 1-8; located at: 1A3://ww.anc.ed.ac.uk/~amos/belief.html; printed on Aug. 27, 2005.

Suh et al.; "Dynamic Partitioning of Shared Cache Memory"; 2002; pp. 1-23; MIT.

Uht, Augustus K.; "TEAtime: Timing Error Avoidance for Performance Enhancement and Environment Adaptation"; URI Road Show, Spring 2003; pp. 1-22; located at www.ele.uri.edu/~uht/talks/TEAtimeroadshow2003.Dist.pdf; printed on Mar. 2, 2006.

Uht, Augustus K.; "Uniprocessor Performance Enhancement Through Adaptive Clock Frequency Control"; SSGRR 2003w Conference; pp. 1-10; located at http://www.ele.uri.edu/~uht/papers/SSGRR2003wFnlUht.pdf; printed on Feb. 6, 2006.

Uht, Augustus; Vaccaro, Rick; "TEAPC: Adaptive Computing and Underclocking in a Real PC"; MuRI Technical Report No. 20041027-1; Oct. 27, 2004; pp. 1-13; located at http://www.ele.uri.edu/~uht/papers/MuRI-TR-20041027.pdf; printed on Feb. 6, 2006.

Uht, Gus; Vaccaro, Rick; "Adaptive Computing ( . . . via Timing Error Avoidance)"; bearing dates of Jan. 21, 2005 and 2003-5; pp. 1-24; located at http://www.lems.brown.edu/~iris/BARC2005/Webpage/BARCpresentations/uht.pdf; printed on Feb. 6, 2006.

Veidenbaum, Alexander V.; Tang, Weiyu; Gupta, Rajesh; Nicolau, Alexandru; Ji, Xiaomei, "Adapting Cache Line Size to Application Behavior", 1999, pp. 145-154, $13^{th}$ International Conference on Supercomputing, ACM Press.

Wu, Youfeng; Larus, James R.; "Static Branch Frequency and Program Profile Analysis," pp. 1-11; bearing dates of Nov. 1994 and 1994; located at: http://citeseer.ist.psu.edu/cache/papers/cs/1353/ftp:zSzzSzftp.cs.wisc.eduzSztech-reportszSzreportszSz94zSztr1248.pdf/wu94static.pdf; printed on Aug. 25, 2005.

Yacktman, Don; "Freeze Dried Objects"; Stepwise.com; Bearing dates of Jun. 27, 2005 and 1994-2000; pp. 1-2; located at: http://www.stepwise.com/Articles/Technical/FreezeDriedObjects.html; printed on Dec. 15, 2005.

Zhang, Lixin; McKee, Sally A.; Hsieh, Wilson C.; Carter, John B.; "Pointer-Based Prefetching within the Impulse Adaptable Memory Controller: Initial Results"; pp. 1-11; located at: http://www.cs.utah.edu/impulse/papers/isca00ws.pdf; printed on Dec. 7, 2005.

Razdan et al.; "A High-Performance Microarchitecture with Hardware-Programmable Functional Units"; Bearing a date of 1994; pp. 172-180; Association of Computing Machinery (ACM); San Jose, CA.

U.S. Appl. No. 12/657,285, Mangione-Smith, William Henry.

Akkary et al.; "Checkpoint Processing and Recovery: Towards Scalable Large Instruction Window Processors"; Proceedings of the $36^{th}$ International Symposium on Microarchitecture (MICRO-36 2003); bearing a date of 2003; pp. 1-12; © 2003 IEEE.

Berg et al.; "SIP: Performance Tuning Through Source Code Interdependence"; Euro-Par 2002; bearing a date of 2002; pp. 177-186; Springer-Verlag Berlin Heidelberg 2002.

Mehta et al.; "Data placement in shared-nothing parallel database systems*"; The VLDB Journal (1997); bearing a date of 1997; pp. 53-72; vol. 6; © Springer-Verlag.

Pflanz, M.; "Fast Processor Recover Techniques with Micro Rollback"; On-line Error Detection and Fast Recover Techniques; bearing a date of 2002; pp. 65-80; © Springer-Verlag Berlin Heidelberg 2002.

Pflanz et al.; "Online Check and Recovery Techniques for Dependable Embedded Processors"; IEEE; bearing a date of 2001; pp. 24-40; © 2001 IEEE.

Berg et al.; "SIP: Performance Tuning through Source Code Interdependence"; Euro-Par 2002, LNCS 2400; bearing a date of 2002; pp. 177-186; © Springer-Verlag Berlin Heidelberg 2002.

Mano, M. Morris; "Computer System Architecture, Third Edition"; bearing a date of 1993; pp. 489-491; Prentice Hall, Inc., A Paramount Communications Company; Englewood Cliffs, New Jersey.

PCT International Search Report; International App. No. PCT/US07/02298; Jan. 16, 2009; pp. 1-3.

PCT International Search Report; International App. No. PCT/US2007/001905; Jan. 16, 2009; pp. 1-2.

Balasubramonian, Rajeev, et al.; "Memory Hierarchy Reconfiguration for Energy and Performance in General-Purpose Processor Architectures"; IEEE; 2000; pp. 1-13; IEEE.

Juan, Toni, et al.; "Dynamic History-Length Fitting: A third level of adaptivity for branch prediction"; IEEE; 1998; pp. 1-12.

Patel, Sanjay J., et al.; "rePLay: A Hardware Framework for Dynamic Program Optimization"; CRHC Technical Report; Dec. 1999; pp. 1-26; #CRHC-99-16; The University of Illinois.

Uht, Gus, et al.; "Adaptive Computing ( . . . via Timing Error Avoidance)"; Jan. 21, 2005; pp. 1-24; A.K. Uht, R.J. Vaccaro; URI Microarchitecture Research Institute, University of Rhode Island; Kingston, RI.

Uht, Gus, et al.; "TEAPC: Adaptive Computing and Underclocking in a Real PC"; MuRI Technical Report No. 20041027-1; Oct. 27, 2004; pp. 1-13; A.K. Uht, R.J. Vaccaro; URI Microarchitecture Research Institute, University of Rhode Island; Kingston, RI.

Uht, Augustus K.; "Uniprocessor Performance Enhancement through Adaptive Clock Frequency Control"; IEEE Transactions on Computers; Feb. 2005; pp. 132-140; vol. 54; No. 2; IEEE Computer Society.

Ernst et al.; "Razor: A Low-Power Pipeline Based on Circuit-Level Timing Speculation"; Proceedings of the 36$^{th}$ International Symposium on Microarchitecutre (MICRO-36'03); 2003; pp. 1-12; IEEE Computer Society.

U.S. Appl. No. 12/806,395, Bran Ferren et al.

Mano, M. Morris; "Computer System Architecture"; bearing a date of 1993; pp. 489-491 (4 pages, including cover page); Third Edition; Prentice Hall, Inc., A Paramount Communications Company; Englewood Cliffs, New Jersey.

Hodgdon, David; "Efficient, Compiler-Aided Dynamic Optimization"; bearing a date of Nov. 2, 2004; pp. 1-10.

* cited by examiner

FIG. 43

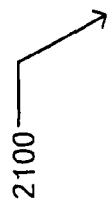

2110 Means for detecting an incidence of a processor-operating-parameter-caused error corresponding to an execution of an instruction of the sequence of instructions by a processor subsystem having an adjustable operating parameter.

2120 Means for changing the adjustable processor operating parameter based upon an error-tolerant performance criterion.

2130 Means for restoring an execution of the sequence of program instructions to a checkpoint based upon the detected processor-operating-parameter-caused error.

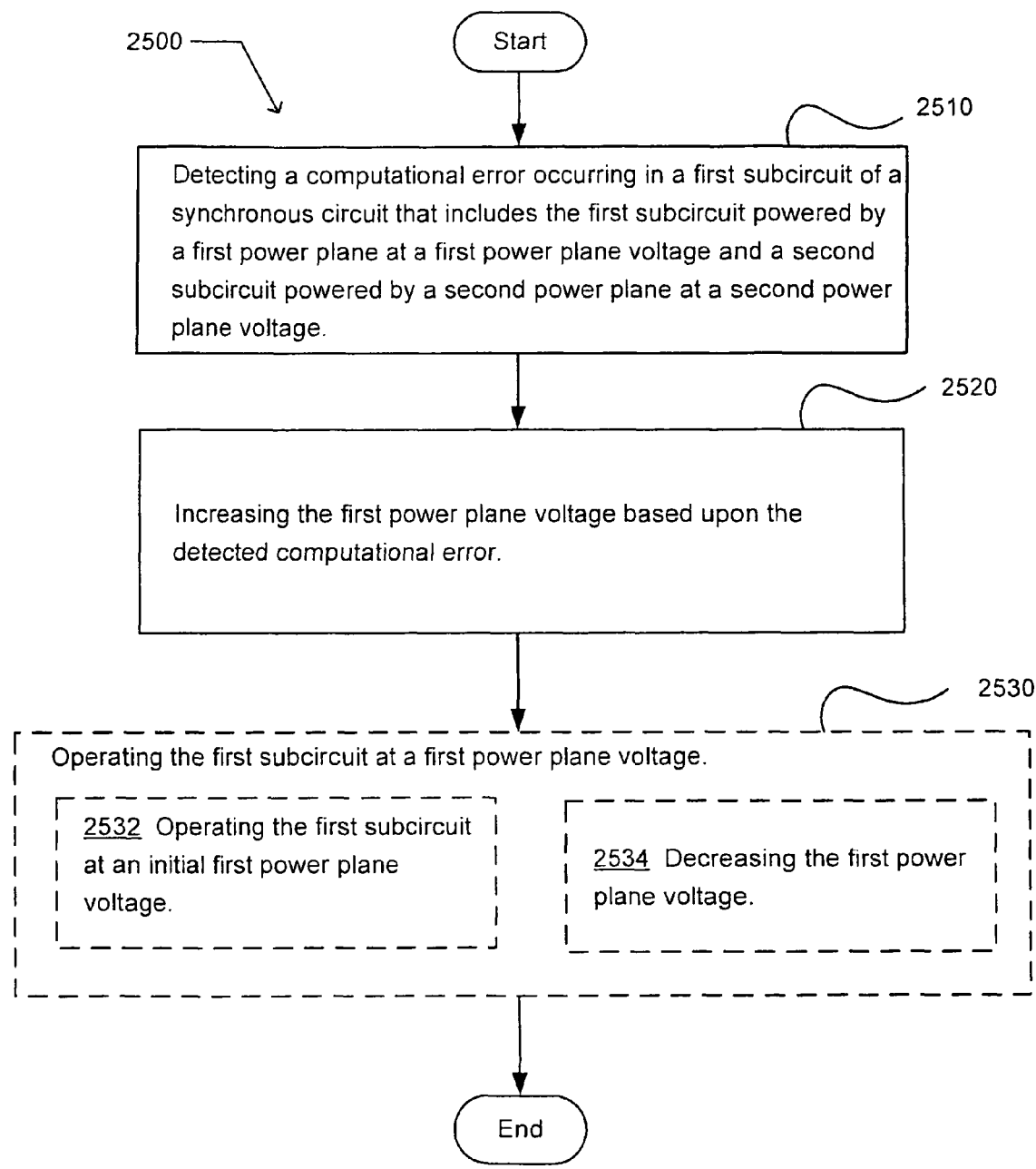

2560 Means for detecting a computational error occurring in a first subcircuit of a synchronous circuit that includes the first subcircuit powered by a first power plane at a first power plane voltage and a second subcircuit powered by a second power plane at a second power plane voltage 2570 Means for increasing the first power plane voltage based upon the detected computational error.

2580 Means for operating the first subcircuit at an initial first power plane voltage.

2590 Means for decreasing the first power plane voltage.

FIG. 59

2910 Means for decreasing a voltage received at a first power plane from a power supply that includes a portable energy source, the first power plane being a component of a synchronous circuit that includes a first subcircuit powered by the first power plane and a second subcircuit powered by a second power plane having a second power plane voltage.

2920 Means for detecting an incidence of a computational error occurring in the first subcircuit.

2930 Means for increasing in response to the detected computational error the voltage received at the first power plane from the power supply that includes a portable energy source.

2900

MULTI-VOTAGE SYNCHRONOUS SYSTEMS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/384,237, now U.S. Pat. No. 7,512,842 entitled MULTI-VOLTAGE SYNCHRONOUS SYSTEMS, naming William Henry Mangione-Smith as inventor, filed Mar. 17, 2006, which is currently co-pending, or is an application of which a currently co-pending application is entitled to the benefit of the filing date.

For purposes of the USPTO extra-statutory requirements, the present application constitutes a continuation-in-part of United States patent application entitled PROCESSOR RESOURCE MANAGEMENT, naming Bran Ferren; W. Daniel Hillis; Nathan P. Myhrvold; Clarence T. Tegreene; and Lowell L. Wood, Jr. as inventors, U.S. application Ser. No. 11/214,449, filed Aug. 29, 2005 now U.S. Pat. No. 7,539,852.

For purposes of the USPTO extra-statutory requirements, the present application constitutes a continuation-in-part of United States patent application entitled MULTIPROCESSOR RESOURCE OPTIMIZATION, naming Bran Ferren; W. Daniel Hillis; Nathan P. Myhrvold; Clarence T. Tegreene; and Lowell L. Wood, Jr. as inventors, U.S. application Ser. No. 11/214,458, filed Aug. 29, 2005 now U.S. Pat. No. 7,774,558.

For purposes of the USPTO extra-statutory requirements, the present application constitutes a continuation-in-part of United States patent application entitled PREDICTIVE PROCESSOR RESOURCE MANAGEMENT, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/214,459, filed Aug. 29, 2005 now U.S. Pat. No. 7,877,584.

For purposes of the USPTO extra-statutory requirements, the present application constitutes a continuation-in-part of United States patent application entitled RUNTIME-BASED OPTIMIZATION PROFILE, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,207, filed Nov. 30, 2005.

For purposes of the USPTO extra-statutory requirements, the present application constitutes a continuation-in-part of United States patent application entitled ALTERATION OF EXECUTION OF A PROGRAM IN RESPONSE TO AN EXECUTION-OPTIMIZATION INFORMATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,296, filed Nov. 30, 2005.

For purposes of the USPTO extra-statutory requirements, the present application constitutes a continuation-in-part of United States patent application entitled FETCH REROUTING IN RESPONSE TO AN EXECUTION-BASED OPTIMIZATION PROFILE, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/291,503, filed Nov. 30, 2005.

For purposes of the USPTO extra-statutory requirements, the present application constitutes a continuation-in-part of United States patent application entitled HARDWARE-GENERATED AND HISTORICALLY-BASED EXECUTION OPTIMIZATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/292,323, filed Nov. 30, 2005 now abandoned.

For purposes of the USPTO extra-statutory requirements, the present application constitutes a continuation-in-part of United States patent application entitled FREEZE-DRIED GHOST PAGES, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/324,174, filed Dec. 30, 2005.

For purposes of the USPTO extra-statutory requirements, the present application constitutes a continuation-in-part of United States patent application entitled CROSS-ARCHITECTURE EXECUTION OPTIMIZATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/343,927, filed Jan. 31, 2006 now U.S. Pat. No. 8,214,191.

For purposes of the USPTO extra-statutory requirements, the present application constitutes a continuation-in-part of United States patent application entitled CROSS-ARCHITECTURE OPTIMIZATION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/343,745, filed Jan. 31, 2006.

For purposes of the USPTO extra-statutory requirements, the present application constitutes a continuation-in-part of United States patent application entitled HANDLING PROCESSOR COMPUTATIONAL ERRORS, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/364,131, filed Feb. 28, 2006.

For purposes of the USPTO extra-statutory requirements, the present application constitutes a continuation-in-part of United States patent application entitled ADJUSTING A PROCESSOR OPERATING PARAMETER BASED ON A PERFORMANCE CRITERION, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/364,573, filed Feb. 28, 2006 now U.S. Pat. No. 7,607,042.

For purposes of the USPTO extra-statutory requirements, the present application constitutes a continuation-in-part of United States patent application entitled HARDWARE-ERROR TOLERANT COMPUTING, naming Bran Ferren; W. Daniel Hillis; William Henry Mangione-Smith; Nathan P. Myhrvold; Clarence T. Tegreene; and Lowell L. Wood, Jr. as inventors, U.S. application Ser. No. 11/364,130, filed Feb. 28, 2006 now U.S. Pat. No. 7,493,516.

For purposes of the USPTO extra-statutory requirements, the present application constitutes a continuation-in-part of United States patent application entitled POWER SPARING SYNCHRONOUS APPARATUS, naming William Henry Mangione-Smith as inventor, U.S. application Ser. No. 11/384,236, filed Mar. 17, 2006 now U.S. Pat. No. 7,653,834.

The United States Patent Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003 at http://www.uspto.gov/web/offices/com/sol/og/2003/week11/patbene.htm. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

SUMMARY

An embodiment provides a system. The system includes a synchronous circuit. The synchronous circuit includes a first subcircuit powered by a first power plane having a first power plane voltage and a second subcircuit powered by a second power plane having a second power plane voltage. The system also includes an error detector operable to detect an incidence of a computational error occurring in the first subcircuit. The system further includes a controller operable to change the first power plane voltage based upon the detected incidence of a computational error. The system may include a power supply operable to provide a selected one of at least two voltages to the first power plane in response to the controller. The system may include a power supply configured to electrically engage a portable power source and operable to provide a selected one of at least two voltages to the first power plane in response to the controller. In addition to the foregoing, other system embodiments are described in the claims, drawings, and text that form a part of the present application.

Another embodiment provides a method. The method includes detecting a computational error occurring in a first subcircuit of a synchronous circuit. The synchronous circuit includes the first, subcircuit powered by a first power plane at a first power plane voltage and a second subcircuit powered by a second power plane at a second power plane voltage. The method also includes increasing the first power plane voltage based upon the detected computational error. The method may further include operating the first subcircuit at a first power plane voltage. In addition to the foregoing, other method embodiments are described in the claims, drawings, and text that form a part of the present application.

A further embodiment provides a device. The device includes means for detecting a computational error occurring in a first subcircuit of a synchronous circuit. The subcircuit includes the first subcircuit powered by a first power plane at a first power plane voltage and a second subcircuit powered by a second power plane at a second power plane voltage. The device also includes means for increasing the first power plane voltage based upon the detected computational error. The device may include means for operating the first subcircuit at an initial first power plane voltage. The device may also include means for decreasing the first power plane voltage. In addition to the foregoing, other device embodiments are described in the claims, drawings, and text that form a part of the present application.

An embodiment provides an apparatus. The apparatus includes a synchronous circuit including a first subcircuit powered by a first power plane having a first power plane voltage and a second subcircuit powered by a second power plane having a second power plane voltage. The apparatus also includes an error detector operable to detect an incidence of a computational error occurring in the first subcircuit. The apparatus includes a controller operable to change the first power plane voltage based upon the detected incidence of a computational error. The apparatus also includes a power supply configured to electrically couple with a portable power source and operable to provide a selected one of at least two voltages to the first power plane in response to the controller. In addition to the foregoing, other apparatus embodiments are described in the claims, drawings, and text that form a part of the present application.

Another embodiment provides a method. The method includes decreasing a voltage received at a first power plane from a power supply that includes a portable energy source. The first power plane being a component of a synchronous circuit that includes a first subcircuit powered by the first power plane and a second subcircuit powered by a second power plane having a second power plane voltage. The method also includes detecting an incidence of a computational error occurring in the first subcircuit. The method further includes increasing the voltage received at the first power plane from the power supply that includes a portable energy source in response to the detected computational error. In addition to the foregoing, other method embodiments are described in the claims, drawings, and text that form a part of the present application.

A further embodiment provides an apparatus. The apparatus includes means for decreasing a voltage received at a first power plane from a power supply that includes a portable energy source. The first power plane being a component of a synchronous circuit that includes a first subcircuit powered by the first power plane and a second subcircuit powered by a second power plane having a second power plane voltage. The apparatus also includes means for detecting an incidence of a computational error occurring in the first subcircuit. The apparatus includes means for increasing in response to the detected computational error the voltage received at the first power plane from the power supply that includes a portable energy source. In addition to the foregoing, other apparatus embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 43 illustrates an exemplary device in which embodiments may be implemented;

FIG. 50 illustrates a further alternative embodiment of the exemplary operational flow of FIG. 47;

FIG. 51 illustrates a partial view of an exemplary device in which embodiments may be implemented;

FIG. 59 illustrates an exemplary apparatus in which embodiments may be implemented.

DETAILED DESCRIPTION

Figure 1:
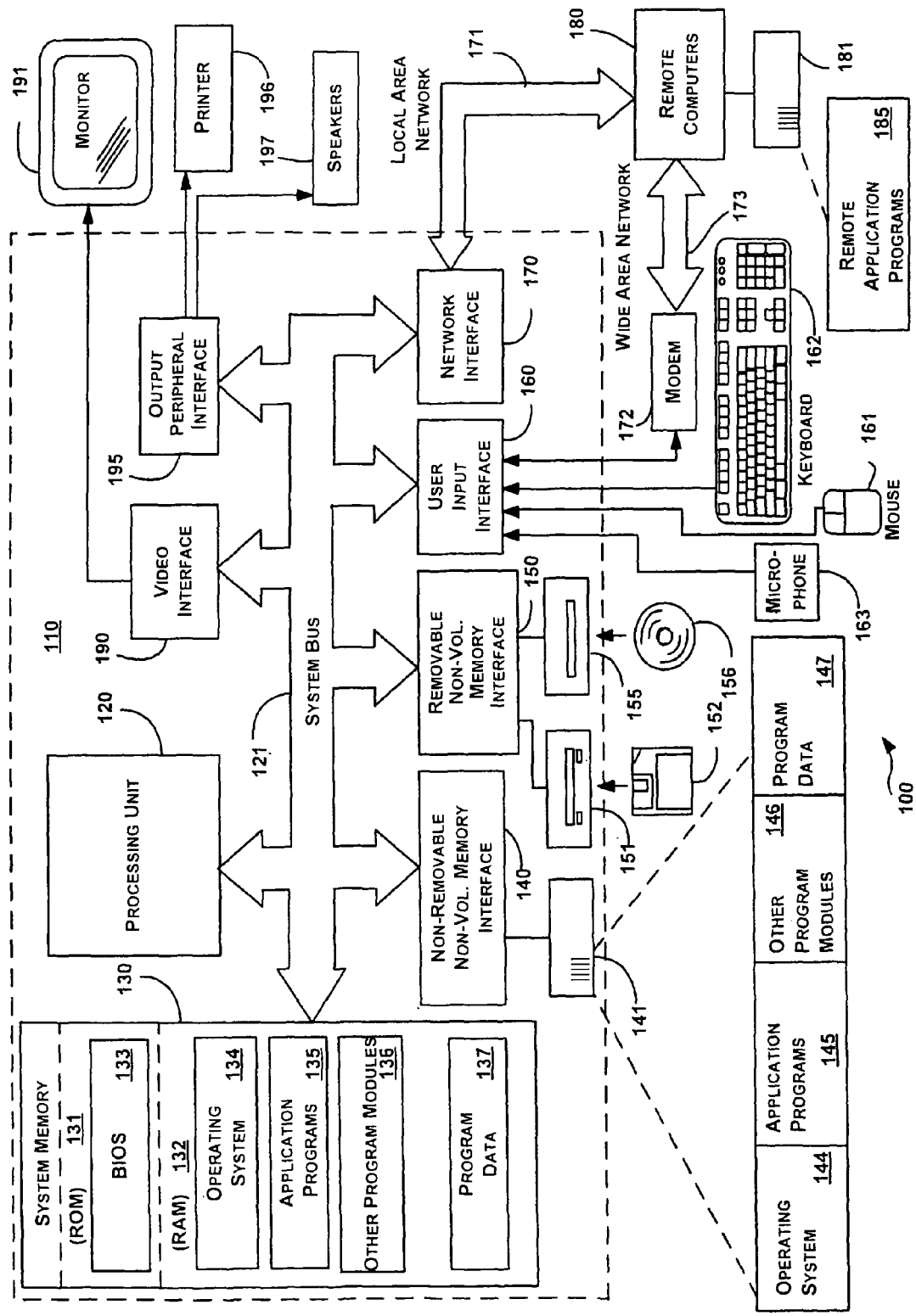
FIG. 1 illustrates a partial view of an exemplary device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 illustrates an exemplary general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media include, but are not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media. Combinations of any of the above should also be included within the scope of computer-readable media.

The system memory 130 includes computer storage media in the form of volatile and nonvolatile memory such as ROM 131 and RAM 132. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 1 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art. In an embodiment, an information store may include a computer storage media.

The computing device 110 may also include other removable/non-removable, volatile/nonvolatile computer storage media products. By way of example only, FIG. 1 illustrates a non-removable non-volatile memory interface (hard disk interface) 140 that reads from and writes to non-removable, non-volatile magnetic media, a magnetic disk drive 151 that reads from and writes to a removable, non-volatile magnetic disk 152, and an optical disk drive 155 that reads from and writes to a removable, non-volatile optical disk 156 such as a CD ROM. Other removable/nonremovable, volatile/nonvolatile computer storage media that can be used in the exemplary operating environment include, but are not limited to, magnetic tape cassettes, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 1 provide storage of computer-readable instructions, data structures, program modules, and other data for the computing device 110. In FIG. 1, for example, hard disk drive 141, is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 1. The logical connections depicted in FIG. 1 include a local area network (LAN) 171 and a wide area network (WAN) 173, but may also include other networks such as a personal area network (PAN) (not shown). Such networking environments are commonplace in offices, enterprise-wide computer networks, intranets, and the Internet.

When used in a LAN networking environment, the computing system environment 100 is connected to the LAN 171 through a network interface or adapter 170. When used in a WAN networking environment, the computing device 110 typically includes a modem 172 or other means for establishing communications over the WAN 173, such as the Internet. The modem 172, which may be internal or external, may be connected to the system bus 121 via the user input interface 160, or via another appropriate mechanism. In a networked environment, program modules depicted relative to the computing device 110, or portions thereof, may be stored in a remote memory storage device. By way of example, and not limitation, FIG. 1 illustrates remote application programs 185 as residing on computer storage medium 181. It will be appreciated that the network connections shown are exemplary and other means of establishing a communications link between the computers may be used.

FIG. 1 is intended to provide a brief, general description of an illustrative and/or suitable exemplary environment in which embodiments may be implemented. An exemplary system may include the computing system environment 100 of FIG. 1. FIG. 1 is an example of a suitable environment and is not intended to suggest any limitation as to the structure, scope of use, or functionality of an embodiment. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing device 110 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Figure 2:
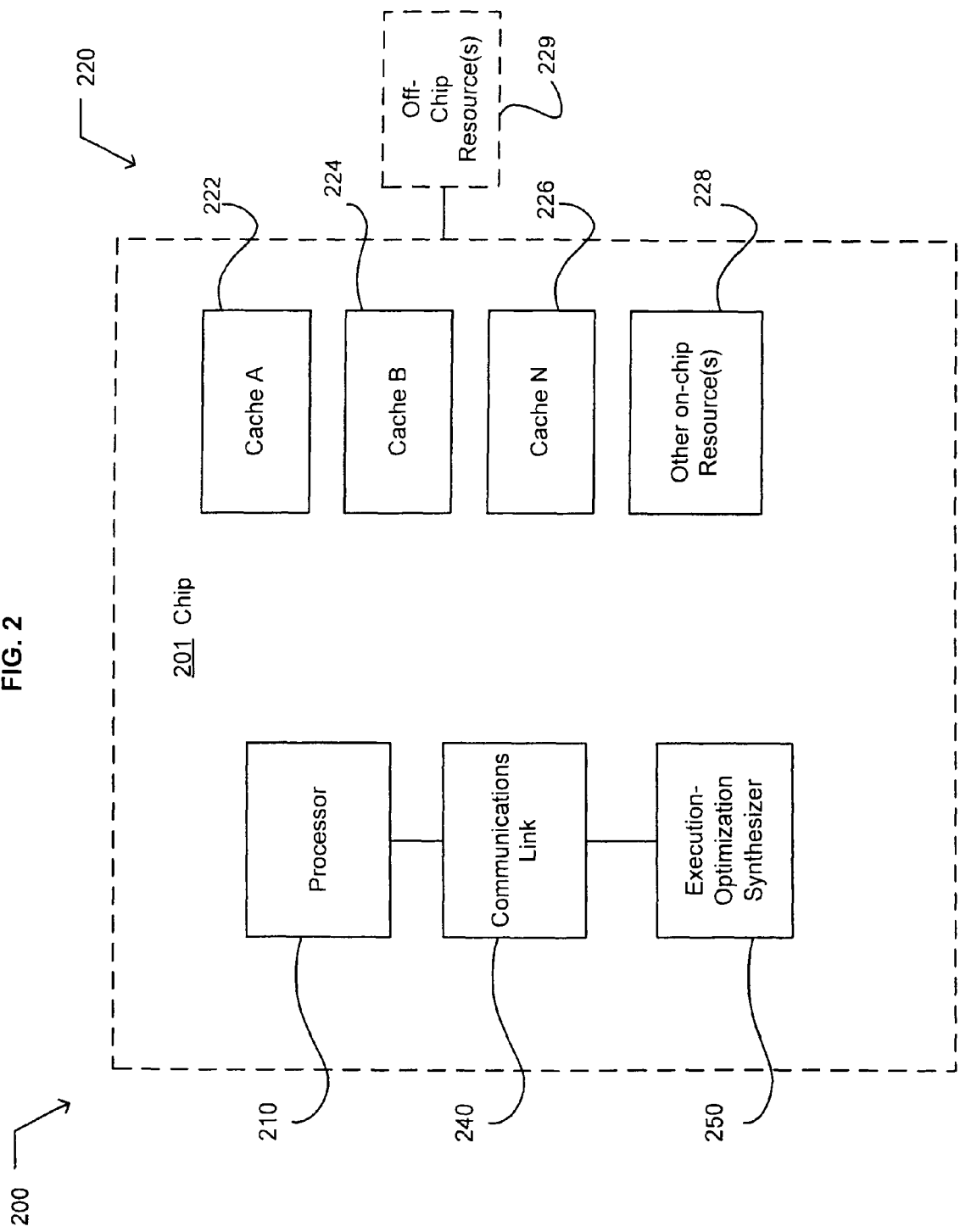
FIG. 2 illustrates a partial view of an exemplary device in which embodiments may be implemented.

FIG. 2 illustrates a partial view of an exemplary device 200 in which embodiments may be implemented. The device includes a processor 210, an execution-optimization synthesizer 250, and a communications link 240 exposed to the execution-optimization synthesizer and to the processor. The processor may include any processing unit, and may be described as a central processing unit that controls operation of a computer, such as for example, the processing unit 120 described in conjunction with FIG. 1. The device may also include a hardware resource 220 interconnected with the processor. The hardware resource may be any hardware resource associated and/or interconnected with the processor. In an embodiment, the hardware resource may include one or more caches, illustrated as a cache A (222), a cache B (224), and through a cache N (226). Also, the hardware resource may include a branch predictor (not shown). In another embodiment, the hardware resource 220 may include any other resource associated with the processor, illustrated as other on-chip resource 228. In a further embodiment, the hardware resource includes an off-chip resource, illustrated as an off-chip resource 229. For example, the cache A (222) may be an on-chip L1 cache and the off-chip resource 229 may be an off-chip cache, such as an off-chip L2 cache.

The processor 210 includes a processor operable to execute an instruction set. In an embodiment, the instruction set may include a collection of instructions that the processor can execute. In a further embodiment, the instruction set may include an instruction set architecture of the processor. In another embodiment, the instruction set may include a group of machine instructions and/or computer instructions that the processor can execute. In another embodiment, the instruction set may be interpreted by the processor. In further embodiment, the instruction set may include a high-level language, an assembly language, and/or a machine code that the processor can execute, with or without a compiling and/or a translation.

In an embodiment, an instruction may include a functional instruction, a branching instruction, a memory instruction, and/or other instruction that may be executed by a processor. In another embodiment, an instruction may include a statement or a portion of a statement in a program. In a further embodiment, an instruction may include at least two statements from a program. A program may include any type of a program, from several lines of instructions, to an application, and to an operating system. In an embodiment, an instruction may include a decoded instruction, a translated instruction, a portion of a translated instruction, and/or a micro-operation. In a further embodiment, an instruction may include an instruction block, a basic block, a functional block, and/or an instruction module.

The execution-optimization synthesizer 250 includes an execution-optimization synthesizer operable to collect data from the communications link that corresponds to an execution of at least one instruction of the instruction set. In an embodiment, the data may include certain data items, such as datum, byte, bit, and/or a block that are associated together. The execution-optimization synthesizer is also operable to generate an execution-optimization information utilizing the collected data from the communications link and corresponding to the execution of at least one instruction of the instruction set.

In an embodiment, the communications link 240 may include at least one of a signal-bearing medium, digital-signal-bearing medium, a light propagation medium, a light propagation medium, an optical fiber, a light guide, a computer readable storage medium, a hardware register, a bus, a memory local to the processor, an interconnection structure, and/or a digital-signal conductor. For example, a computer readable storage medium may include a memory and/or a memory system directly accessible by the processor and the execution-optimization synthesizer. By way of further example, a digital-signal conductor may include any digital signal conducting structure configured to at least transfer digital signals from the processor to the execution-optimization synthesizer. In another embodiment, the communications link includes a signal-bearing medium exposed only to an execution-optimization synthesizer and the processor. In a further embodiment, the communications link includes a signal-bearing medium exposed to an execution-optimization synthesizer and the processor, and transparent to software executing on the processor. In another embodiment, the communications link includes a signal-bearing medium exposed to an execution-optimization synthesizer, to the processor, and to software.

In an embodiment, the processor 210 and the communications link 240 reside on a single chip, illustrated as a single chip 201. In another embodiment, the processor and the execution-optimization synthesizer 250 reside on a single chip, also illustrated as the single chip 201. In a further embodiment, the processor, communications link, and the execution-optimization synthesizer are formed on a single chip, illustrated as the single chip 201.

In an embodiment, the execution-optimization synthesizer 250 includes a hardware implemented execution-optimization synthesizer. In another embodiment, the execution-optimization synthesizer includes a microengine implemented execution-optimization synthesizer.

In a further embodiment, the execution-optimization synthesizer 250 operable to collect data from the communications link that corresponds to an execution of at least one instruction of the instruction set includes an execution-optimization synthesizer operable to collect dynamic data from the communications link that corresponds to a runtime execution of at least one instruction of the instruction set. In an embodiment, the data collected by the execution-optimization synthesizer includes at least one of an interpreted instruction, a translated instruction, a decoded instruction, a micro-operation corresponding to at least a portion of an instruction, data correlating to the execution of the at least one instruction, a movement of data correlating to an execution of the at least one instruction of the instruction set, a result of an execution of an instruction, a branch outcome of an execution of an instruction, an exception correlating to an execution of an instruction, a store-to-load dependency correlating an execution of an instruction, a predicted value correlating to an execution of an instruction, and/or a relationship between at least two instructions of the instruction set.

In an embodiment, the execution-optimization synthesizer 250 operable to collect data from the communications link that corresponds to an execution of at least one instruction of the instruction set includes an execution-optimization synthesizer operable to collect at least one of data transparent to a user, data visible to a user, data transparent to software executing on the processor, data visible to software executing on the processor, and/or data exposed for user manipulation.

In another embodiment, the execution-optimization synthesizer 250 operable to generate an execution-optimization information utilizing the collected data includes an execution-optimization synthesizer operable to generate an optimization information that is at least one of responsive to the collected data, derived from the collected data, associated with the collected data, and/or using the collected data. In a further embodiment, the execution-optimization synthesizer operable to generate an execution-optimization information corresponding to the execution of at least one instruction of the instruction set includes an execution-optimization synthesizer operable to generate at least one of an execution-environment optimization information, a processor-environment optimization information, a data-environment optimization information, and/or a metadata reporting an execution environment. For example, an execution-environment optimization information may include an indication that an identified micro-op is used frequently and may be advantageously saved in a memory close to the processor 210. Another execution-environment optimization may include one or more versions of the at least one instruction of the instruction set that provides some expected benefit over the original at least one instruction of the instruction set. A memory management system serving the processor may cause one of the versions to be executed transparently instead of the original at least one instruction of the instruction set, such as through a translation lookaside buffer. By way of further example, metadata reporting an execution environment may include tracking information with respect to data objects. For example, certain access predictors may work well with certain data objects, or some objects do not appear to be co-resident in the cache, or may be highly co-resident, or certain pointers in object-orientated systems typically point to specific object types, or specific value predictors have worked well with some data in the past.

In other embodiments, the execution-optimization synthesizer 250 operable to generate an execution-optimization information utilizing the collected data may include an execution-optimization synthesizer operable to generate an execution-optimization information optimizing data handling, which may be by a data class. In some instances, a data class may include certain data items (datum, byte, bit, a block, a page) that are used once and never again. In other instances, a data class may include certain data items are used constantly but never written and/or infrequently written. In further data classes, certain data items may be constantly read and written to, or other data items may be often being written but never read. The execution-optimization synthesizer operable to generate an execution-optimization information may predict how a data class will likely be used in the future and/or saves the data items in a manner and/or a location that substantially optimizes utilization of the data items by an instruction group and/or storage of the data items by the computing device. Any suitable type of predictive algorithm providing meaningful results may be used, including a predictive algorithm based on a Bayesian method, and/or a learning algorithm. The prediction may be written to a ghost page associated with a piece of data. A prediction may be straight forward if it is known that the data piece will never be written or read. Each data item will expose what its peculiar flavor is. This may be implemented down to the size of a single cache line, or even below the cache line.

In further embodiments, the execution-optimization synthesizer 250 operable to generate an execution-optimization information utilizing the collected data may include an execution-optimization synthesizer operable to generate an execution-optimization information providing a storage mobility for data items that are associated together in a substantial disequilibrium based upon a shared fate, a shared nature, an entanglement to a page and/or line of similarly handled data. The data item may include one or more extra bits (tag) on end of a data item that may indicate its size, nature (written but never read, read but never written, read once in the life of the program, used by at least two threads). In a further embodiment, an indicator may say which code relates with to the data item. This may be used for doing storage assignment. For example, if the data item includes a semaphore that is used across multiple threads, that should be known and the data item managed accordingly. Most data is associated with a particular body of code and assigned to a storage unit together. By watching that, these assignments can be done together between the I-cache and the D-cache.

In an embodiment, the execution-optimization synthesizer 250 further includes an execution-optimization synthesizer operable to save the optimization information. The optimization information may be saved close to the processor 210, for example in an on-chip resource such as the cache A (222), or in the off-chip resource 229, such as a system memory or storage medium. In another embodiment, the execution-optimization synthesizer further includes an execution-optimization synthesizer operable to save the optimization information in an association with the at least one instruction of the instruction set.

In an embodiment, the device 200 includes a computing device, such as for example, the computing device 110 of the computing system environment 100 of FIG. 1. In a further embodiment, the computing device includes at least one of desktop computing device, a laptop-computing device, a portable computing device, and/or a supercomputing device.

Figure 3:
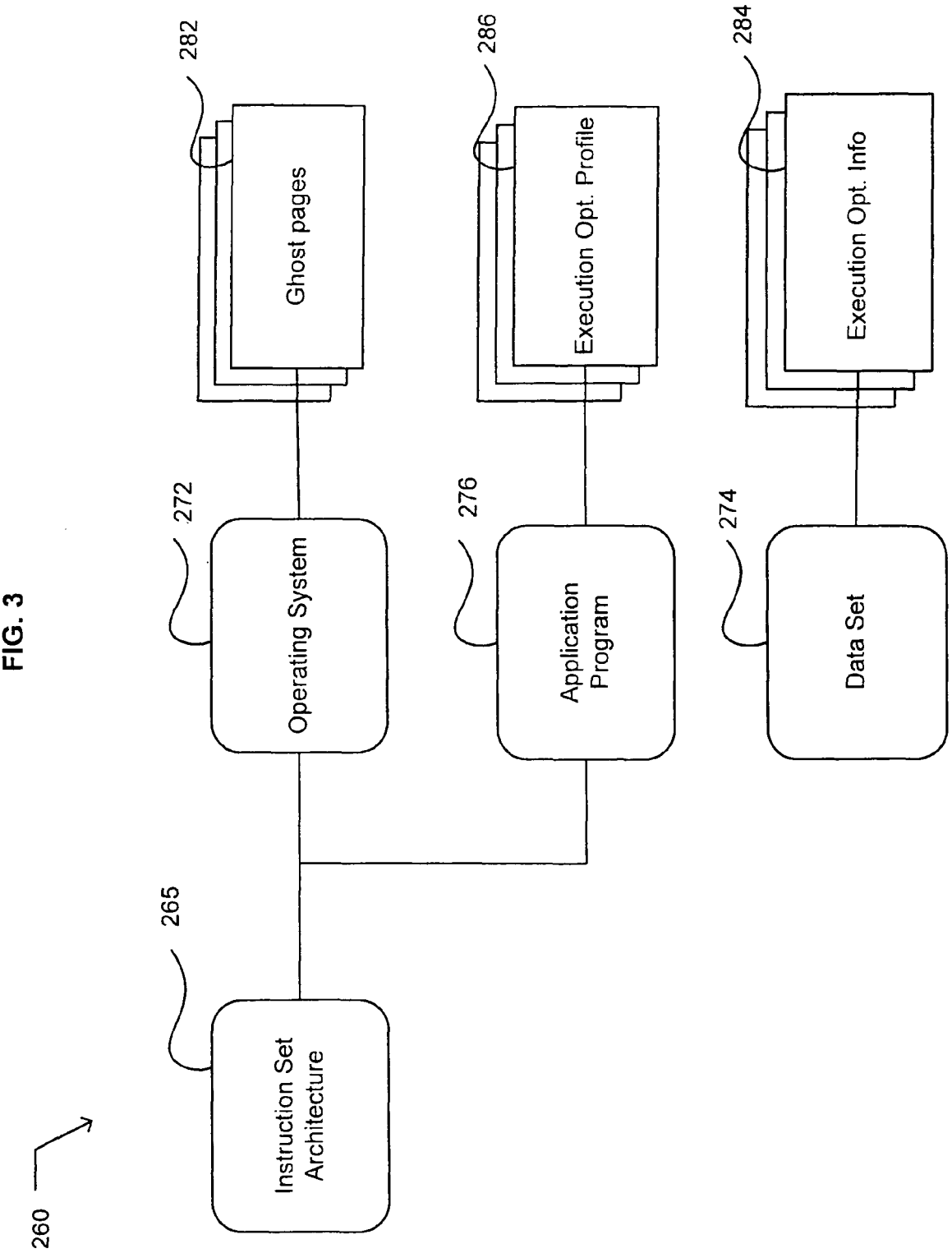
FIG. 3 partially illustrates an association between optimization information and a program and/or data.

FIG. 3 partially illustrates an association between optimization information and a program and/or data. An instruction set architecture is illustrated as an instruction set architecture 265, and related compiled programs are illustrated as an operating system 272 and an application program 276. The application program 276 may be a compiled application program or a compliable application program. Also illustrated is a data set 274.

The execution-optimization information generated by the execution-optimization synthesizer 250 may be associated with the at least one instruction of the instruction set of a program, an application, and/or a module that includes the at least one instruction. In the case of data, the execution-optimization information generated by the execution-optimization synthesizer may be associated with data received for processing by the execution, data produced by the execution, the at least one instruction of the instruction set that processed the data, and/or other related matter. FIG. 3 illustrates certain embodiments of an association of the execution-optimization information with the at least one instruction of the instruction set. The ghost pages 282 that include the execution-optimization information pertaining to the operating system 272 may be virtually and/or physically associated in an information storage with the operating system. The information storage may include a non-volatile memory structure. For example, the ghost pages may be saved in the same file as the operating system. When the operating system is loaded into system memory, the ghost pages may remain in the information storage, or may be, such as for example, also loaded into system memory, or loaded into an inboard memory. In another embodiment, an execution-optimization information 284 pertaining to a data set 274 is associated in a information storage with the data set. In a further embodiment, an execution-optimization profile 286 is associated in an information storage with an application 276.

In an embodiment, a ghost page of the ghost pages 282 containing the execution-optimization information may be associated with a selected page of a program or data whose content corresponds to the generation of the execution-optimization information, such as for example, a selected page containing the instruction of the operating system 272, a selected page containing the data of the data set 274, and/or a selected page containing the application program 276. By way of further example, data in a ghost page of the ghost pages 282 may indicate that a branch instruction on an identified line of an associated selected page of an application should not be taken. In another embodiment, a file containing the execution-optimization information 284 may be associated with a file containing the data set.

The illustrated embodiments of the ghost page 282, the execution-optimization information 284, and the execution-optimization profile 286 respectively associated with the operating system 272, the data 274, and the application 276 are intended only to be illustrative and are not limiting. In another embodiment for example, the ghost pages 282 may be associated with the application 276, or the data set 274.

Figure 4:
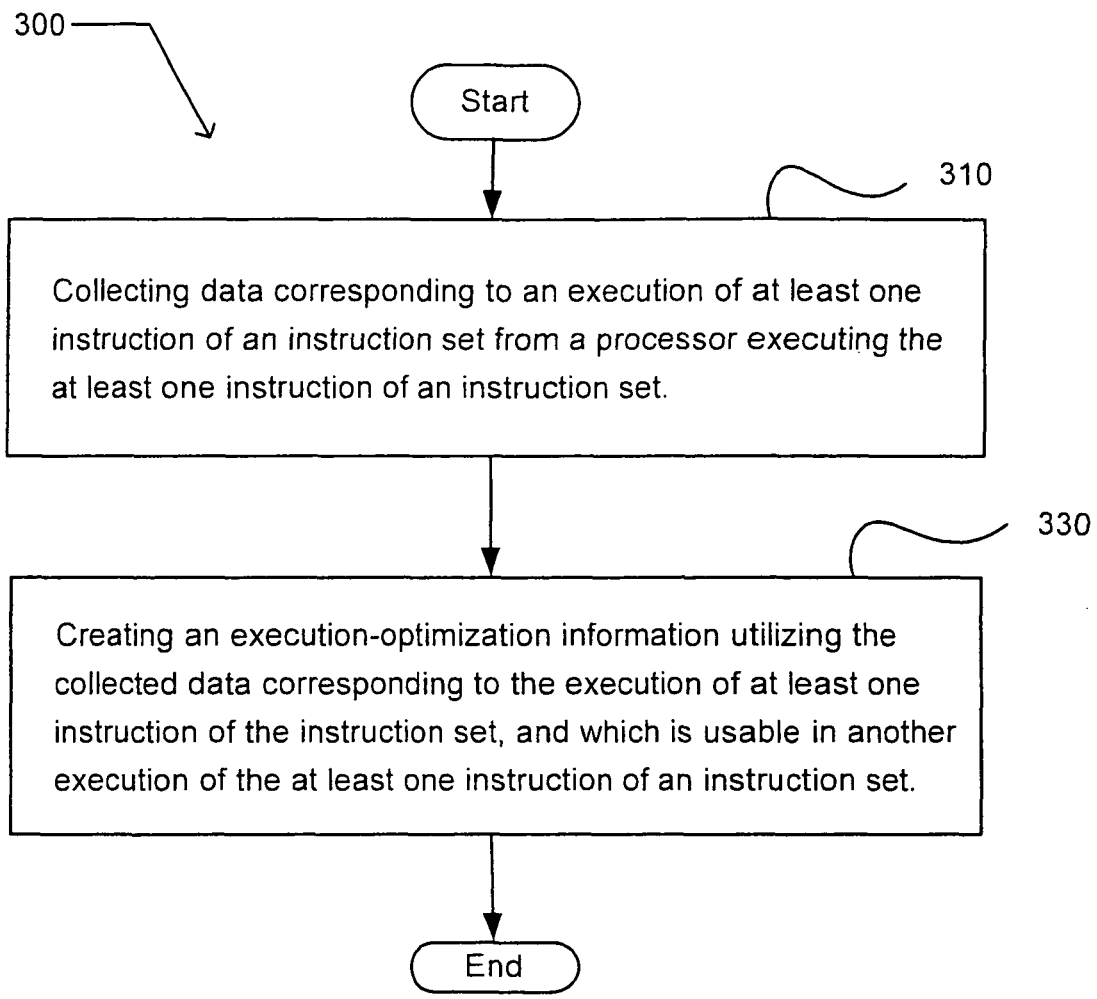
FIG. 4 illustrates an exemplary operational flow in which embodiments may be implemented.

FIG. 4 illustrates an exemplary operational flow 300 in which embodiments may be implemented. In an embodiment, the operational flow may be implemented in the computing system environment 100 of FIG. 1 and/or the device 200 of FIG. 2. After a start operation, the operational flow moves to an accumulation operation 310. The accumulation operation collects data corresponding to an execution of at least one instruction of an instruction set from a processor executing the at least one instruction of an instruction set. An enhancement operation 330 creates an execution-optimization information utilizing the collected data corresponding to the execution of at least one instruction of the instruction set and which is usable in another execution of the at least one instruction of an instruction set. The operational flow then moves to an end operation.

Figure 5:
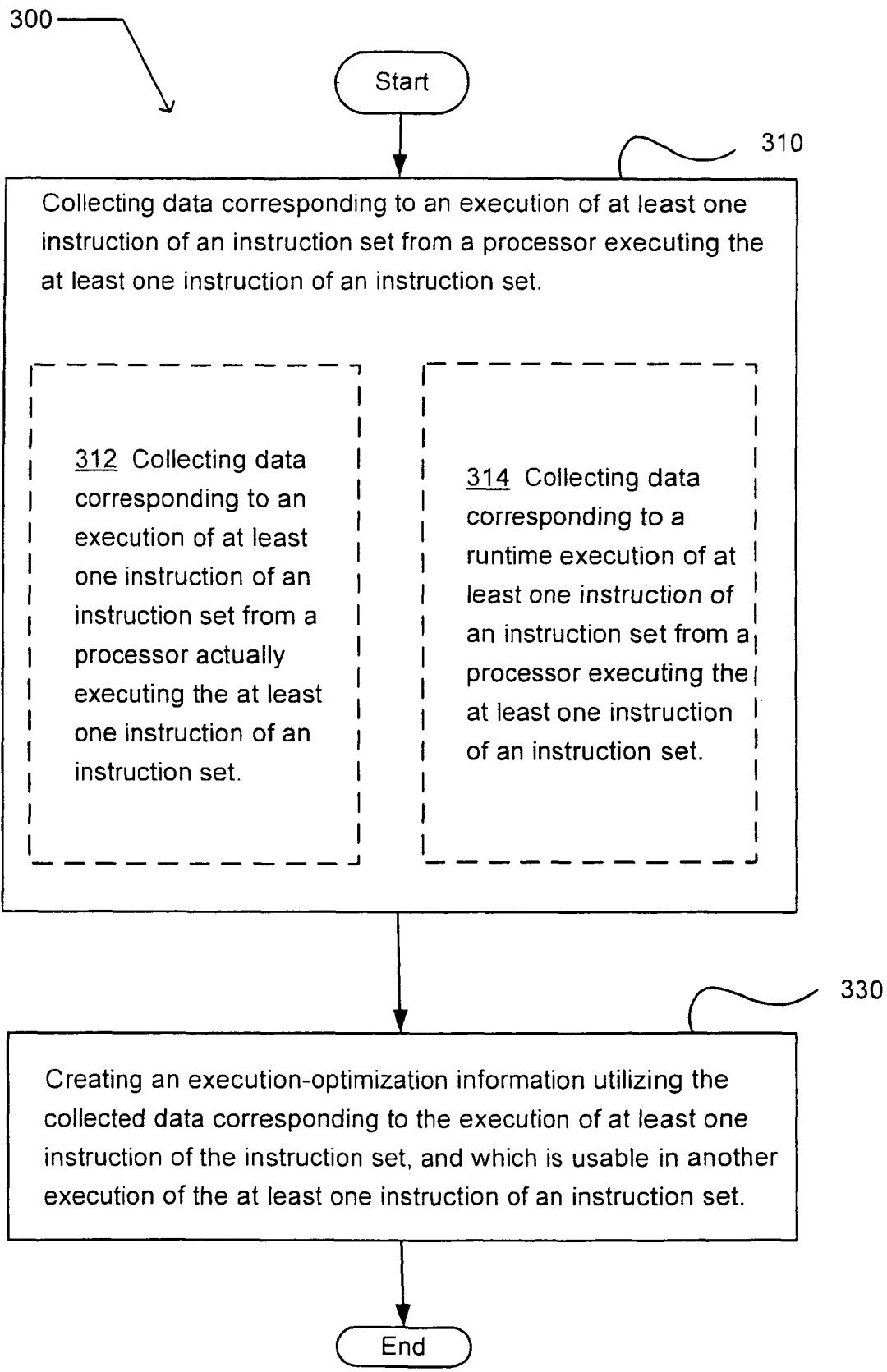
FIG. 5 illustrates an alternative embodiment of the exemplary operational flow of FIG. 4.

FIG. 5 illustrates an alternative embodiment of the exemplary operational flow 300 of FIG. 4. The accumulation operation 310 may include at least one additional operation. The at least one additional operation may include an operation 312 and/or an operation 314. The operation 312 collects data corresponding to an execution of at least one instruction of an instruction set from a processor actually executing the at least one instruction of an instruction set. The operation 314 collects data corresponding to a runtime execution of at least one instruction of an instruction set from a processor executing the at least one instruction of an instruction set.

Figure 6:
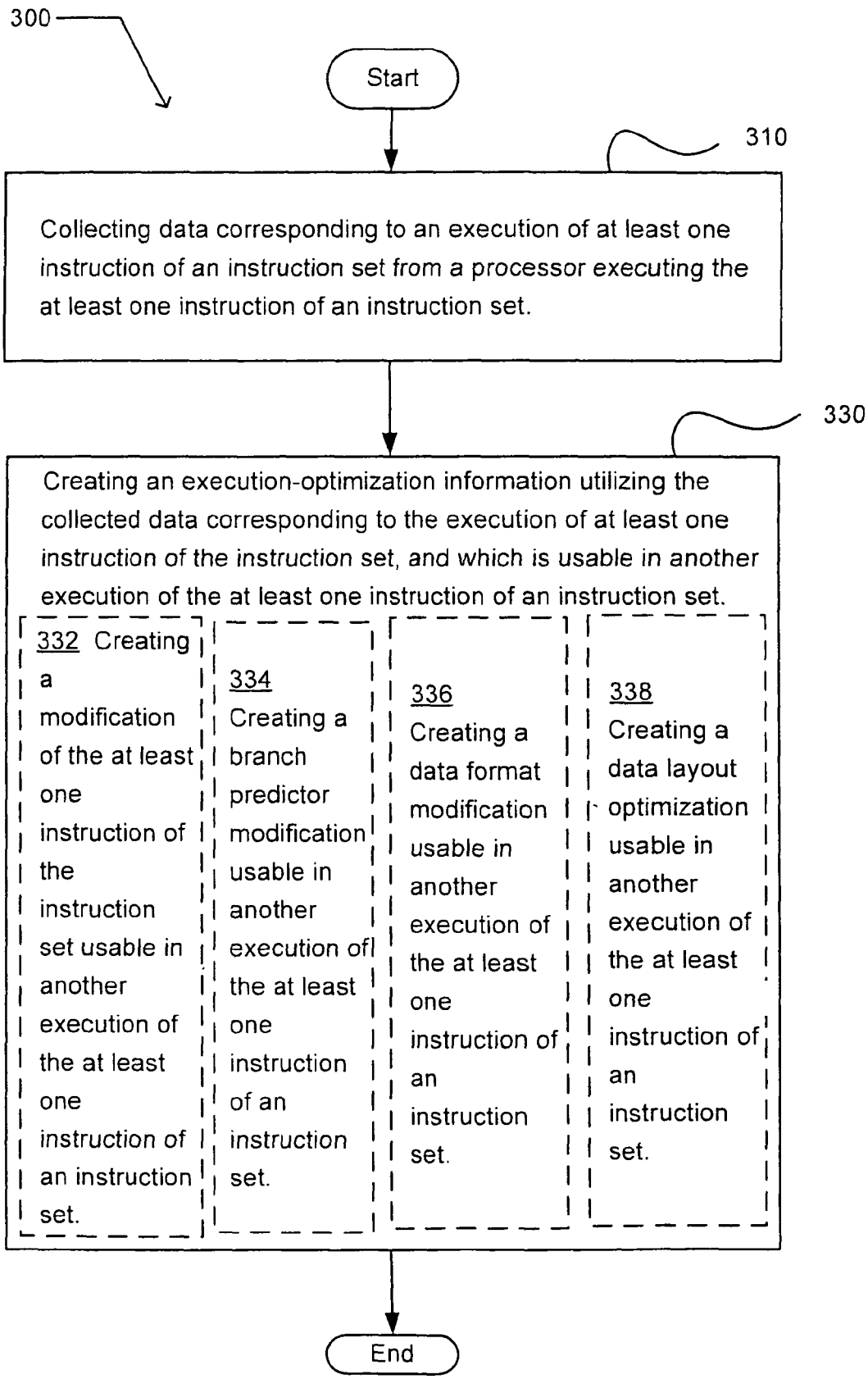
FIG. 6 illustrates another alternative embodiment of the exemplary operational flow of FIG. 4.

FIG. 6 illustrates another alternative embodiment of the exemplary operational flow 300 of FIG. 4. The enhancement operation 330 may include at least one additional operation. The at least one additional operation may include an operation 332, an operation 334, an operation 336, and/or an operation 338. The operation 332 creates a modification of the at least one instruction of the instruction set usable in another execution of the at least one instruction of an instruction set. For example, the creating a modification of the at least one instruction may include creating one or more versions of the instruction where each version may provide some expected benefit over the original version, or saving a decoded version of a frequently fetched at least one instruction to save a future decoding of the frequently fetched instruction. The operation 334 creates a branch predictor modification usable in another execution of the at least one instruction of an instruction set. The operation 336 creates a data format modification usable in another execution of the at least one instruction of an instruction set. The operation 338 creates a data layout optimization usable in another execution of the at least one instruction of an instruction set. For example, in an embodiment, a data layout optimization may include a repacking of data, a compaction of data, and/or a saving of data that may be useful in execution the at least one instruction.

Figure 7:
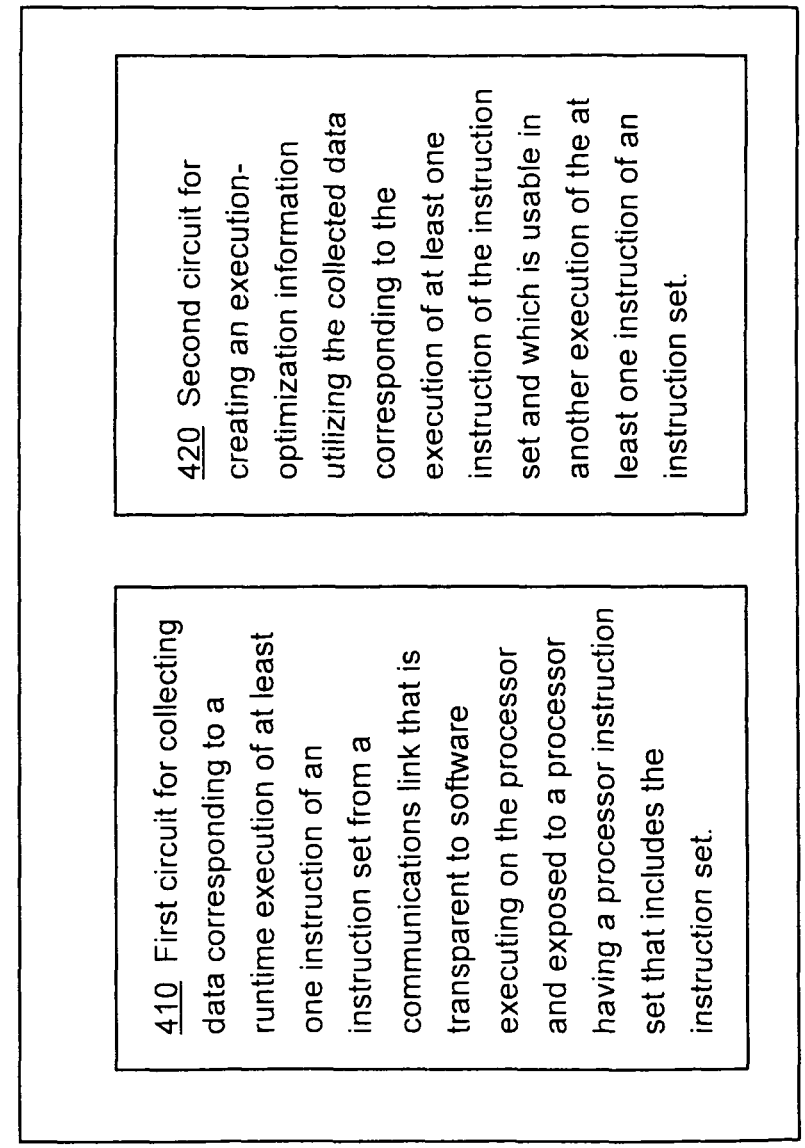
FIG. 7 illustrates a partial view of an exemplary device in which embodiments may be implemented.

FIG. 7 illustrates a partial view of an exemplary device 400 in which embodiments may be implemented. The device includes a first circuit 410 for collecting data corresponding to a runtime execution of at least one instruction of an instruction set from a communications link that is transparent to software executing on the processor and exposed to a processor having a processor instruction set that includes the instruction set. The device also includes a second circuit 420 for creating an execution-optimization information utilizing the collected data corresponding to the execution of at least one instruction of the instruction set and which is usable in another execution of the at least one instruction of an instruction set. In an embodiment, the second circuit for creating the execution-optimization information includes the first circuit for collecting data corresponding to an execution.

Figure 8:
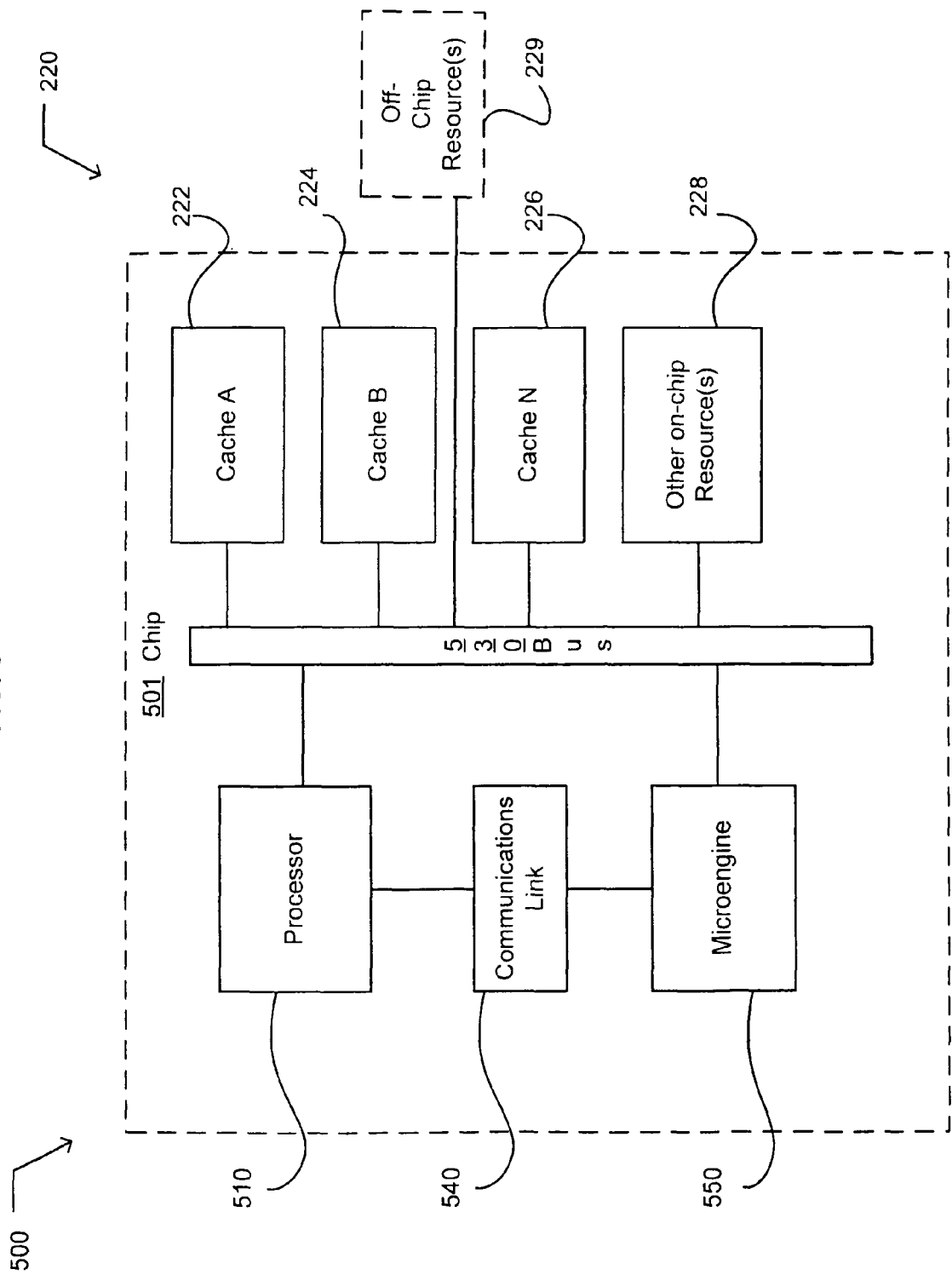
FIG. 8 illustrates a partial view of an exemplary device in which embodiments may be implemented.

FIG. 8 illustrates a partial view of an exemplary device 500 in which embodiments may be implemented. The device includes a microengine 550 operatively coupled with a processor 510 having an instruction set. The processor may include any processor, such as for example, the processing unit 120 described in conjunction with FIG. 1. The processor may be described as a central processing unit that controls operation of a computer. In an embodiment, the device may include an internal bus 530 providing a parallel data transfer path between the processor and the hardware resource 220.

The microengine 550 includes a microengine operable to gather data in a manner transparent to software executing on the processor 510 and corresponding to a runtime execution of at least a portion of the instruction set by the processor. The microengine is also operable to create a runtime-based optimization profile utilizing the gathered dynamic data and which is useable in a subsequent execution of the at least of a portion of the instruction set by the processor.

In an embodiment, the microengine 550 may include a microengine operable to gather at least one of dynamic data and/or static data in a manner transparent to software executing on the processor and corresponding to a runtime execution of at least a portion of the instruction set by the processor 510.

In another embodiment, the device 500 may further include the processor 510 having an instruction set. In a further embodiment, the processor and the microengine 550 are formed on a chip, illustrated as a single chip 501. In an embodiment, the device may further include a communications link 540 exposed to the microengine. In another embodiment, the device may include the communications link exposed to the microengine and transparent to software executing on the processor. In a further embodiment, the device may include the communications link operably coupled to the microengine and to the processor. In another embodiment, the communications link may include an interconnection structure.

Figure 9:
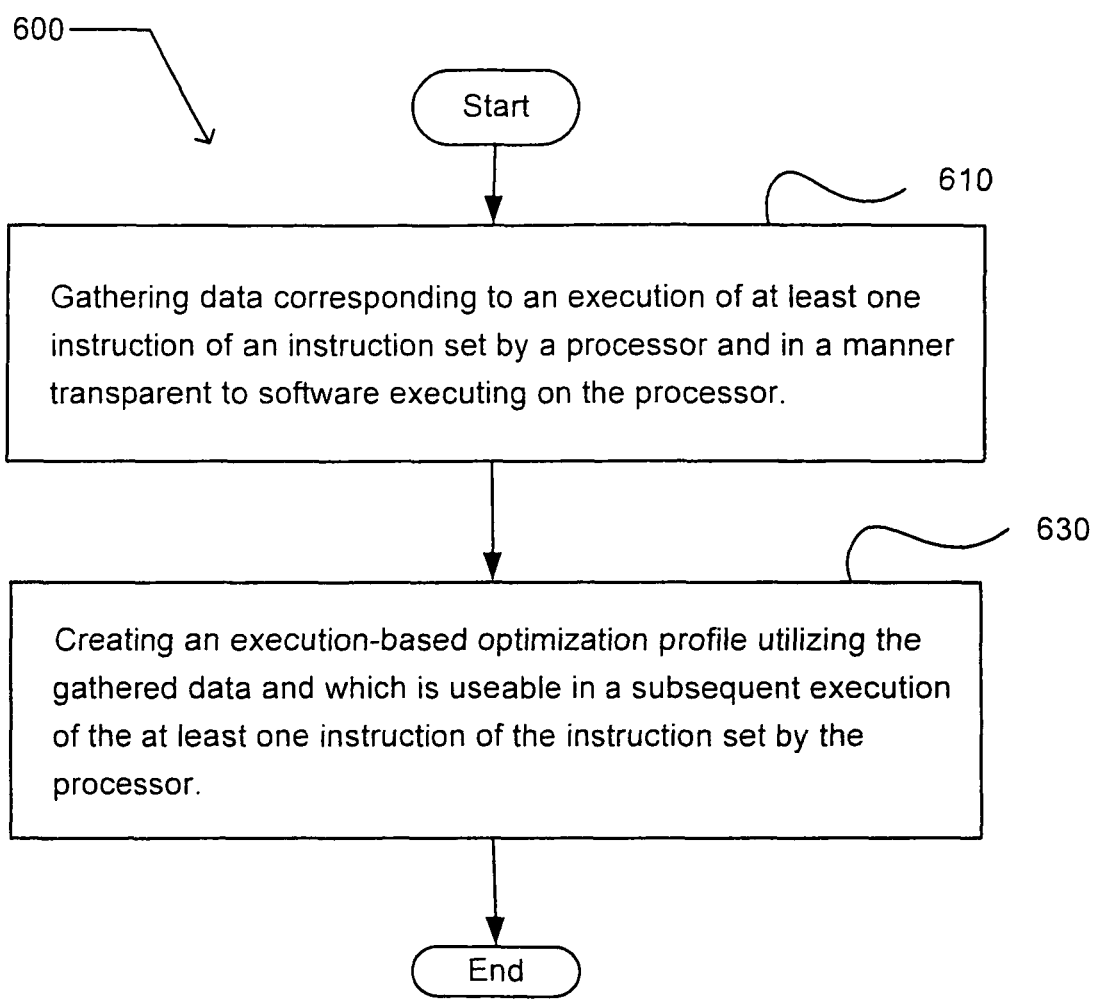
FIG. 9 illustrates an exemplary operational flow implemented in a hardware device and in which embodiments may be implemented.

FIG. 9 illustrates an exemplary operational flow 600 implemented in a hardware device and in which embodiments may be implemented. In an embodiment, the operational flow may be implemented in the computing system environment 100 of FIG. 1, and/or the device 500 of FIG. 8. After a start operation, the operational flow moves to a harvesting operation 610. The harvesting operation gathers data corresponding to an execution of at least one instruction of an instruction set by a processor and in a manner transparent to software executing on the processor. An improvement operation 630 creates an execution-based optimization profile utilizing the gathered data and which is useable in a subsequent execution of the at least one instruction of the instruction set by the processor. In an embodiment, the execution-based optimization profile may enhance a future execution of the at least one instruction by increasing an efficiency of the execution, reducing cache misses, reducing exceptions, reducing storage used, and/or reducing energy consumed. The operational flow then proceeds to an end operation.

Figure 10:
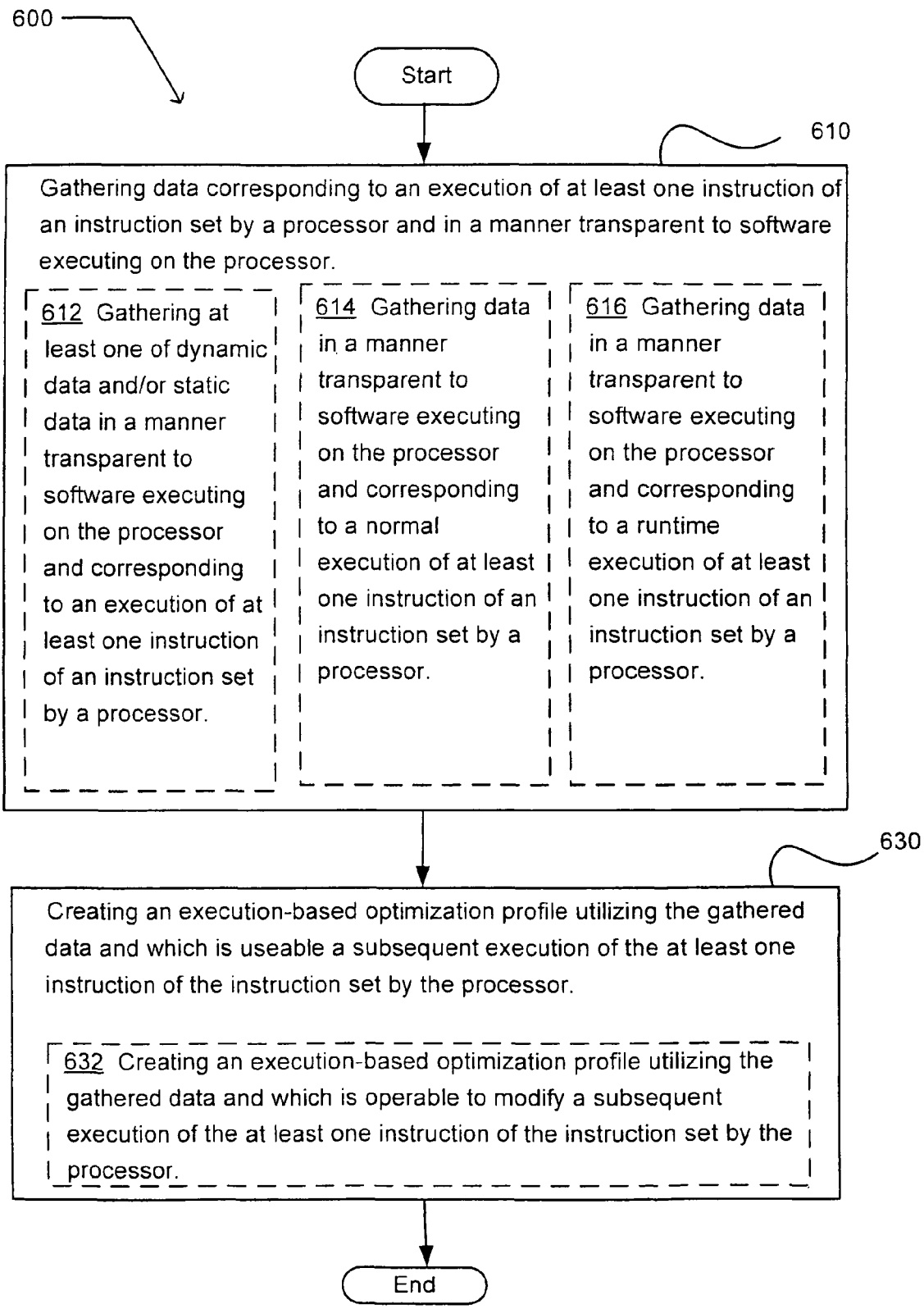
FIG. 10 illustrates an alternative embodiment of the exemplary operational flow of FIG. 9.

FIG. 10 illustrates an alternative embodiment of the exemplary operational flow 600 of FIG. 9. The harvesting operation 610 may include at least one additional operation. The at least one additional operation may include an operation 612, an operation 614, and/or an operation 616. The operation 612 gathers at least one of dynamic data and/or static data in a manner transparent to software executing on the processor and corresponding to an execution of at least one instruction of an instruction set by a processor. The operation 614 gathers data in a manner transparent to software executing on the processor and corresponding to a normal execution of at least one instruction of an instruction set by a processor. The operation 616 gathers data in a manner transparent to software executing on the processor and corresponding to a runtime execution of at least one instruction of an instruction set by a processor. The improvement operation 630 may include at least one additional operation, such as an operation 632. The operation 632 creates an execution-based optimization profile utilizing the gathered data and which is operable to modify a subsequent execution of the at least one instruction of the instruction set by the processor.

Figure 11:
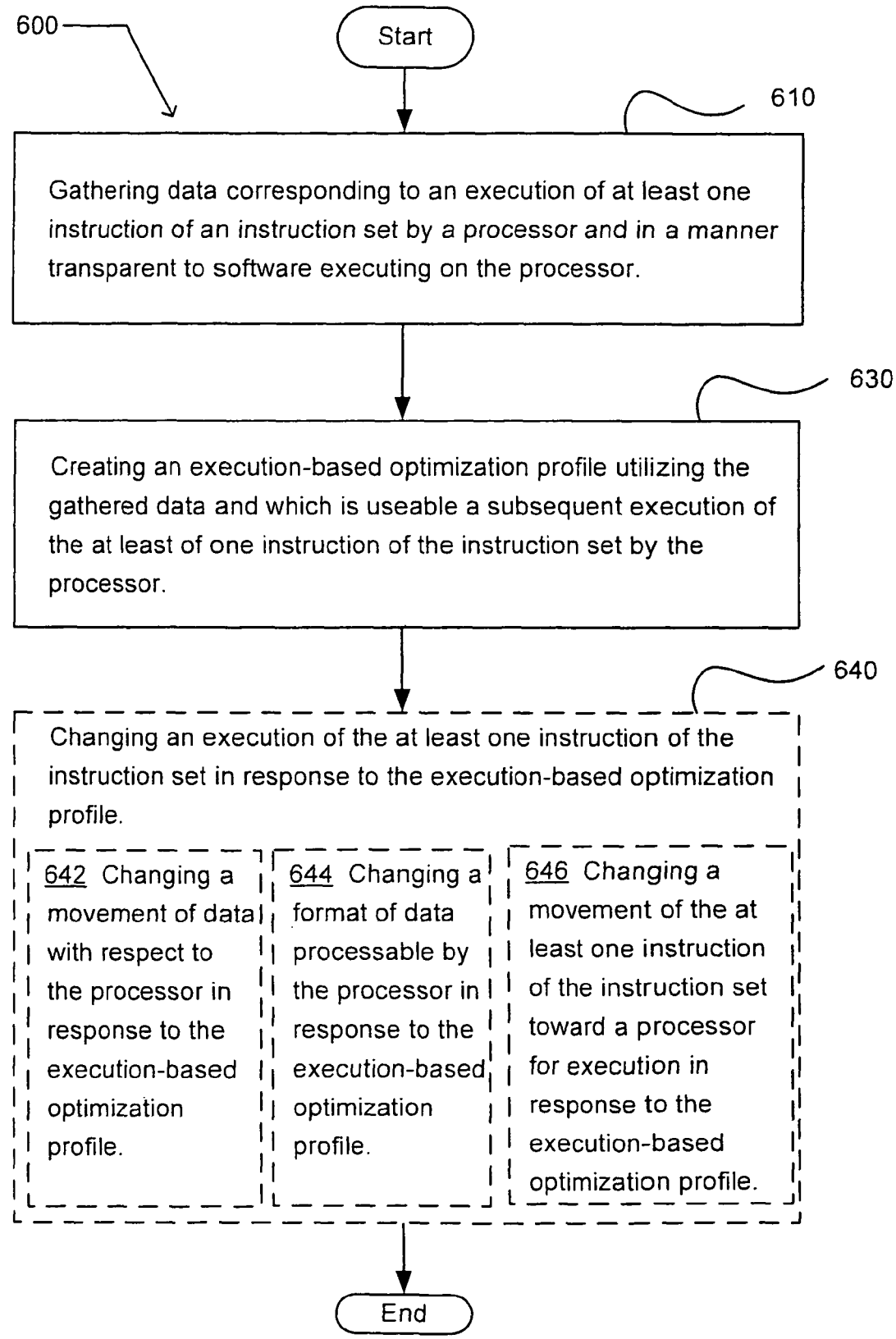
FIG. 11 illustrates another alternative embodiment of the exemplary operational flow of FIG. 9.

FIG. 11 illustrates another alternative embodiment of the exemplary operational flow 600 of FIG. 9. The operational flow may include at least one additional operation. The at least one additional operation may include a modification operation 640. The modification operation changes an execution of the at least one instruction of the instruction set in response to the execution-based optimization profile.

The modification operation 640 may include at least one additional operation. The at least one additional operation may include an operation 642, an operation 644, and/or an operation 646. The operation 642 changes a movement of data with respect to the processor in response to the execution-based optimization profile. For example, changing a movement of data may include changing a movement of data toward and/or away from the processor. Changing a movement of data toward the processor may include a prefetch of data. By way of further example, frequently read data may be stored in a memory close to the processor and infrequently read data may be stored in a memory far from the processor. By way of example, frequently written or rewritten data may be stored in a memory close to the processor and infrequently read data may be stored in a memory far from the processor. The operation 644 changes a format of data processable by the processor in response to the execution-based optimization profile. For example, the operation 644 may save data translated from one format to another, such as from big-endian to little-endian, or floating-point formats. The operation 646 changes a movement of the at least one instruction of the instruction set toward a processor for execution in response to the execution-based optimization profile.

Figure 12:
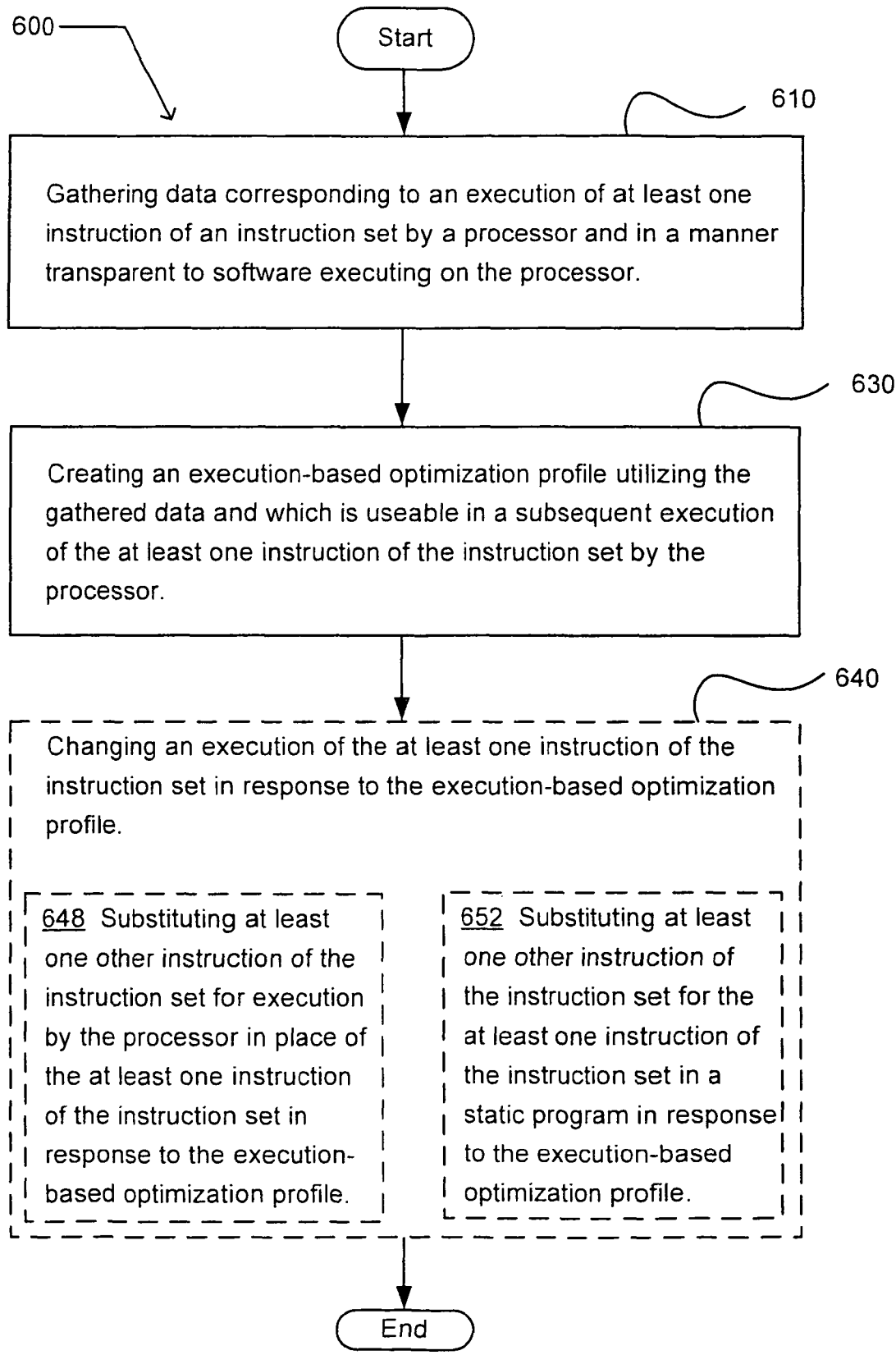
FIG. 12 illustrates a further alternative embodiment of the exemplary operational flow of FIGS. 9 and 11.

FIG. 12 illustrates a further alternative embodiment of the exemplary operational flow 600 of FIGS. 9 and 11. The modification operation 640 may include at least one additional operation. The at least one additional operation may include an operation 648, and/or an operation 652. The operation 648 substitutes at least one other instruction of the instruction set for execution by the processor in place of the at least one instruction of the instruction set in response to the execution-based optimization profile. The operation 652 substitutes at least one other instruction of the instruction set for the at least one instruction of the instruction set in a static program in response to the execution-based optimization profile.

Figure 13:
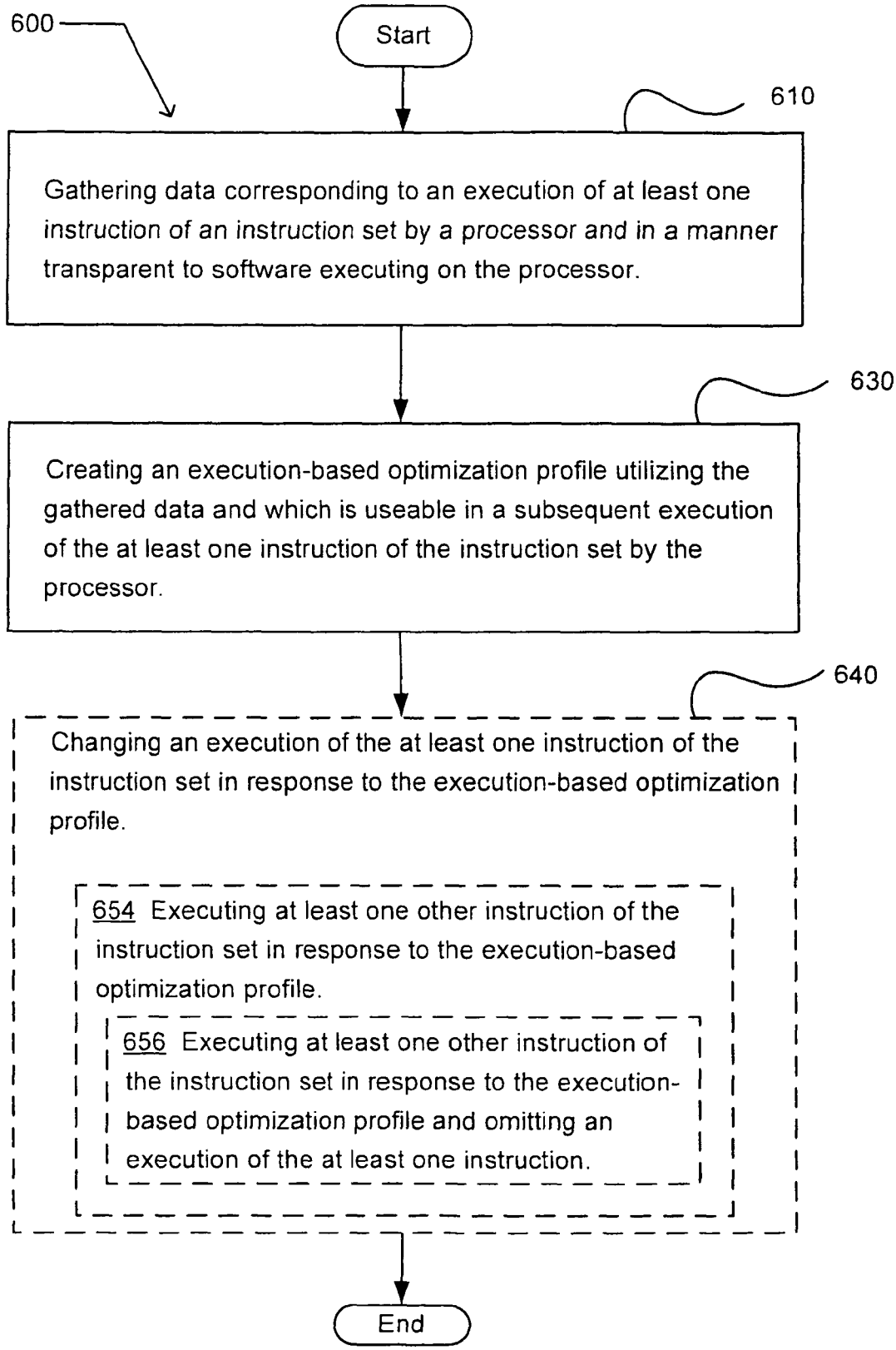
FIG. 13 illustrates an alternative embodiment of the exemplary operational flow of FIGS. 9 and 11.

FIG. 13 illustrates an alternative embodiment of the exemplary operational flow 600 of FIGS. 9 and 11. The modification operation 640 may include at least one additional operation. The at least one additional operation may include an operation 654. The operation 654 executes at least one other instruction of the instruction set in response to the execution-based optimization profile. The operation 654 may include at least one additional operation, such as an operation 656. The operation 656 executes at least one other instruction of the instruction set in response to the execution-based optimization profile and omits an execution of the at least one instruction.

Figure 14:
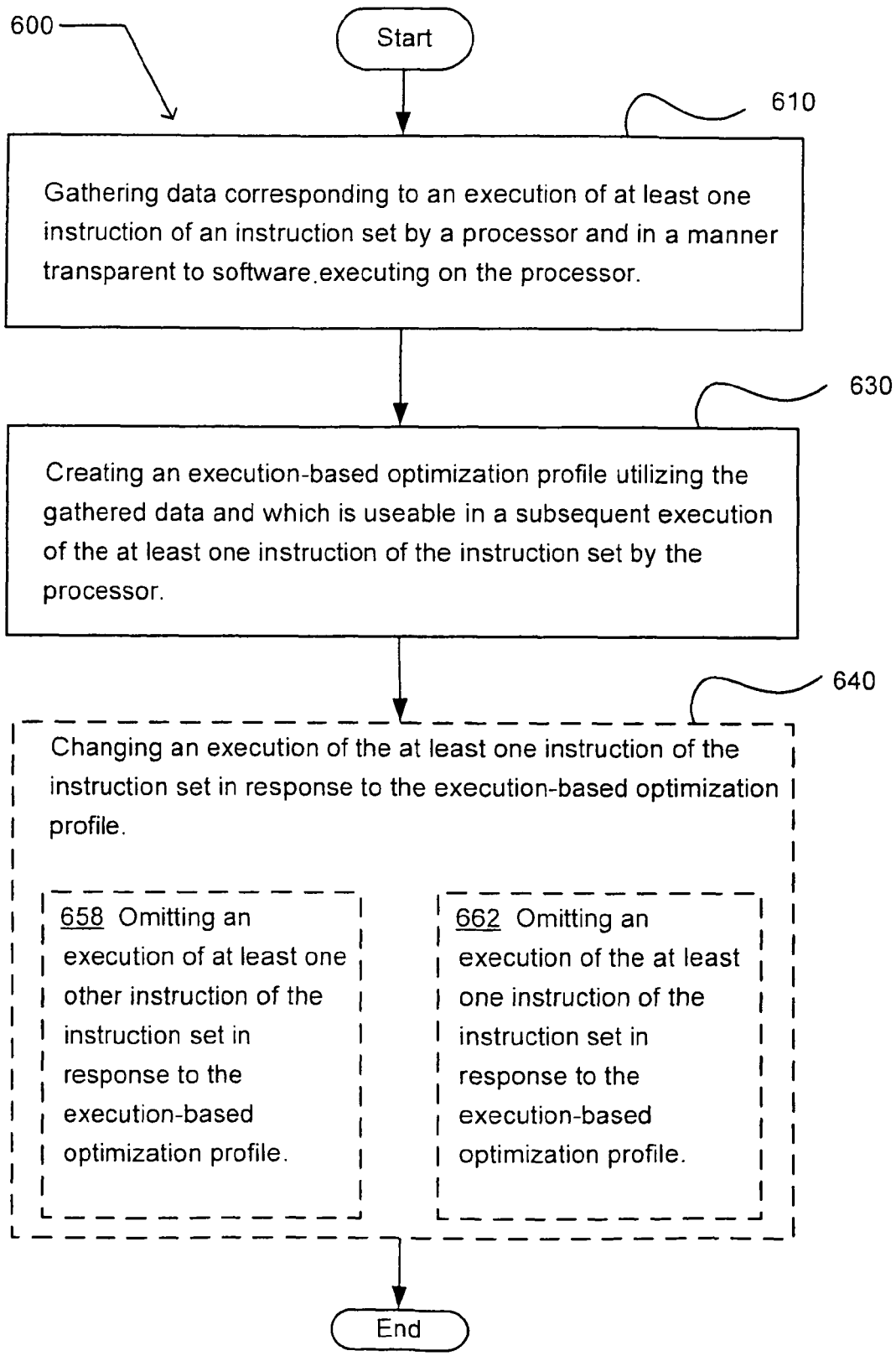
FIG. 14 illustrates another alternative embodiment of the exemplary operational flow of FIGS. 9 and 11.

FIG. 14 illustrates another alternative embodiment of the exemplary operational flow 600 of FIGS. 9 and 11. The modification operation 640 may include at least one additional operation. The at least one additional operation may include an operation 658, and/or an operation 662. The operation 658 omits an execution of at least one other instruction of the instruction set in response to the execution-based optimization profile. The operation 662 omits an execution of the at least one instruction of the instruction set in response to the execution-based optimization profile.

Figure 15:
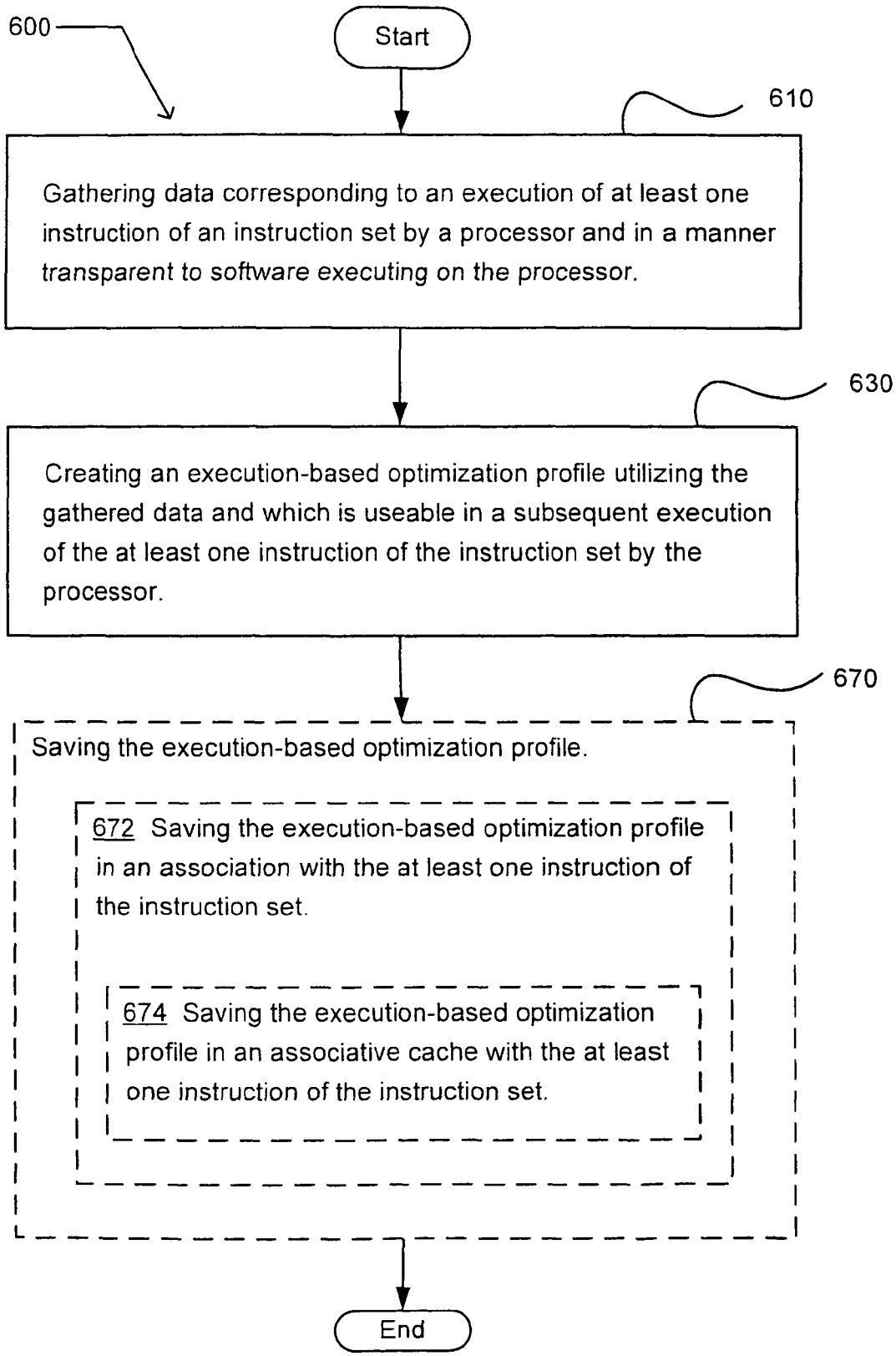
FIG. 15 illustrates another alternative embodiment of the exemplary operational flow of FIG. 9.

FIG. 15 illustrates another alternative embodiment of the exemplary operational flow 600 of FIG. 9. The operational flow may include at least one additional operation, such as the operation 670. The operation 670 saves the execution-based optimization profile. The operation 670 may include at least one additional operation, such as the operation 672. The operation 672 saves the execution-based optimization profile in an association with the at least one instruction of the instruction set. The operation 672 may include at least one additional operation, such as the operation 674. The operation 674 saves the execution-based optimization profile in an associative cache with the at least one instruction of the instruction set.

Figure 16:
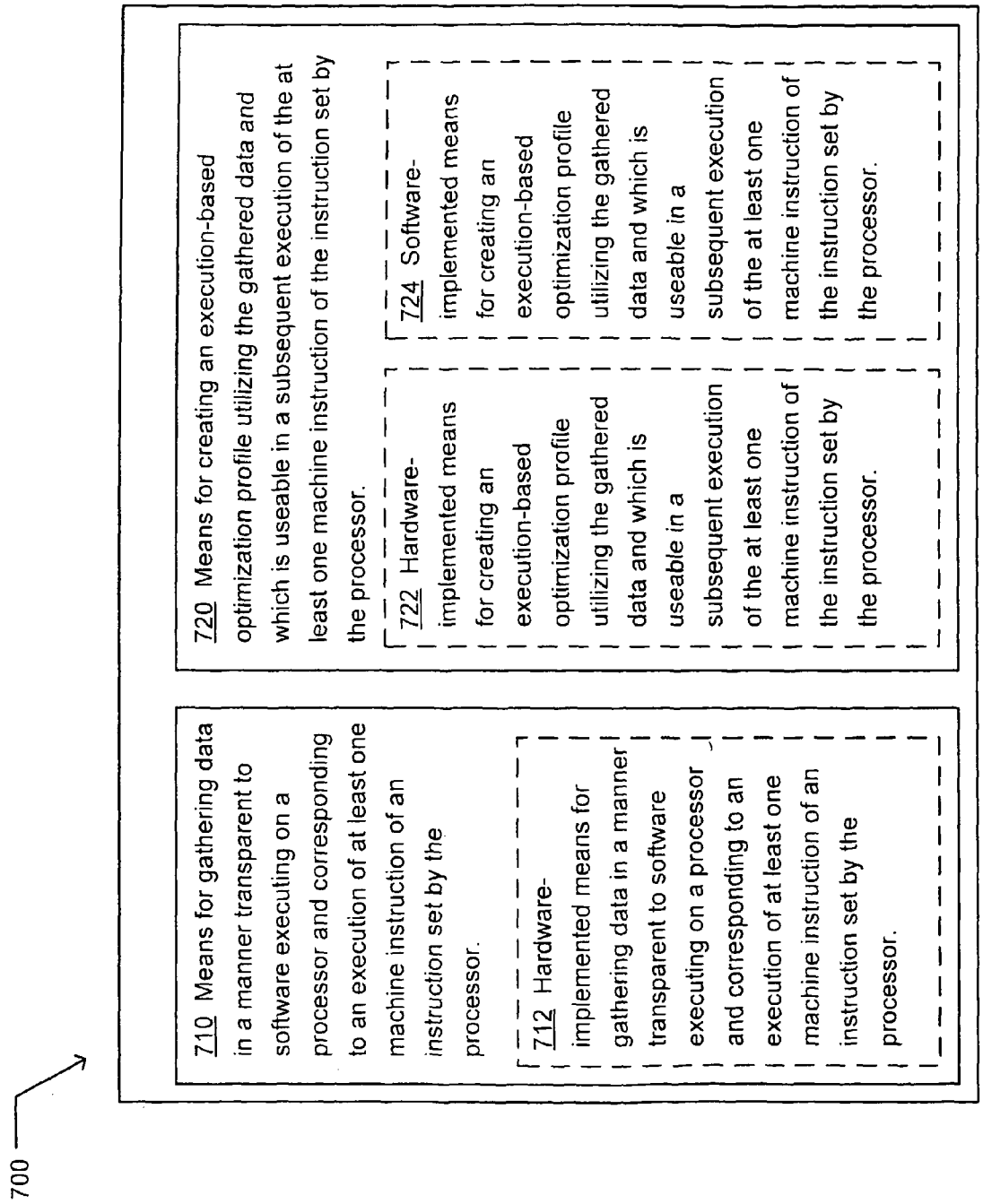
FIG. 16 illustrates a partial view of an exemplary device in which embodiments may be implemented.

FIG. 16 illustrates a partial view of an exemplary device 700 in which embodiments may be implemented. The device includes means 710 for gathering data in a manner transparent to software executing on the processor and corresponding to an execution of at least one machine instruction of an instruction set by the processor. The device includes means 720 for creating an execution-based optimization profile utilizing the gathered data and which is useable in a subsequent execution of the at least one machine instruction of the instruction set by the processor.

In an alternative embodiment the means 710 includes hardware-implemented means 712 for gathering data in a manner transparent to software executing on a processor and corresponding to an execution of at least one machine instruction of an instruction set by the processor. In another alternative embodiment, the means 720 may include at least one additional means. The at least one additional means may include hardware-implemented means 722 for creating an execution-based optimization profile utilizing the gathered data and which is useable in a subsequent execution of the at least one machine instruction of the instruction set by the processor. The at least one additional means may include software-implemented means 724 for creating an execution-based optimization profile utilizing the gathered data and which is useable in a subsequent execution of the at least one machine instruction of the instruction set by the processor.

Figure 17:
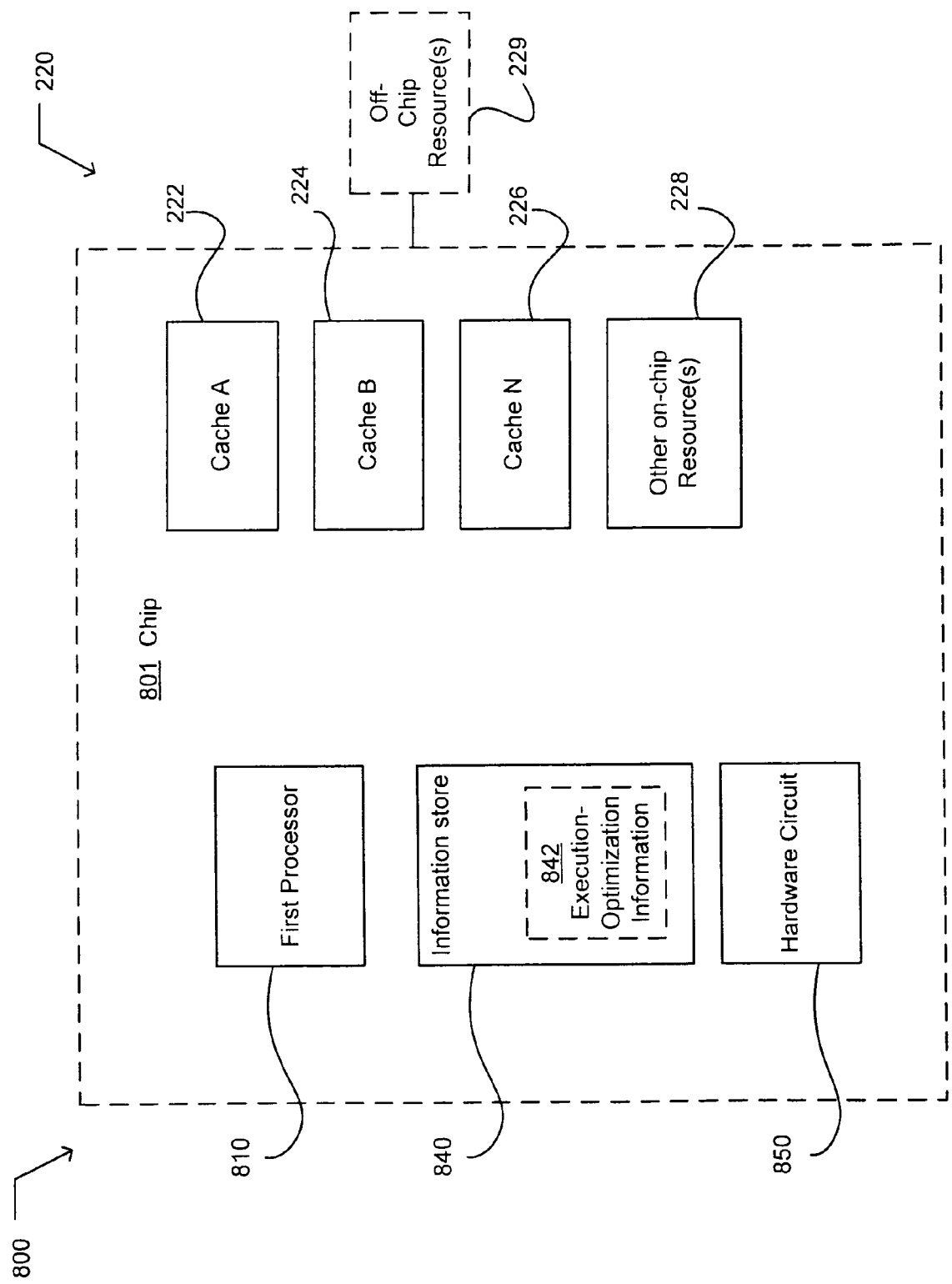
FIG. 17 illustrates a partial view of an exemplary device in which embodiments may be implemented.

FIG. 17 illustrates a partial view of an exemplary device 800 in which embodiments may be implemented. The device includes an information store 840 operable to save an execution-optimization information 842, a first processor 810, and a hardware circuit 850. The hardware circuit includes a circuit for altering an execution of a program by the first processor in response to the execution-optimization information. The execution-optimization information includes execution-optimization information created by a hardware device utilizing data collected from a second processor (not shown). The collected data corresponding to a previous runtime execution by the second processor of at least a portion of the program that was transparent to any software executing on the second processor.

In an embodiment, the execution-optimization information 842 may include the execution-optimization information generated by the execution-optimization synthesizer 250 of FIG. 2. In another embodiment, the execution-optimization information may include at least one of the ghost pages 272, the execution-optimization information 274, and/or the execution-optimization profile 276 described in conjunction with FIGS. 2 and 3. In an alternative embodiment, the first processor 810 includes a first processor operable to execute an instruction set and operably coupled to the information store 840. In another embodiment, the hardware circuit for altering an execution of a program includes a hardware circuit for altering an execution of a program and operably coupled to the information store. In a further embodiment, the hardware circuit includes a hardware circuit operably coupled to the processor.

In an embodiment, the hardware circuit 850 includes a hardware circuit for copying the execution-optimization information from the information store to a memory operably coupled to the first processor. For example, the memory operably coupled to the first processor may include the hardware resource 220, such as the on-chip cache B 224, or the off-chip resource 229, such as an off-chip cache or an outboard memory or an outboard storage.

In a further embodiment, the hardware circuit 850 for altering an execution of a program by the first processor 810 in response to the execution-optimization information includes a hardware circuit for causing an alteration of an execution of at least one instruction of an instruction set of a static program by the first processor in response to the execution-optimization information. In another embodiment, the altering an execution of a program by the first processor in response to the execution-optimization information includes altering an execution of at least one instruction of an instruction set of a dynamic program by the first processor in response to the execution-optimization information. In a further embodiment, the altering an execution of a program by the first processor in response to the execution-optimization information includes altering a context of an execution of a program by the first processor in response to the execution-optimization information.

In an embodiment, the hardware circuit for altering an execution of a program by the first processor in response to the execution-optimization information includes a hardware circuit for altering an execution of at least one instruction of an instruction set of a program by the first processor in response to the execution-optimization information. In another embodiment, the hardware circuit for altering an execution of a program by the first processor in response to the execution-optimization information includes a hardware circuit for altering a movement of data with respect to the first processor in response to the execution-optimization information. In a further embodiment, the hardware circuit for altering an execution of a program by the first processor in response to the execution-optimization information includes a hardware circuit for altering a movement of at least one instruction of the program toward the first processor in response to the execution-optimization information.

In some instances, the altering an execution of a program by the first processor in response to the execution-optimization information may include directly altering an execution of a program by the first processor in response to the execution-optimization information. In other instances, the altering an execution of a program by the first processor in response to the execution-optimization information may include causing an alteration of an execution of a program by the first processor in response to the execution-optimization information. In further instances, the altering an execution of a program by the first processor in response to the execution-optimization information may include initiating an alteration of an execution of a program by the first processor in response to the execution-optimization information.

In an embodiment, the execution-optimization information includes execution-optimization information created by a hardware device (not shown) utilizing data collected from a second processor (not shown) that is at least substantially a same processor as the first processor 810. For example, the execution-optimization information used to alter a current execution of a program by the first processor 810 may have been created during a prior execution of the program by the first processor. In another embodiment, the execution-optimization information includes an execution-optimization information created by a hardware device utilizing data collected from a second processor that is at least a substantially different processor from the first processor. For example, the execution-optimization information used to alter a current execution of a program by the first processor may have been created during a prior execution of the program by a completely different second processor, which may be a processor running in a completely different computing device.

In an embodiment, the information store includes at least a portion of a cache. In another embodiment, the information store includes at least one of an I-cache or a D-cache. In a further embodiment, the information store includes at least one of a volatile memory or a non-volatile memory. In a further embodiment, the information store includes a computer readable medium. In another embodiment, the information store may include a non-volatile outboard storage, such as magnetic disk storage.

In another embodiment, the first processor 810 and the hardware circuit 850 are formed on a single chip, illustrated as a single chip 801. In a further embodiment, the first processor 810 and the information store 840 are formed on a single chip, illustrated as a single chip 801.

Figure 18:
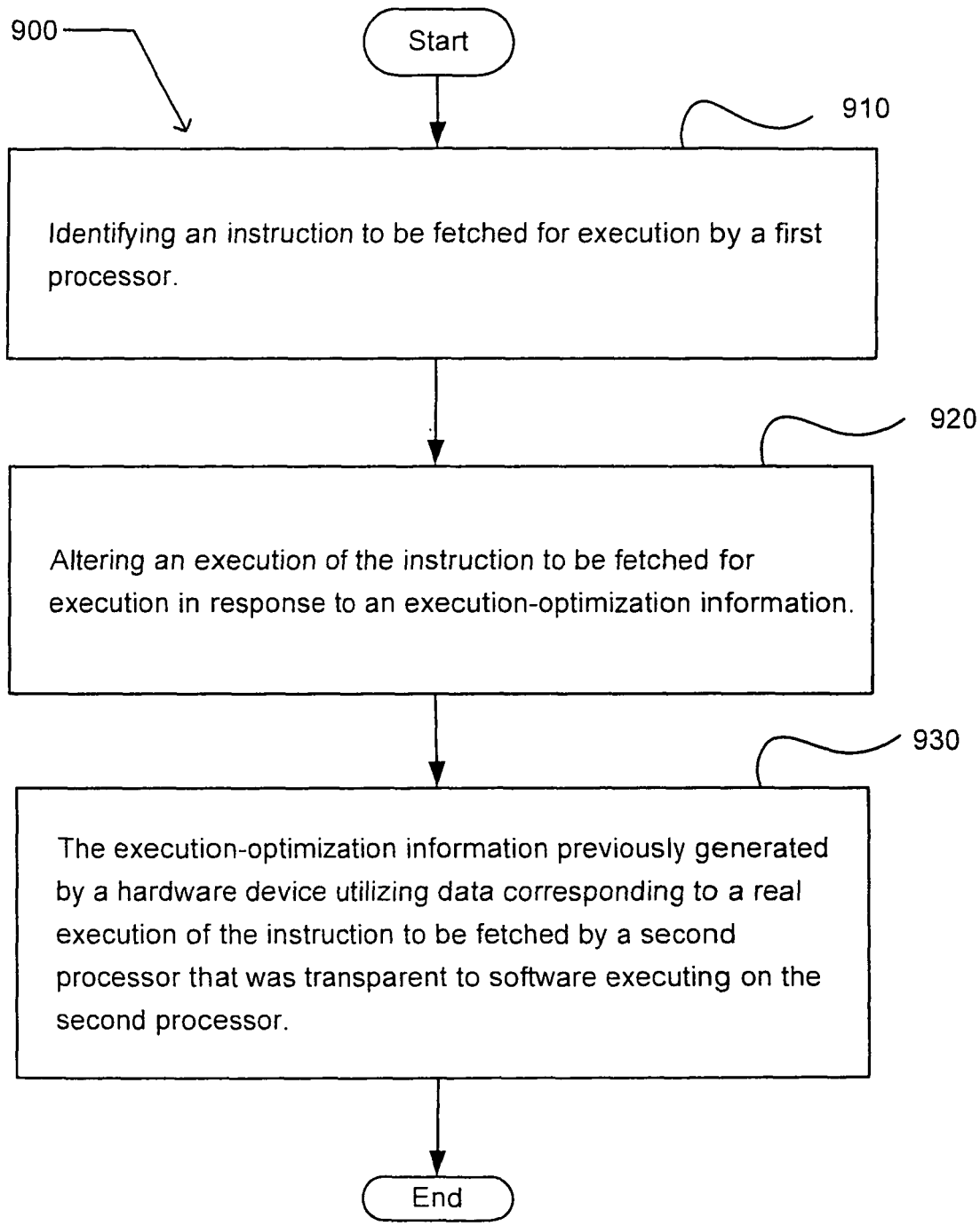
FIG. 18 illustrates an exemplary operational flow that may implement embodiments.

FIG. 18 illustrates an exemplary operational flow 900 that may implement embodiments. In an embodiment, the operational flow may be implemented in the computing system environment 100 of FIG. 1, and/or the device 800 of FIG. 17. After a start operation, the operational flow moves to an instruction determination operation 910. The instruction determination operation identifies an instruction to be fetched for execution by a first processor. An optimization operation 920 alters an execution of the instruction to be fetched for execution in response to an execution-optimization information. The execution-optimization information 930 was previously generated by a hardware device utilizing data corresponding to a real execution of the instruction to be fetched by a second processor that was transparent to software executing on the second processor. The flow then moves to an end operation.

Figure 19:
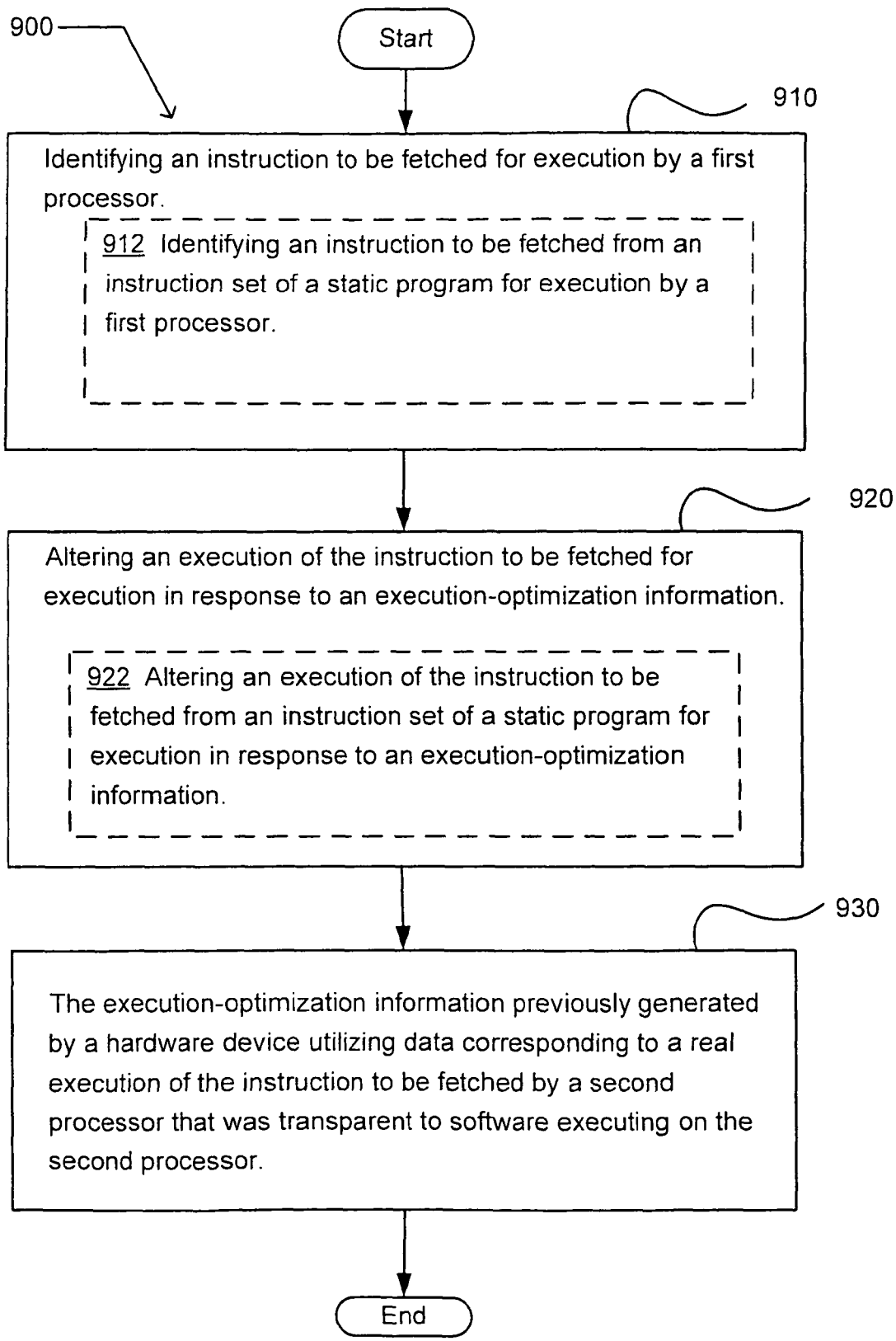
FIG. 19 illustrates an alternative embodiment of the exemplary operational flow of FIG. 18.

FIG. 19 illustrates an alternative embodiment of the exemplary operational flow 900 of FIG. 18. The instruction determination operation 910 may include at least one additional operation, such as an operation 912. The operation 912 identifies an instruction to be fetched from an instruction set of a static program for execution by a first processor. The optimization operation 920 may include at least one additional operation, illustrated as the operation 922. The operation 922 alters an execution of the instruction to be fetched from an instruction set of a static program for execution in response to an execution-optimization information.

Figure 20:
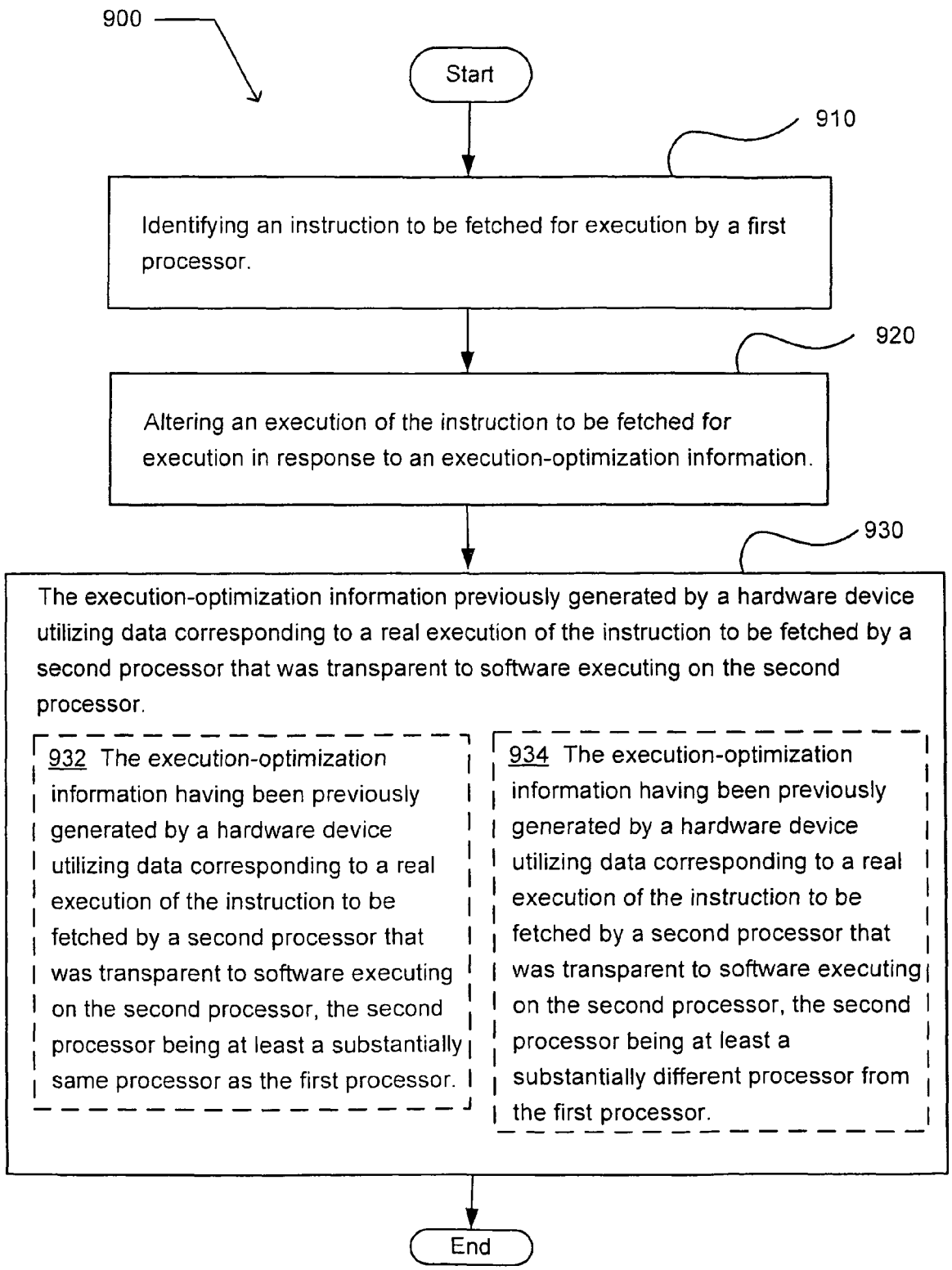
FIG. 20 illustrates an alternative embodiment of the exemplary operational flow of FIG. 18.

FIG. 20 illustrates an alternative embodiment of the exemplary operational flow 900 of FIG. 18. The execution-optimization information 930 may include at least one additional embodiment. The at least one additional embodiment may include an execution-optimization information 932 and/or an execution-optimization information 934. The execution-optimization information 932 includes execution-optimization information having been previously generated by a hardware device utilizing data corresponding to a real execution of the instruction to be fetched by a second processor that was transparent to software executing on the second processor, the second processor being at least a substantially same processor as the first processor. The execution-optimization information 934 may include an execution-optimization information having been previously generated by a hardware device utilizing data corresponding to a real execution of the instruction to be fetched by a second processor that was transparent to software executing on the second processor, the second processor being at least a substantially different processor from the first processor. In an embodiment, the second processor may be a processor of a multiprocessor computing device that includes the first processor. In another embodiment, the second processor may be a processor of a second computing device that is a separate and a distinct computing device from a first computing device that includes the first processor.

Figure 21:
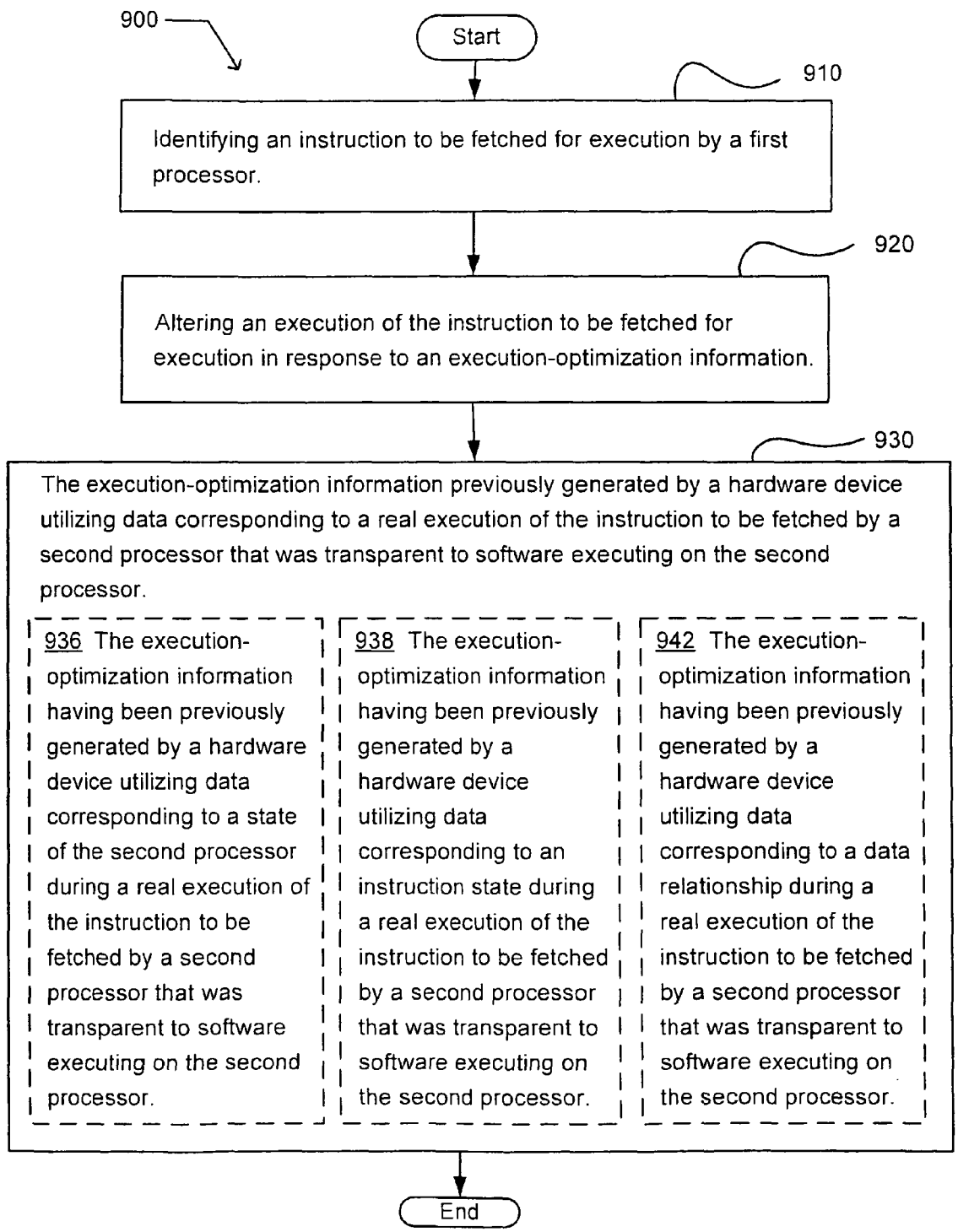
FIG. 21 illustrates an alternative embodiment of the exemplary operational flow of FIG. 18.

FIG. 21 illustrates an alternative embodiment of the exemplary operational flow 900 of FIG. 18. The execution-optimization information 930 may include at least one additional embodiment. The at least one additional embodiment may include an execution-optimization information 936, an execution-optimization information 938, and/or an execution-optimization information 942. The execution-optimization information 936 includes an execution-optimization information having been previously generated by a hardware device utilizing data corresponding to a state of the second processor during a real execution of the instruction to be fetched by a second processor that was transparent to software executing on the second processor. The execution-optimization information 938 includes an execution-optimization information having been previously generated by a hardware device utilizing data corresponding to an instruction state during a real execution of the instruction to be fetched by a second processor that was transparent to software executing on the second processor. The execution-optimization information 942 includes an execution-optimization information having been previously generated by a hardware device utilizing data corresponding to a data relationship during a real execution of the instruction to be fetched by a second processor that was transparent to software executing on the second processor.

Figure 22:
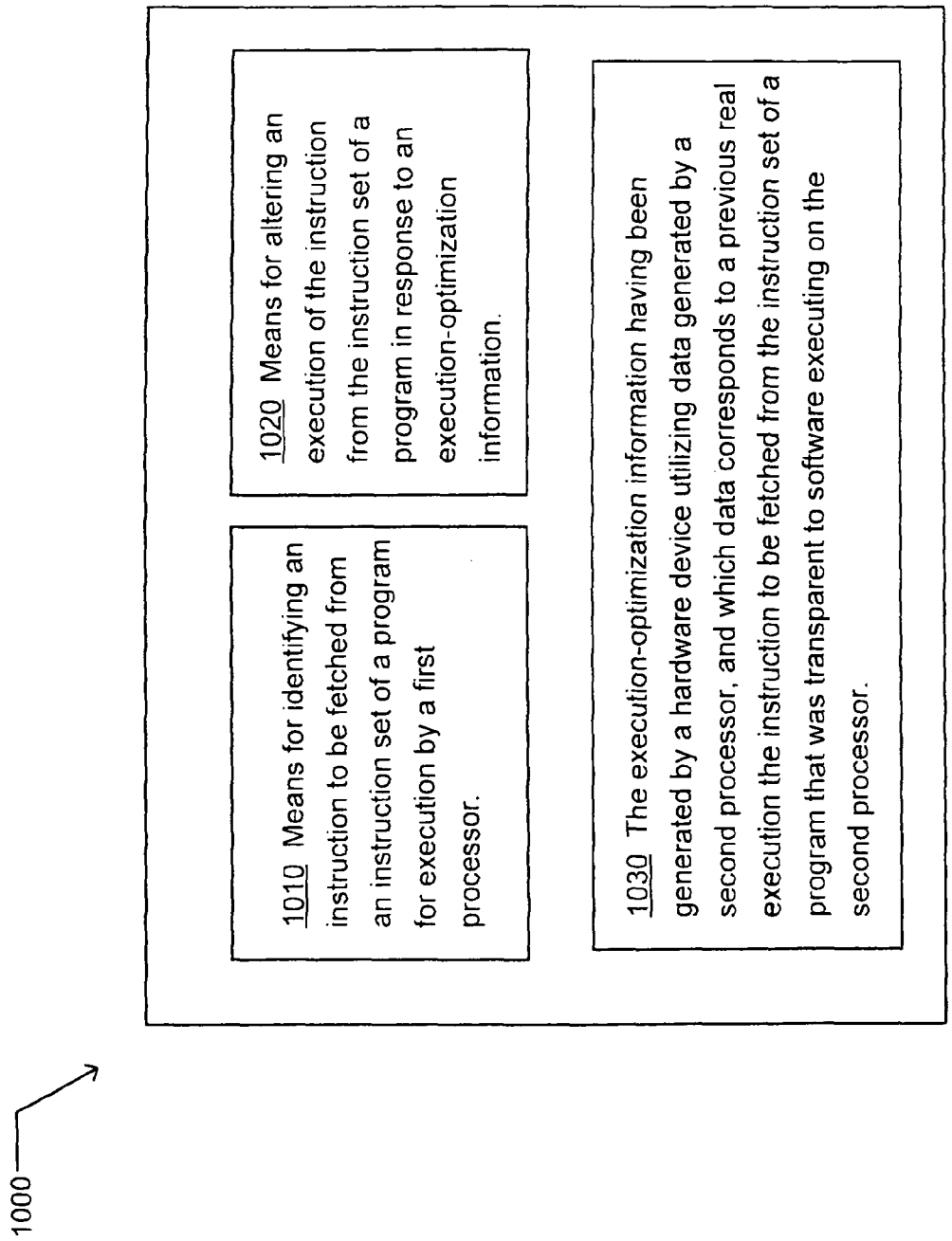
FIG. 22 illustrates a partial view of an exemplary device in which embodiments may be implemented.

FIG. 22 illustrates a partial view of an exemplary device 1000 in which embodiments may be implemented. The device includes means 1010 for identifying an instruction to be fetched from an instruction set of a program for execution by a first processor. The device also includes means 1020 for altering an execution of the instruction from the instruction set of a program in response to an execution-optimization information. The execution-optimization information 1030 having been generated by a hardware device utilizing data generated by a second processor, and which data corresponds to a previous real execution the instruction to be fetched from the instruction set of a program that was transparent to software executing on the second processor.

Figure 23:
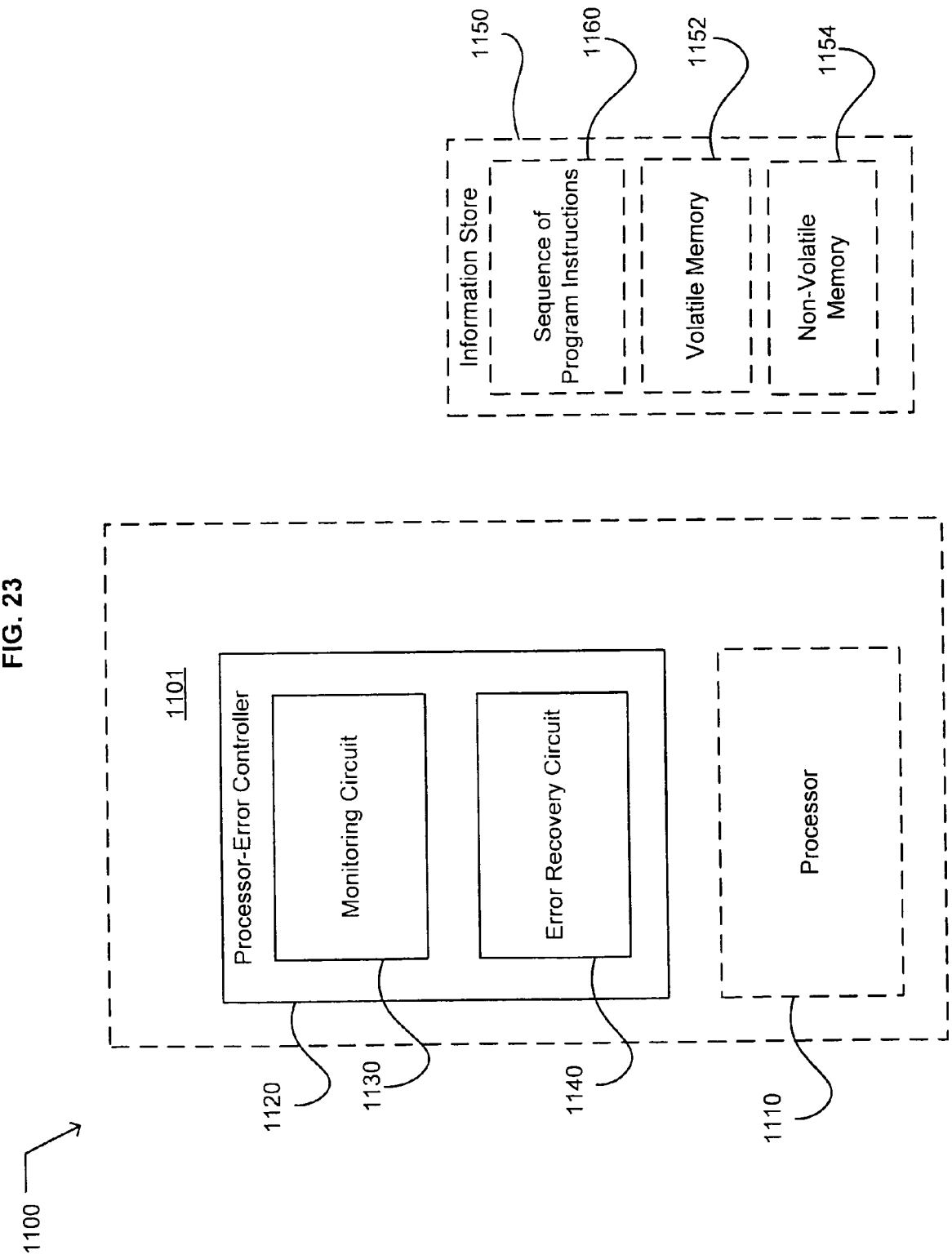
FIG. 23 illustrates a partial view of an exemplary computing environment that includes a computer processor-error controller in which embodiments may be implemented.

FIG. 23 illustrates a partial view of an exemplary computing environment 1100 that includes a computer processor-error controller 1120 in which embodiments may be implemented. The computer processor-error controller includes a monitoring circuit 1130 and an error recovery circuit 1140. The monitoring circuit is operable to detect a computational error corresponding to an execution of a second instruction by a processor 1110 operable to execute a sequence of program instructions 1160. The sequence of program instructions includes a first instruction that is fetched before the second instruction. The error recovery circuit is operable to restore an execution of the sequence of program instructions to the first instruction in response to the detected computational error.

In an embodiment, a computational error includes an error introduced during computation. In another embodiment, a computational error includes a setup/hold violation, also known as a setup and hold time requirement violation for a transistor. For example, in an embodiment, a transistor of the processor 1110 has input requirements. A setup and hold time defines a window of time during which the input of the transistor must be valid and stable in order to assure valid data at the output of the transistor. Setup is a time that the input must be valid before the transistor samples. Hold time is a time the input must be maintained valid while the transistor samples. In a further embodiment, a setup and hold violation may include valid values, but the values occur outside the window of time. In another embodiment, a setup and hold violation may include an invalid value that occurs within the window of time. In a further embodiment, a computational error includes at least one of a computational error corresponding to a processor clock speed, a processor voltage, a processor temperature, a noise spike, a charged particle, a soft error, an unreliable processor hardware, an incorrectly executed instruction, and/or an electromigration induced error.

Program instructions are generally fetched in a sequence or order for execution by the processor 1110. A first instruction of the sequence of program instructions 1160 may execute, but a second instruction of the sequence may not execute because of a processor computational error. The monitoring circuit 1130 is operable to detect a computational error corresponding to an execution of the second instruction. Rather than losing the entire execution of the sequence of program instructions because of the computational error, the error recovery circuit is operable to restore an execution of the sequence of program instructions to the first instruction in response to the detected computational error. Execution of the sequence of program instructions then restarts from the first instruction. Means for designating the first instruction are described below.

In an embodiment, the monitoring circuit 1130 further includes a monitoring circuit implemented in hardware and operable to detect a computational error corresponding to an execution of a second instruction by a processor operable to execute a sequence of program instructions that includes a first instruction that is fetched before the second instruction. Any technique known by those skilled in the art may be used to implement the monitoring circuit in hardware. In another embodiment, the monitoring circuit further includes a monitoring circuit implemented in a dynamic implementation verification architecture (DIVA) and operable to detect a computational error corresponding to an execution of a second instruction by a processor operable to execute a sequence of program instructions that includes a first instruction that is fetched before the second instruction. Examples of a DIVA architecture approach can be found in T. Austin, *DIVA: A Reliable Substrate for Deep Submicron Microarchitecture Design*, printed on Feb. 6, 2006, and located at http://www.huron.ucdavis.edu/micro32/presentations/p_austin.pdf; S. Chatterjee, *Efficient Checker Processor Design*, printed on Feb. 6, 2006, and located at http://www.eecs.umich.edu/~taustin/papers/MICRO33-divadesign.pdf, each of which is incorporated herein by reference. In a further embodiment, the monitoring circuit may includes a hardware implemented monitoring circuit employing a TEATime execution checker algorithm architecture and operable to detect a computational error corresponding to an execution of a second instruction by a processor operable to execute a sequence of program instructions that includes a first instruction that is fetched before the second instruction. The TEATime execution checker algorithm architecture may also be known as a Timing Error Avoidance system. Examples of a TEATime execution checker algorithm approach can be found in United States patent application entitled SYSTEM AND METHOD OF DIGITAL SYSTEM PERFORMANCE ENHANCEMENT, naming Augustus K. Uht as inventor and published as US 2004/0174944 A1; G. Uht and R. Vaccaro, *Adaptive Computing ( . . . via Timing Error Avoidance)*, printed on Feb. 6, 2006, and located at http://www.lems.brown.edu/~iris/BARC2005/Webpage/BARCpresentations/uht.pdf; A. Uht and R. Vaccaro, *TEAPC: Adaptive Computing and Underclocking in a Real PC*, printed on Feb. 6, 2006, and located at http://www.ele.uri.edu/~uht/papers/MuRI-TR-20041027.pdf; A. Uht, *TEAtime: Timing Error Avoidance for Performance Enhancement and Environment Adaptation*, printed on Feb. 6, 2006, and located at www.ele.uri.edu/~uht/talks/TEAtimeroadshow2003.Dist.pdf; A, Uht, *Uniprocessor Performance Enhancement Through Adaptive Clock Frequency Control*, printed on Feb. 6, 2006, and located at http://www.ele.uri.edu/~uht/papers/SSGRR2003wFnlUht.pdf, each of which is incorporated herein by reference. In another embodiment, the monitoring circuit may be implemented in a RAZOR architectural approach. An example of a RAZOR architecture approach can be found in D. Ernst et al., *Razor: A Low-Power Pipeline Based on Circuit-Level Timing Speculation*, printed on Jul. 7, 2006, and located at http://www.gigascale.org/pubs/426/razor.submit.authors.pdf, which is incorporated herein by reference.

In an embodiment, the monitoring circuit 1130 further includes a hardware implemented monitoring circuit employing another processor (not shown) operable to execute the second instruction substantially in parallel with the processor 1110. The monitoring circuit also is operable to detect a computational error corresponding to an execution of a second instruction by the processor by correlating an output of the processor with the output of the another processor. In another embodiment, the monitoring circuit further includes a hardware implemented monitoring circuit operable to detect a computational error corresponding to a setup/hold violation occurring in a processor operable to execute a sequence of program instructions that includes a first instruction that is fetched before the second instruction.

In an embodiment, error recovery circuit 1140 includes an error recovery circuit operable to restore an execution of the sequence of program instructions to a logical state associated with the first instruction in response to the detected computational error. In a further embodiment, the error recovery circuit includes an error recovery circuit implemented in at least one of hardware, software, firmware, and/or a microengine, and operable to restore an execution of the sequence of program instructions to the first instruction in response to the detected computational error. In another embodiment, the error recovery circuit includes an error recovery circuit implemented in software associated with at least one of an operating system or a program executable by the processor and operable to restore an execution of the sequence of program instructions to the first instruction in response to the detected computational error. For example, in an embodiment, the error recovery circuit detects a computational error and hands off recovery from the error to an operating system that includes the error recovery circuit. In a further embodiment, the error recovery circuit includes an error recovery circuit operable to designate the first instruction as a checkpoint and to restore an execution of the sequence of program instructions to the checkpoint in response to the detected computational error. In an embodiment, the error recovery circuit includes an error recovery circuit operable to designate the first instruction as an instruction separated from the second instruction by a predetermined number of instructions and to restore an execution of the sequence of program instructions to the first instruction in response to the detected computational error. For example, a predetermined number of instructions may include a 5K instruction, a 10K instruction, a 25K instruction, or a 50K instruction spacing.

In another embodiment, the error recovery circuit 1140 includes an error recovery circuit operable to select the first instruction corresponding to a checkpoint protocol and to rollback an execution of the sequence of program instructions to the selected checkpoint in response to the detected computational error. In a further embodiment, the exemplary computing environment 1100 includes the controller 1120, the processor 1110, and an information store 1150. In another embodiment, the controller and the processor are formed on a single chip 1101.

Figure 24:
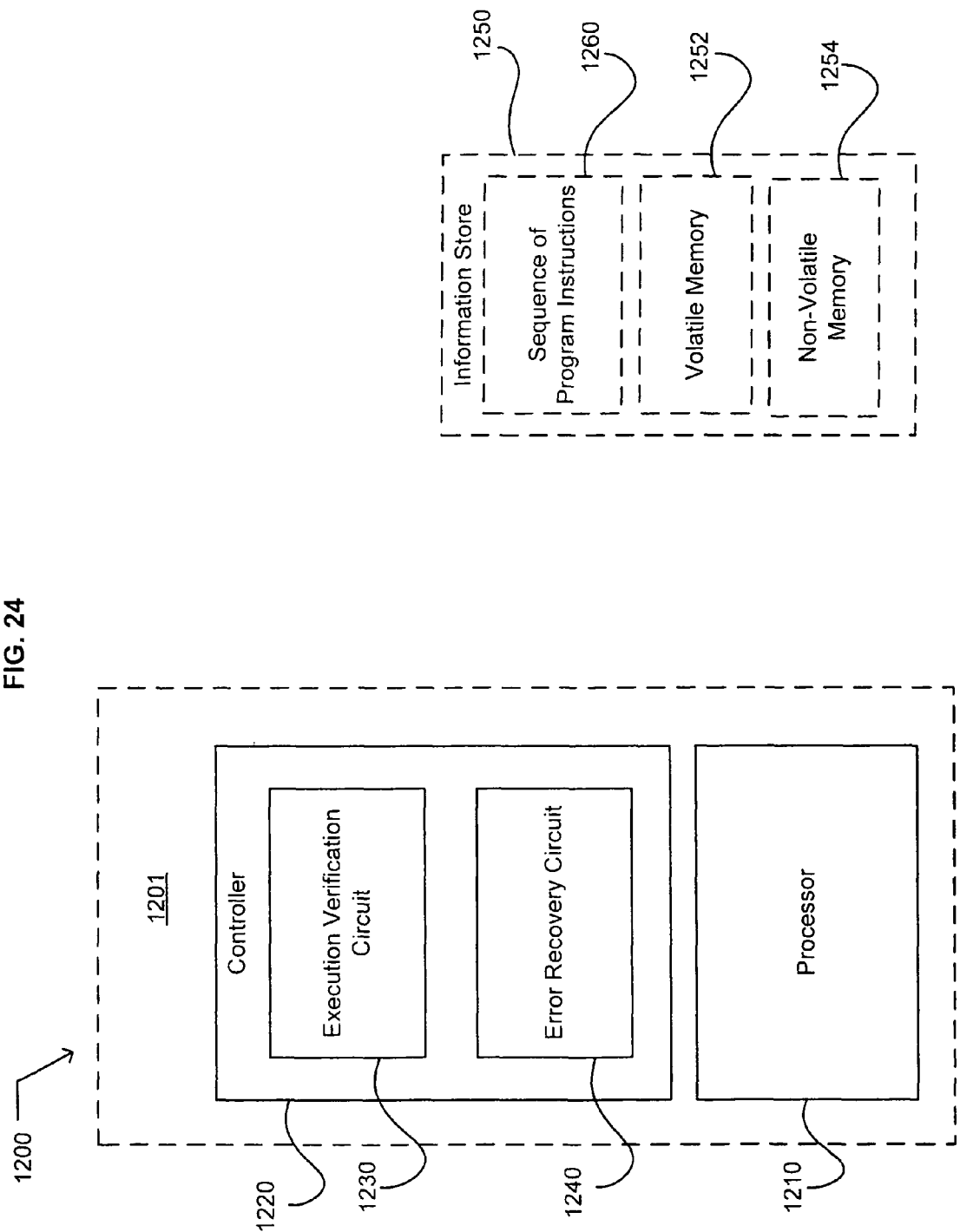
FIG. 24 illustrates a partial view of an exemplary computerized device 1200 in which embodiments may be implemented.

FIG. 24 illustrates a partial view of an exemplary computerized device 1200 in which embodiments may be implemented. The computerized device includes a processor 1210 and a controller 1220. The processor is operable to execute a sequence of program instructions 1250 having a fetch order that includes a first instruction that is fetched before a second instruction. The controller includes a hardware-implemented execution verification circuit 1230 and an error recovery circuit 1240. The hardware-implemented execution verification circuit is configured for detecting a computational error corresponding to an execution of the second instruction by the processor. The error recovery circuit is configured for rolling back an execution of the sequence of program instructions to the first instruction in response to the detected computational error.

In an embodiment, the controller further includes a controller that includes an error recovery circuit for at least one of initiating, activating, causing, facilitating, accomplishing, and/or achieving a rollback of an execution of the sequence of program instructions to the first instruction in response to the detected computational error. In another embodiment, the controller further includes a controller that includes an error recovery circuit implemented in at least one of hardware, software, firmware, and/or microengine for rolling back an execution of the sequence of program instructions to the first instruction in response to the detected computational error.

In an embodiment, the processor and the controller are formed on a same chip, illustrated as a chip 1201. In another embodiment, the computerized device 1200 further includes the processor 1210, the controller 1220, and an information store 1250.

Figure 25:
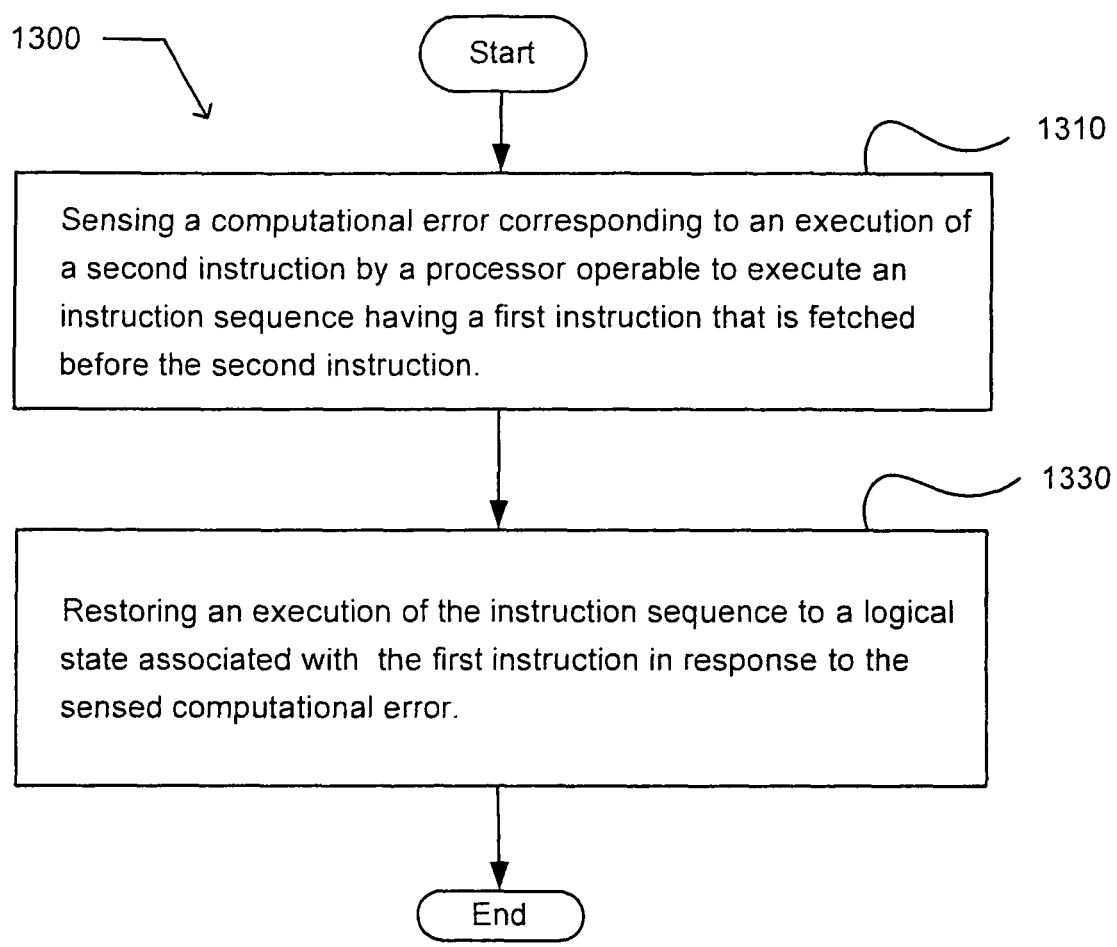
FIG. 25 illustrates an exemplary operational flow that may implement embodiments.

FIG. 25 illustrates an exemplary operational flow 1300 that may implement embodiments. After a start operation, the operational flow moves to a detecting operation 1310. The detecting operation senses a computational error corresponding to an execution of a second instruction by a processor operable to execute an instruction sequence having a first instruction that is fetched before the second instruction. In an embodiment, a computational error includes any failure of a processor to perform its intended function. For example, a computational error includes an incorrectly executed instruction. In another embodiment, a computational error includes a computational error occurring in a processor execution path. A computational error occurring in the processor execution path may include a error corresponding to a setup/hold violation, a timing error because a clock is running too fast, a voltage error because a processor voltage is too low, a noise spike, a soft error such as a single event upset failure, an unreliable processor hardware, an incorrectly executed instruction, and/or a charged particle. A charged particle may include a cosmic ray, an alpha particle, a thermal neutron, a neutron, proton, pion, and/or muon.

A recovery operation 1330 restores an execution of the instruction sequence to a logical state associated with the first instruction in response to the sensed computational error. The operational flow then moves to an end operation.

In an embodiment, the operational flow 1300 may be implemented in the computing system environment 1100 and the computer processor-error controller 1120 of FIG. 23, and/or in the exemplary computing device 1200 of FIG. 24.

Figure 26:
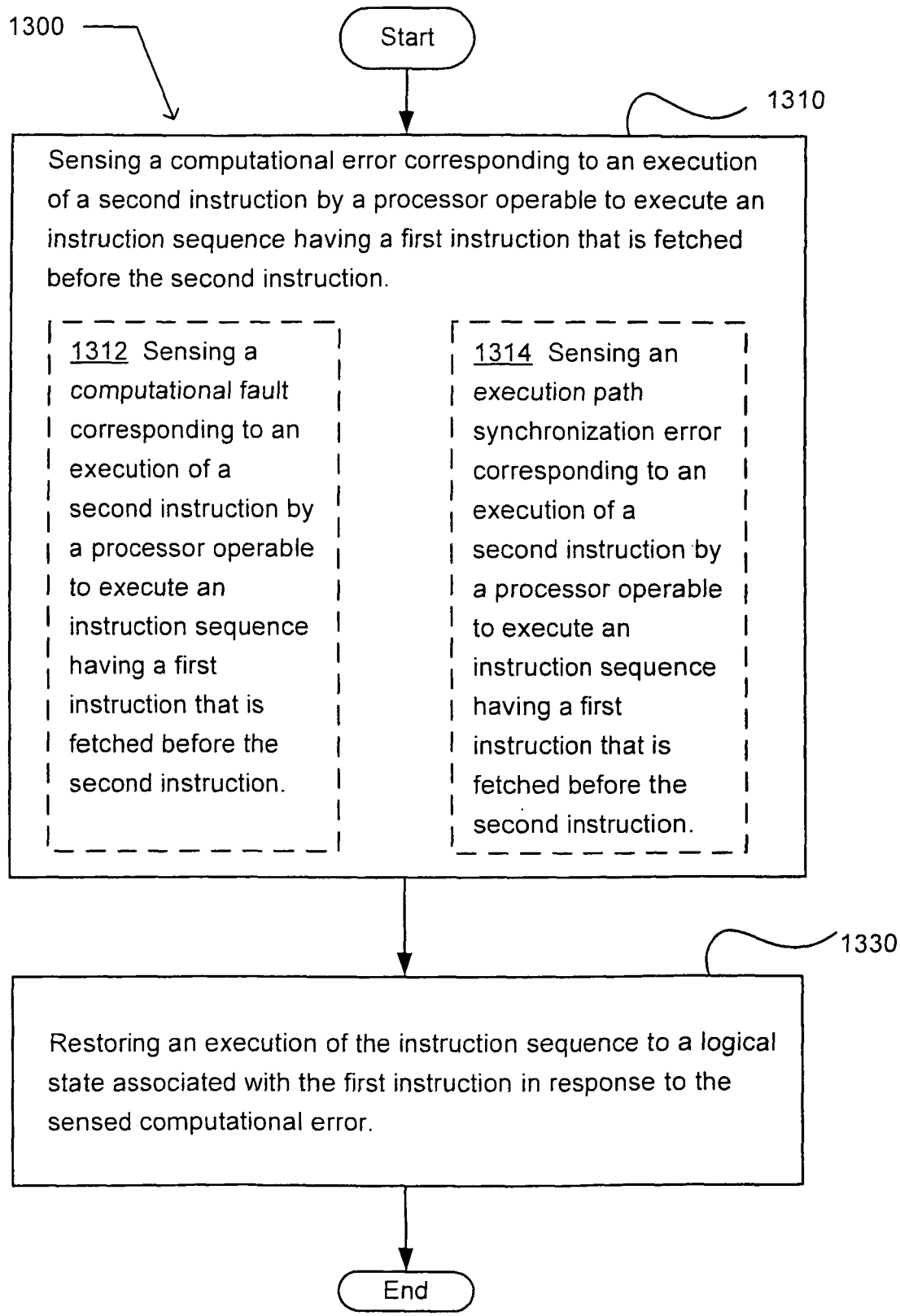
FIG. 26 illustrates another embodiment of the exemplary operational flow of FIG. 25.

FIG. 26 illustrates another embodiment of the exemplary operational flow 1300 of FIG. 25. The detecting operation 1310 may include at least one additional operation. The at least one additional operation may include an operation 1312 and/or an operation 1314. The operation 1312 senses a computational error corresponding to an execution of a second instruction by a processor operable to execute an instruction sequence having a first instruction that is fetched before the second instruction. The operation 1314 senses an execution path synchronization error corresponding to an execution of a second instruction by a processor operable to execute an instruction sequence having a first instruction that is fetched before the second instruction.

Figure 27:
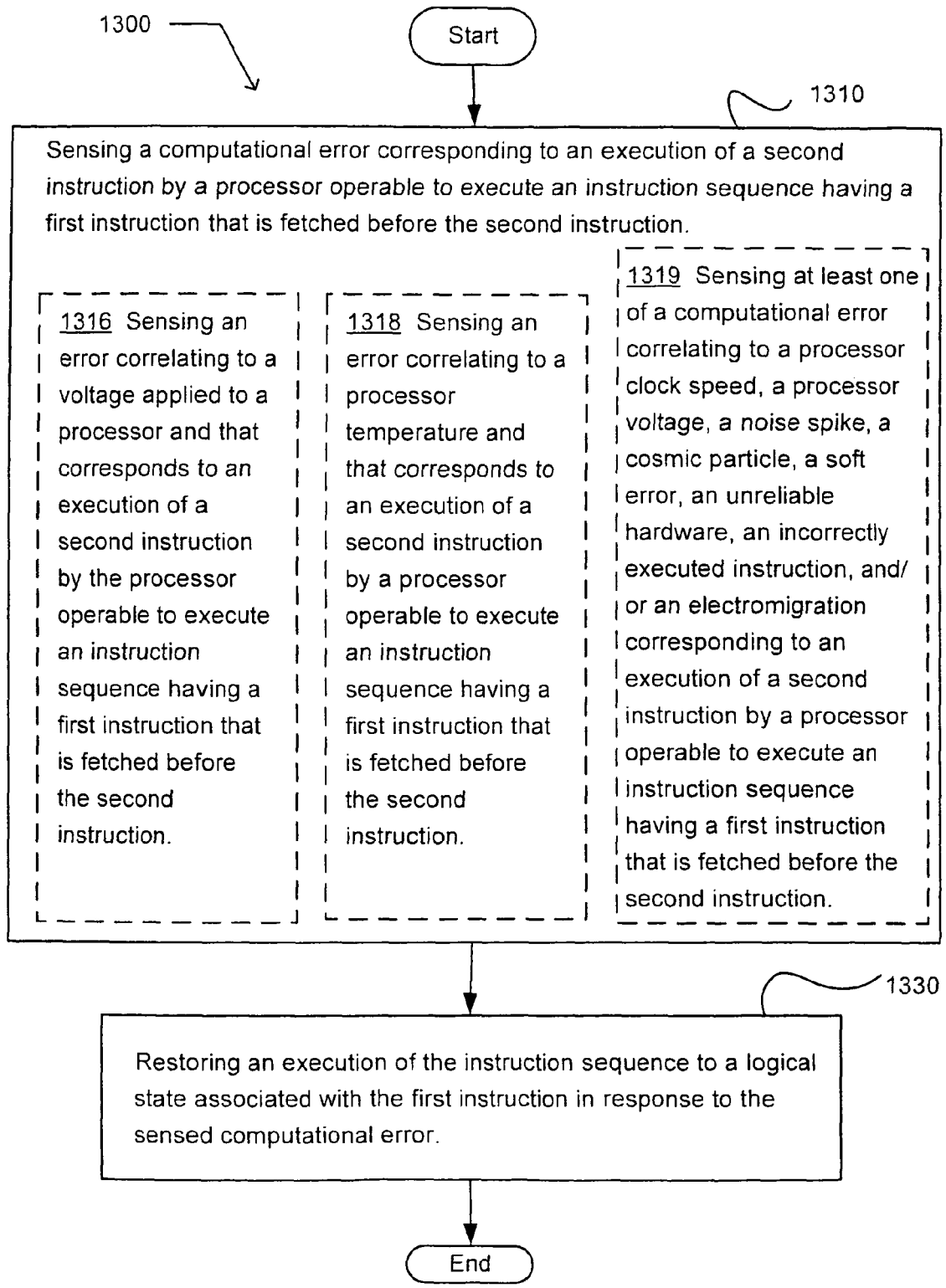
FIG. 27 illustrates another embodiment of the exemplary operational flow of FIG. 25.

FIG. 27 illustrates another embodiment of the exemplary operational flow 1300 of FIG. 25. The detecting operation 1310 may include at least one additional operation. The at least one additional operation may include an operation 1316, an operation 1318, and/or an operation 1319. The operation 1316 senses an error correlating to a voltage applied to a processor and that corresponds to an execution of a second instruction by the processor operable to execute an instruction sequence having a first instruction that is fetched before the second instruction. The voltage applied to the processor may include a processor core voltage, a processor associated cache voltage, and/or a buffer voltage. The operation 1318 senses an error correlating to a processor temperature and corresponding to an execution of a second instruction by a processor operable to execute an instruction sequence having a first instruction that is fetched before the second instruction. The operation 1319 senses at least one of a computational error corresponding to a processor clock speed, a processor voltage, a noise spike, a cosmic particle, a soft error, an unreliable hardware, an incorrectly executed instruction, and/or an electromigration induced error that corresponds to an execution of a second instruction by a processor operable to execute an instruction sequence having a first instruction that is fetched before the second instruction.

Figure 28:
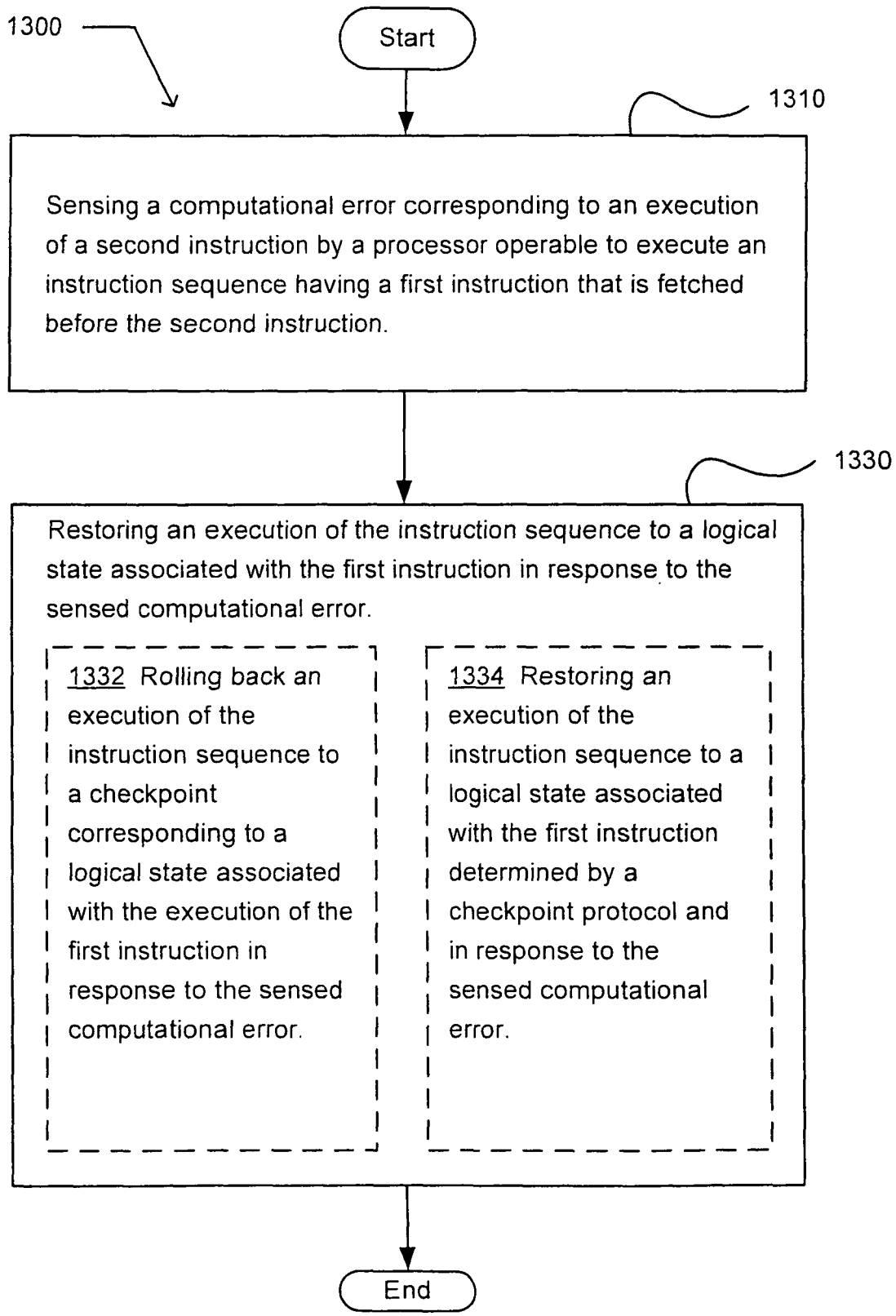
FIG. 28 illustrates another embodiment of the exemplary operational flow of FIG. 25.

FIG. 28 illustrates another embodiment of the exemplary operational flow 1300 of FIG. 25. The recovery operation 1330 may include at least one additional operation. The at least one additional operation may include an operation 1332, and/or an operation 1334. The operation 1332 rolls back an execution of the instruction sequence to a checkpoint corresponding to a logical state associated with the execution of the first instruction in response to the sensed computational error. The operation 1334 restores an execution of the instruction sequence to a logical state associated with the first instruction determined by a checkpoint protocol and in response to the sensed computational error.

Figure 29:
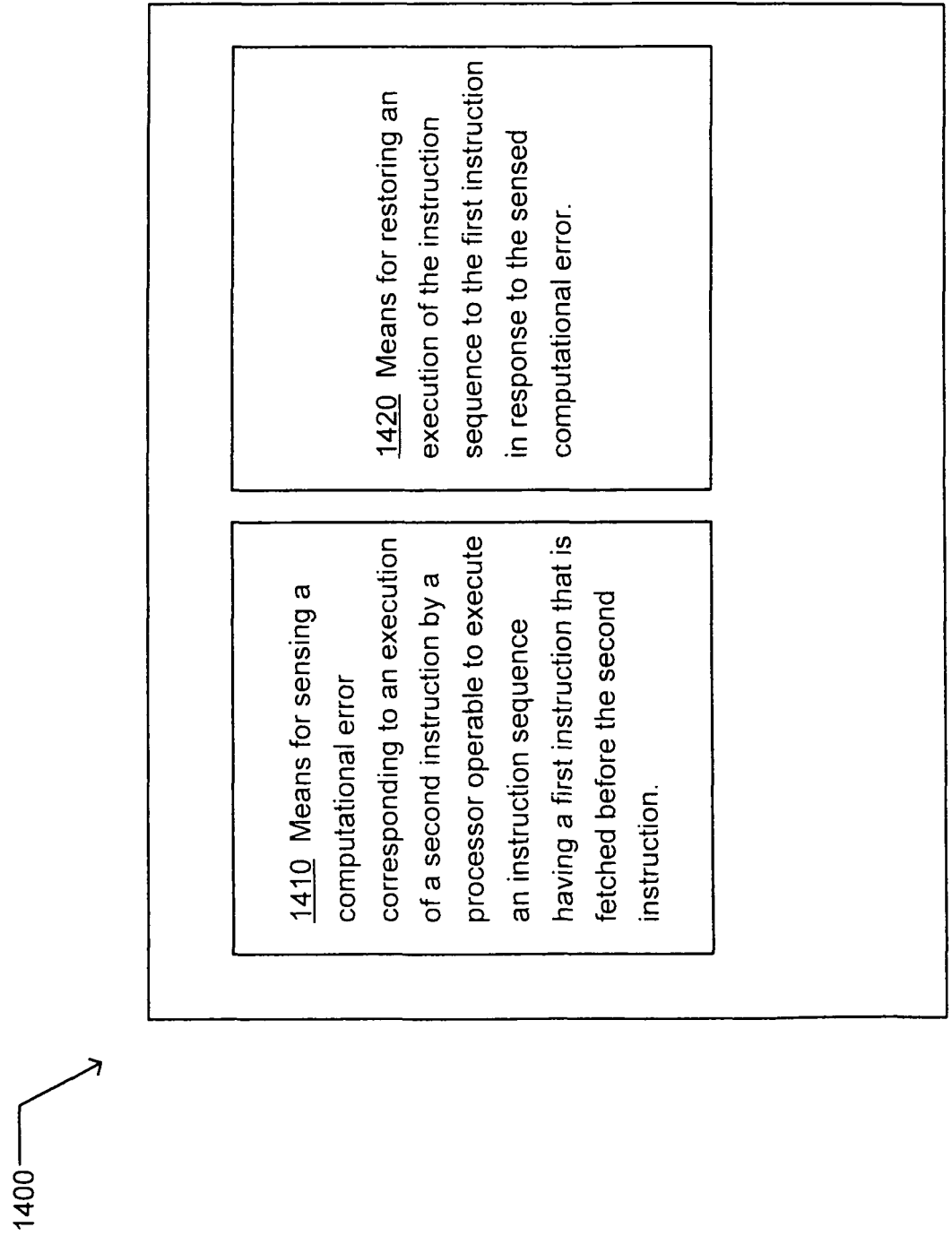
FIG. 29 illustrates a partial view of an exemplary device in which embodiments may be implemented.

FIG. 29 illustrates a partial view of an exemplary device 1400 in which embodiments may be implemented. The device includes means 1410 for sensing a computational error corresponding to an execution of a second instruction by a processor operable to execute an instruction sequence having a first instruction that is fetched before the second instruction. The device also includes means 1420 for restoring an execution of the instruction sequence to the first instruction in response to the sensed computational error.

Figure 30:
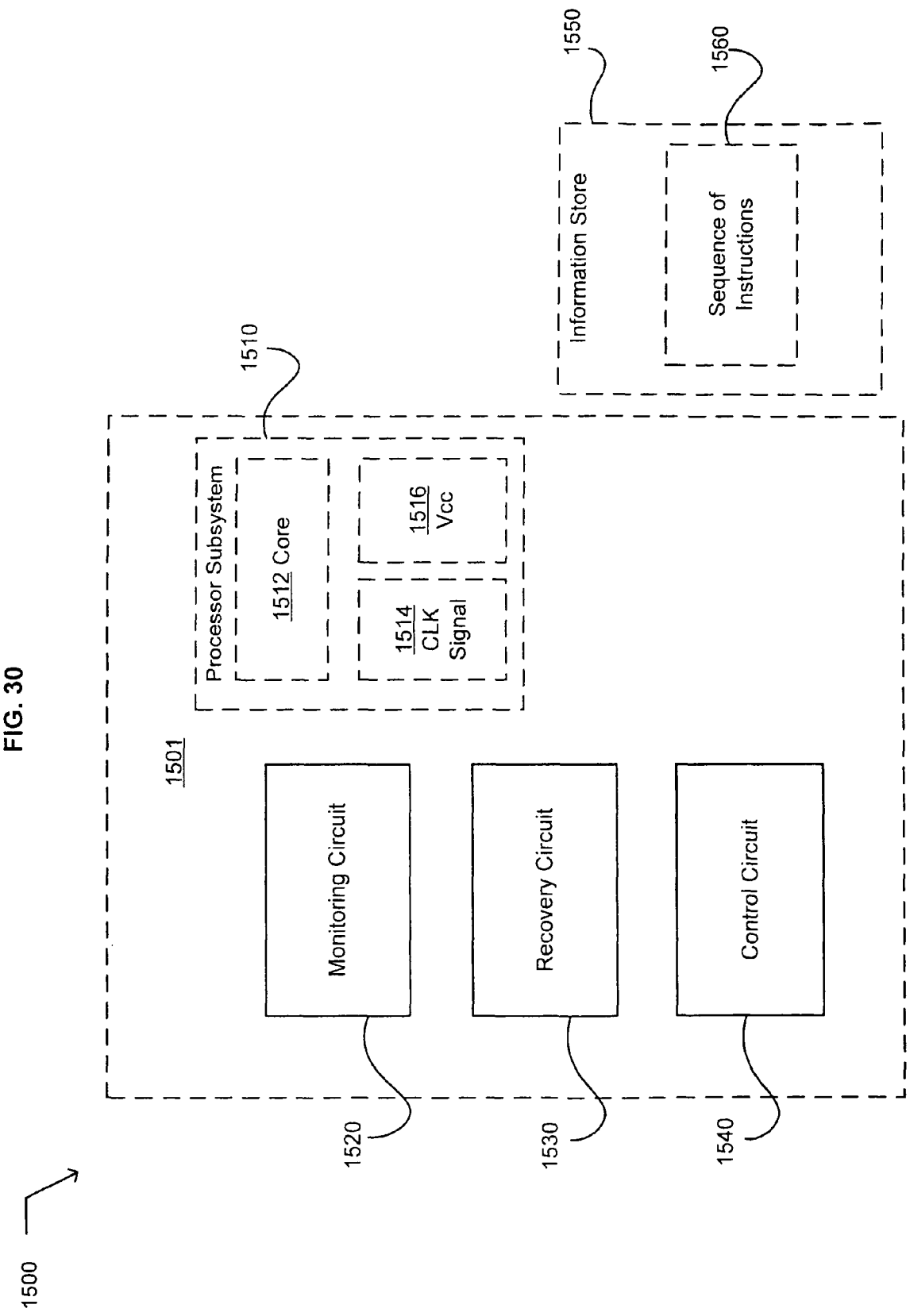
FIG. 30 illustrates a partial view of a controller apparatus in which embodiments may be implemented.

FIG. 30 illustrates a partial view of a controller apparatus 1500 in which embodiments may be implemented. The controller apparatus includes a monitoring circuit 1520, a recovery circuit 1530, and a control circuit 1540. The monitoring circuit includes a monitoring circuit for detecting a computational error corresponding to an execution of an instruction of a sequence of instructions 1560 by a processor subsystem 1510 having an adjustable operating parameter. An adjustable operating parameter may include any adjustable operating parameter of the processor subsystem. Examples include an adjustable clock signal, illustrated as CLK 1514, and/or an adjustable voltage, illustrated as a voltage Vcc 1516 applied to the processor core 1512. The recovery circuit includes a recovery circuit for rolling back an execution of the sequence of instructions to a checkpoint in response to the detected computational error. The control circuit includes a control circuit for adjusting the adjustable operating parameter in response to a performance criterion. In an embodiment, the control circuit includes a control circuit for adjusting the adjustable operating parameter in response to a performance criterion corresponding to an incidence of the detected computational error.

In an embodiment, the monitoring circuit 1520 includes a hardware-implemented monitoring circuit for detecting a computational error corresponding to an execution of an instruction of a sequence of instructions 1560 by a processor subsystem 1510 having an adjustable operating parameter. In another embodiment, the monitoring circuit includes a monitoring circuit implemented in at least one of hardware, software, firmware, and/or a microengine for detecting a computational error corresponding to an execution of an instruction of a sequence of instructions by a processor subsystem having an adjustable operating parameter. In a further embodiment, the monitoring circuit includes a monitoring circuit implemented in dynamic implementation verification architecture (DIVA) and for detecting a computational error corresponding to an execution of an instruction of a sequence of instructions by a processor subsystem having an adjustable operating parameter. In another embodiment, the monitoring circuit includes a monitoring circuit employing a TEATime execution checker algorithm and for detecting a computational error corresponding to an execution of an instruction of a sequence of instructions by a processor subsystem having an adjustable operating parameter.

In an embodiment, the recovery circuit 1530 includes a recovery circuit implemented in at least one of hardware, software, firmware, and/or a microengine and for rolling back an execution of the sequence of instructions 1560 to a checkpoint in response to the detected computational error. In a further embodiment, the recovery circuit includes a recovery circuit implemented in software associated with at least one of an operating system or a program executable by the processor subsystem 1510 and for rolling back an execution of the sequence of instructions to a checkpoint in response to the detected computational error. In another embodiment, the recovery circuit includes a recovery circuit for at least one of initiating, activating, causing, facilitating, accomplishing, and/or achieving a re-execution of the instruction by the processor subsystem by rolling back an execution of the sequence of instructions to a checkpoint in response to the detected computational error.

In an embodiment, the control circuit 1540 includes a control circuit implemented in at least one of hardware, software, firmware, and/or a microengine and for adjusting the adjustable operating parameter in response to a performance criterion.

Figure 31:
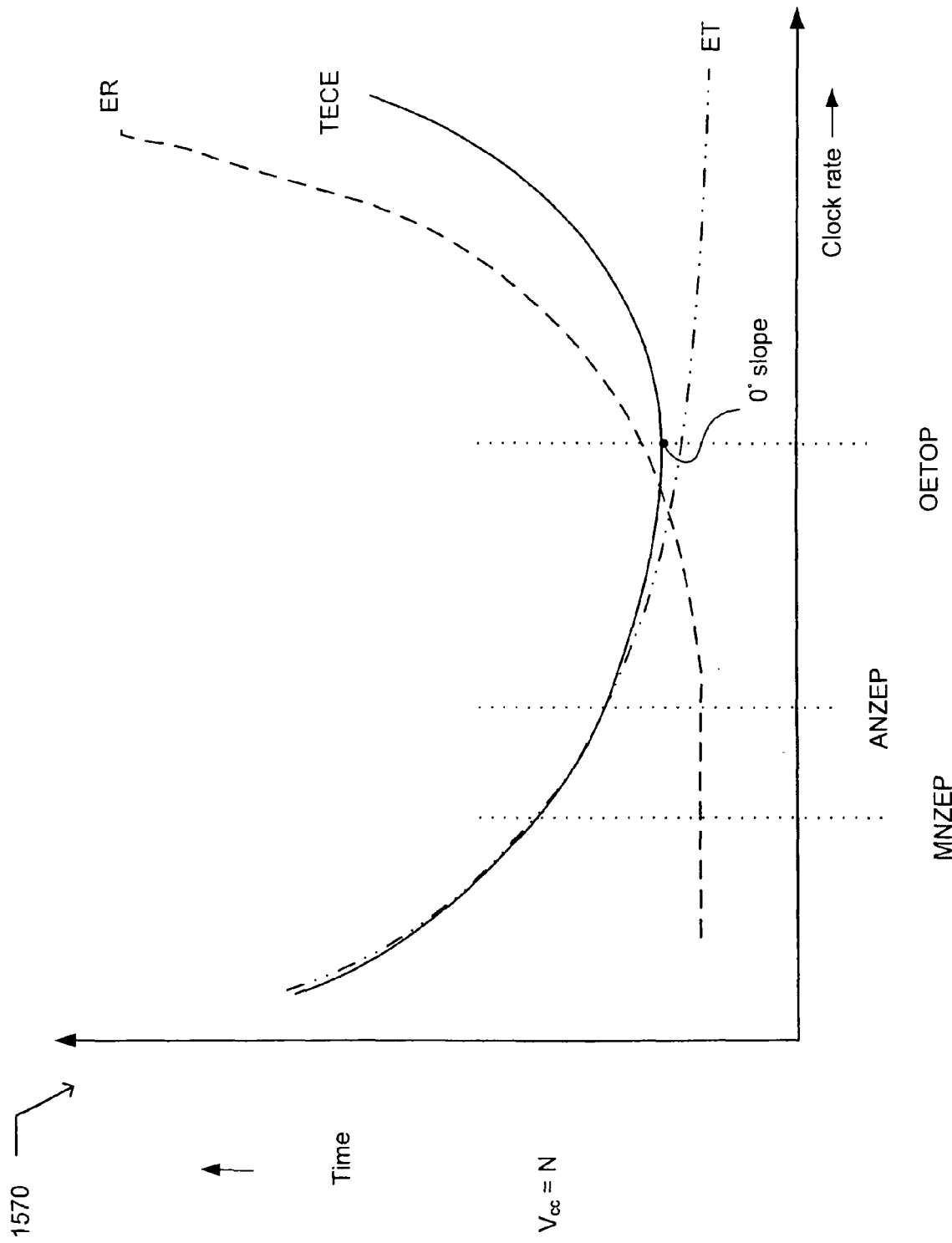
FIG. 31 includes a graphical illustration of an anticipated performance of a processor in which embodiments may be implemented.

FIG. 31 includes a graphical illustration of an anticipated performance 1570 of a processor in which embodiments may be implemented. The graphical illustration includes a state where a processor voltage Vcc essentially equals a constant N. The horizontal axis represents an adjustable operating parameter, illustrated as an increasing processor clock rate, and the vertical axis illustrates an increasing time. The horizontal axis also illustrates respectfully a manufacturer's specified nominal zero error point MNZEP, an actual nominal zero error point ANZEP, and an optimized error-tolerant operating point OETOP for the processor. In another embodiment, a variation of FIG. 31 may include a similar graphical illustration of an anticipated processor performance where the horizontal axis illustrates a reciprocal of a processor voltage, such as Vcc. In such embodiment, the clock rate remains constant.

The manufacturer's nominal zero error point MNZEP reflects a common practice of manufacturers in specifying processor ratings and operating parameters to generally assume a worst-case operating situation, and to set the operating clock rate or frequency at the manufacturer's nominal zero error point MNZEP. The manufacturer's nominal zero error point MNZEP may be a point selected to produce a tolerated operating error rate that is very small, for example an operating error rate that is in a range of $10^{-9}$ per hour. In other instances, the manufacturer's nominal zero error point MNZEP reflects a manufacturer's practice of labeling a higher speed processor chip as a lower speed processor chip. In situations, an individual processor can be operated at a higher clock rate than the manufacturer's nominal zero error point MNZEP without exceeding a manufacturer's tolerated operating error rate. Without an ability to recover from timing errors resulting from a clock rate higher than the actual nominal zero error point ANZEP, a computational system is subject to an increased possibility of system failure and data loss/corruption due to the timing errors as clock rate further increases.

An error rate line ER illustrates an error rate per instruction or per instruction sequence for a processor. An execution rate line ET illustrates an execution time per instruction or per instruction sequence for the processor. A time for error-corrected execution line TECE illustrates a time for a time for error-corrected execution of an instruction or instruction sequence, and reflects a measure of useful work performed by the processor. A time for an error-corrected execution at a particular clock rate in excess of the ANZEP includes a sum of the execution rate line ET and a time to correct erroneous executions because the ANZEP is exceeded. The time for error-corrected execution line TECE illustrates this sum and includes an optimal error-tolerant operating portion OETOP, identified as a "0° slope" location. In an embodiment, running a processor having a computational fault recovery means at the OETOP results in a minimum time for an error-corrected execution of an instruction or instruction sequence. In a further embodiment, the time for error-corrected execution line TECE illustrates a performance criterion. In another embodiment, the time for error-corrected execution line TECE represents a performance criterion corresponding to an incidence of a detected computational error, illustrated as a selected point (not shown) on the error rate line ER.

Returning to FIG. 30, in an embodiment, the control circuit 1540 includes a control circuit for adjusting the adjustable operating parameter in response to a performance criterion corresponding to an incidence of the detected computational error. In another embodiment, the performance criterion includes a performance criterion embodied in the time for error-corrected execution line TECE of FIG. 31. For example, the adjusting the adjustable operating parameter in response to a performance criterion may include adjusting a clock rate to achieve a performance criterion of a minimum TECE. In a further embodiment, the performance criterion includes a performance criterion corresponding to an incidence of the detected computational error. For example, the adjusting may include adjusting a clock rate to achieve a performance criterion of a target error rate along the ER line, thus achieving a performance criterion of no more than the target error rate.

In an embodiment, the control circuit 1540 includes a control circuit implemented in software associated with at least one of an operating system and/or a program executable by the processor subsystem and for adjusting the adjustable operating parameter in response to a performance criterion. In another embodiment, the control circuit includes a control circuit for adjusting the adjustable operating parameter in response to a performance criterion corresponding to an incidence of a detected processor subsystem computational error. In a further embodiment, the control circuit includes a control circuit for at least one of initiating, activating, causing, facilitating, accomplishing, and/or achieving an adjustment of the adjustable operating parameter in response to a performance criterion. In an embodiment, the control circuit includes a control circuit for adjusting a voltage of the processor subsystem in response to a performance criterion.

In an embodiment, the control circuit 1540 includes a control circuit for adjusting a processor subsystem in response to a performance criterion corresponding to an incidence of the detected computational error. In another embodiment, the control circuit includes a control circuit for adjusting a frequency of a timing signal employed by the processor subsystem in response to a performance criterion. In a further embodiment, the control circuit includes a control circuit for adjusting a processor subsystem clock in response to a performance criterion corresponding to an incidence of the detected computational error. In another embodiment, the control circuit includes a control circuit for adjusting the adjustable operating parameter in response to a performance criterion corresponding to at least one of a single incidence of the detected computational error, an incidence frequency of the detected computational error, an incidence occurrence rate of the detected computational error, an incidence tempo of the detected computational error, an incidence pattern of the detected computational error, or an incidence prevalence of the detected computational error. For example, the incidence frequency of the detected computational error may include an incidence frequency over a time of the detected computational error. In another example, the incidence rate of the detected computational error may include an incidence rate of the detected computational error per execution of an instruction or an instruction sequence. In a further example, the incidence prevalence of the detected computational error may include an incidence distribution of the detected computational error, such as more than X instances occurring within Y instructions of a sequence of Z instructions.

In an embodiment, the control circuit 1540 includes a control circuit for adjusting the adjustable operating parameter based on a performance criterion substantially minimizing a time required to complete successfully an execution of the sequence of instructions 1560. In another embodiment, the control circuit includes a control circuit for adjusting the adjustable operating parameter in a substantial conformity with a performance criterion corresponding to $$0 = \frac{\Delta \text{ time to complete an execution of the sequence of instructions}}{\Delta \text{ adjustable operation parameter}}.$$

For example, FIG. 31 illustrates an embodiment of the above performance criterion at the where the adjustable operating parameter is clock rate at a location where the slope of the line OETOP is zero, i.e., "0° slope line." In a further embodiment, the control circuit includes a control circuit for adjusting the adjustable operating parameter in response to a performance criterion corresponding to a substantial minimization of time to complete an execution of the sequence of instructions.

In an embodiment, the control circuit 1540 includes a control circuit for adjusting a frequency of the processor subsystem clock signal 1514 based upon a performance criterion corresponding to a substantial minimization of time to complete an execution of the sequence of instructions 1560. In another embodiment, the control circuit includes a control circuit for adjusting a processor subsystem clock signal frequency in substantial conformity with a performance criterion corresponding to 0=Δ time to complete an execution of the sequence of instructions Δ processor subsystem clock frequency.

In a further embodiment, the control circuit includes a control circuit for adjusting a processor subsystem voltage Vcc 1516 in response to a performance criterion corresponding to a substantial minimization of time to execute the sequence of instructions 1560. In another embodiment, the control circuit includes a control circuit for adjusting a processor subsystem voltage in substantial conformity with a performance criterion corresponding to 0=Δ time to complete an execution of the sequence of instructions Δ processor subsystem voltage.

For example, the performance criterion involving an adjustable processor subsystem voltage may be graphically illustrated in a manner at least substantially similar to the graphical illustration of the performance criterion involving an adjustable clock rate of FIG. 31.

In an embodiment, the control circuit 1540 includes a control circuit for adjusting the adjustable operating parameter based upon a performance criterion substantially minimizing an expected time to successfully complete an execution of the sequence of instructions 1560 while at least one other adjustable operating parameter remains substantially constant. In another embodiment, the control circuit includes a control circuit for adjusting the adjustable operating parameter based upon a dynamically-derived performance criterion and an incidence of the detected computational error. For example, the control circuit may include an operability to vary a clock rate of a processor subsystem in an environment, dynamically determine corresponding times required for an error-corrected execution of an instruction sequence, and select a clock signal 1514 rate for a subsequent execution according to a performance criterion. For example, the performance criterion may include selection of a clock signal rate corresponding to the optimized error-tolerant operating portion OETOP for the processor. Alternatively, the performance criterion may include selection of a clock signal rate based upon another portion of the TECE line representing a time for an error-corrected execution of the instruction sequence, such as a 10% lesser clock rate than the optimized error-tolerant operating portion OETOP. In a further embodiment, the dynamically-derived performance criterion includes a dynamically-derived performance criterion having an objective to substantially minimize an expected time to successfully complete an execution of the sequence of instructions.

In an embodiment, the control circuit 1540 includes a control circuit for adjusting the adjustable operating parameter based upon a performance map and an empirically-based incidence of the detected computational error. In another embodiment, the control circuit includes a control circuit for adjusting the adjustable operating parameter based upon an error-tolerant performance criterion corresponding to an incidence of the detected computational error. In a further embodiment, the control circuit includes a control circuit for adjusting the adjustable operating parameter in response to a performance criterion embodied in a lookup table and an incidence of the detected computational error. In another embodiment, the performance criterion embodied in the lookup table includes a performance criterion embodied in a lookup table having an objective to substantially minimize an expected time to execute the sequence of instructions.

Figure 32:
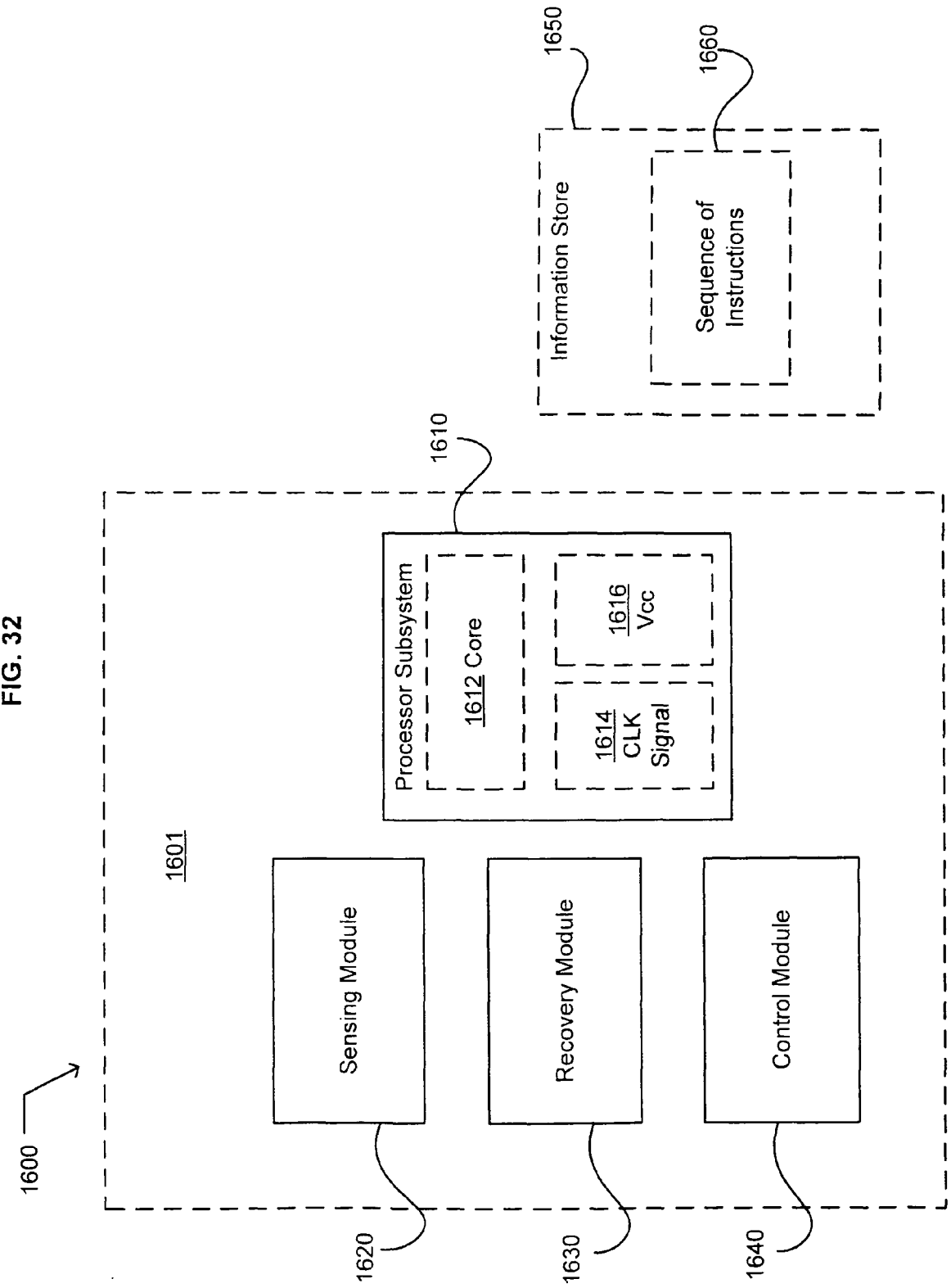
FIG. 32 illustrates a partial view of a computerized apparatus in which embodiments may be implemented.

FIG. 32 illustrates a partial view of a computerized apparatus 1600 in which embodiments may be implemented. The computerized apparatus includes a processor subsystem 1610, a sensing module 1620, a recovery module 1630, and a control module 1640. The processor subsystem has an adjustable operating parameter and operable to execute a sequence of instructions. The sensing module is operable to detect an operating-parameter-induced error in an execution of an instruction of the sequence of instructions 1660. The recovery module is operable to rollback an execution of the sequence of instructions to a checkpoint in response to the detected operating-parameter-induced error. The control module is operable to adjust the adjustable operating parameter in response to a performance criterion corresponding to an incidence of the detected operating-parameter-induced error.

In an embodiment, the sensing module 1620 includes a sensing module operable to detect a computational error in an execution of an instruction of the sequence of instructions 1660. In another embodiment, the sensing module includes a sensing module operable to detect an execution path synchronization error in an execution of an instruction of the sequence of instructions. In a further embodiment, the sensing module includes a sensing module operable to detect a clock-induced error in an execution of an instruction of the sequence of instructions. In another embodiment, the sensing module includes a sensing module operable to detect a processor voltage-induced error in an execution of an instruction of the sequence of instructions. In a further embodiment, the sensing module includes a sensing module implemented in hardware and operable to detect an operating-parameter-induced error in an execution of an instruction of the sequence of instructions.

In an embodiment, the recovery module 1630 includes a recovery module implemented in at least one of hardware, software, firmware, and/or a microengine and operable to rollback an execution of the sequence of instructions to a checkpoint in response to the detected operating-parameter-induced error. In another embodiment, the processor subsystem 1610 and at least one of the sensing module 1620, the recovery module 1630, and/or the control module 1640 are formed on a same chip 1601.

In an embodiment, the control module 1640 includes a control module implemented in at least one of hardware, software, firmware, and/or a microengine and operable to adjust the adjustable operating parameter in response to a performance criterion corresponding to an incidence of the detected operating-parameter-induced error. In another embodiment, the control module includes a control module operable to adjust the adjustable operating parameter in response to an error-tolerant performance criterion corresponding to an incidence of the detected operating-parameter-induced error.

Figure 33:
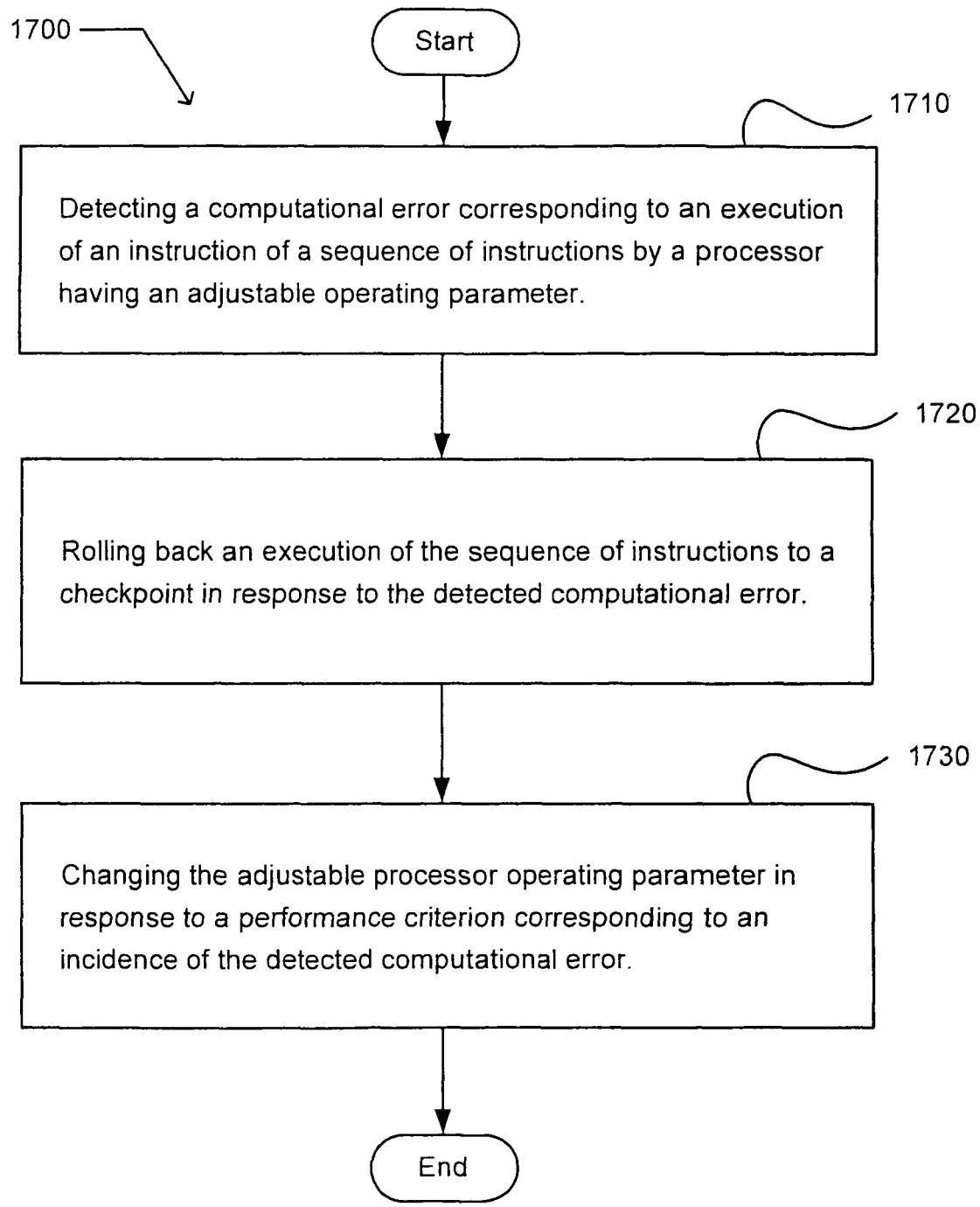
FIG. 33 illustrates an exemplary operational flow that may implement embodiments.

FIG. 33 illustrates an exemplary operational flow 1700 that may implement embodiments. After a start operation, the operational flow moves to a monitoring operation 1710. The monitoring operation detects a computational error corresponding to an execution of an instruction of a sequence of instructions by a processor having an adjustable operating parameter. A restore operation 1720 rolls back an execution of the sequence of instructions to a checkpoint in response to the detected computational error. A tuning operation 1730 changes the adjustable processor operating parameter in response to a performance criterion corresponding to an incidence of the detected computational error. The flow then proceeds to an end operation.

Figure 34:
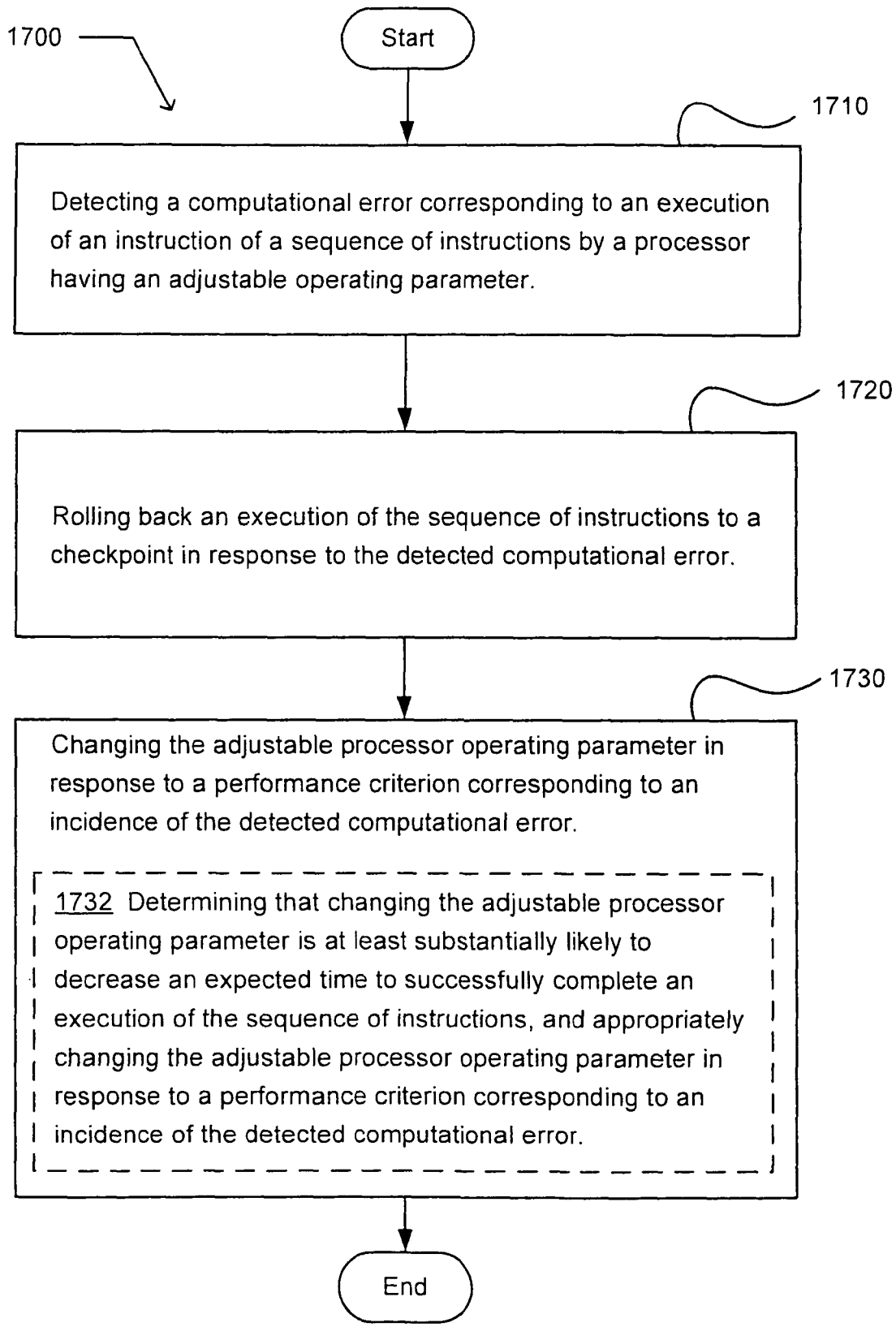
FIG. 34 illustrates an alternative embodiment of the exemplary operational flow of FIG. 33.

FIG. 34 illustrates an alternative embodiment of the exemplary operational flow 1700 of FIG. 33. The tuning operation 1730 may include at least one additional operation, such as the operation 1732. The operation 1732 determines that changing the adjustable processor operating parameter is at least substantially likely to decrease an expected time to successfully complete an execution of the sequence of instructions, and appropriately changing the adjustable processor operating parameter in response to a performance criterion corresponding to an incidence of the detected computational error.

Figure 35:
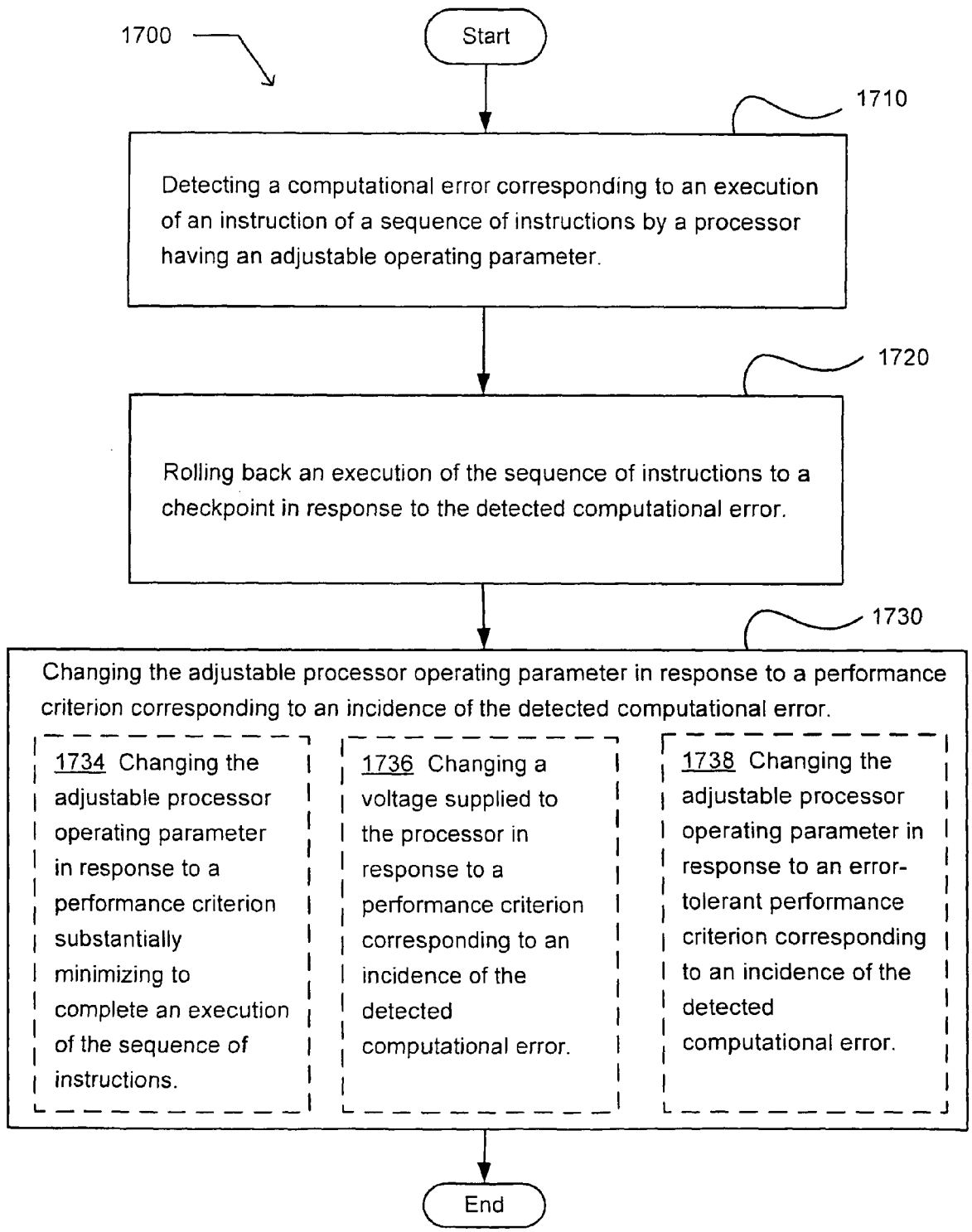
FIG. 35 illustrates an alternative embodiment of the exemplary operational flow of FIG. 33.

FIG. 35 illustrates an alternative embodiment of the exemplary operational flow 1700 of FIG. 33. The tuning operation 1730 may include at least one additional operation. The at least one additional operation may include an operation 1734, an operation 1736, and/or an operation 1738. The operation 1734 changes the adjustable processor operating parameter in response to a performance criterion substantially minimizing a time to complete an execution of the sequence of instructions. The operation 1736 changes a voltage supplied to the processor in response to a performance criterion corresponding to an incidence of the detected computational error. The operation 1738 changes the adjustable processor operating parameter in response to an error-tolerant performance criterion corresponding to an incidence of the detected computational error.

Figure 36:
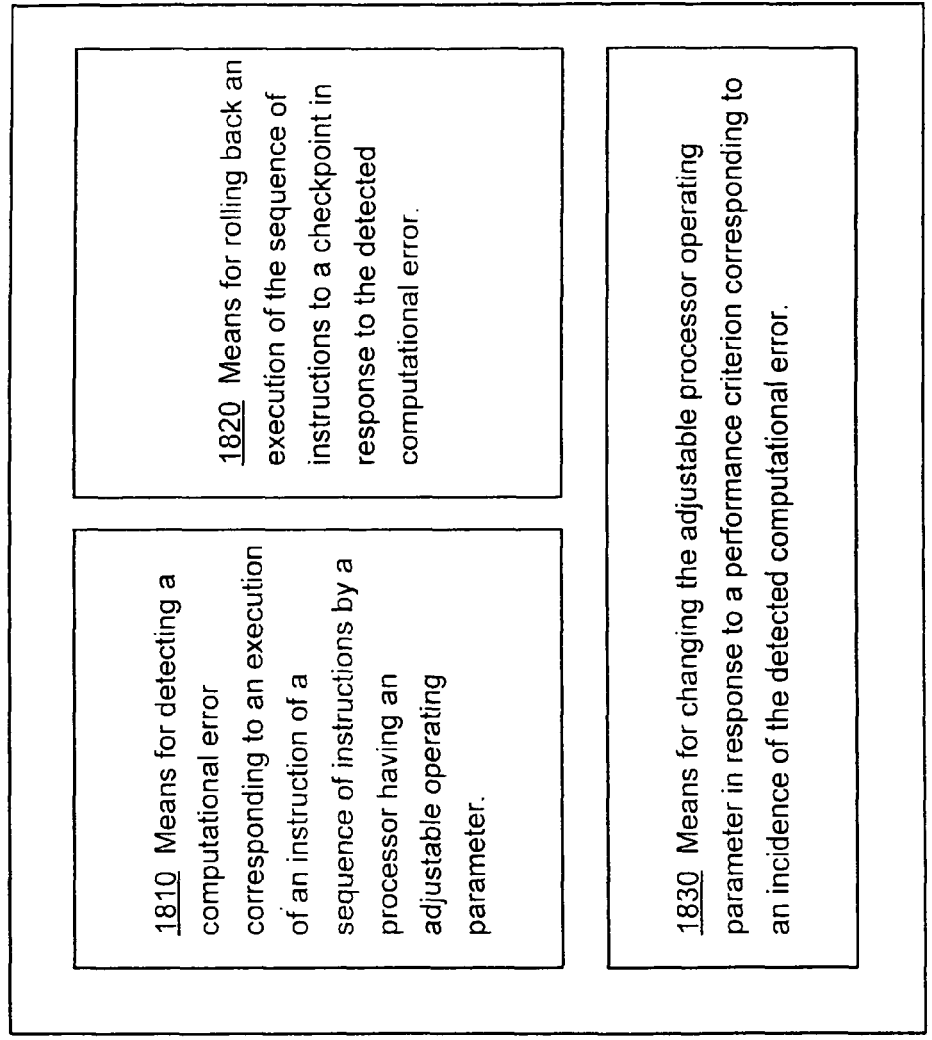
FIG. 36 illustrates a partial view of a computerized apparatus in which embodiments may be implemented.

FIG. 36 illustrates a partial view of a computerized apparatus 1800 in which embodiments may be implemented. The computerized apparatus includes means 1810 for detecting a computational error corresponding to an execution of an instruction of a sequence of instructions by a processor having an adjustable operating parameter The computerized apparatus also includes means 1820 for rolling back an execution of the sequence of instructions to a checkpoint in response to the detected computational error. The computerized apparatus further includes means 1830 for changing the adjustable processor operating parameter in response to a performance criterion corresponding to an incidence of the detected computational error.

Figure 37:
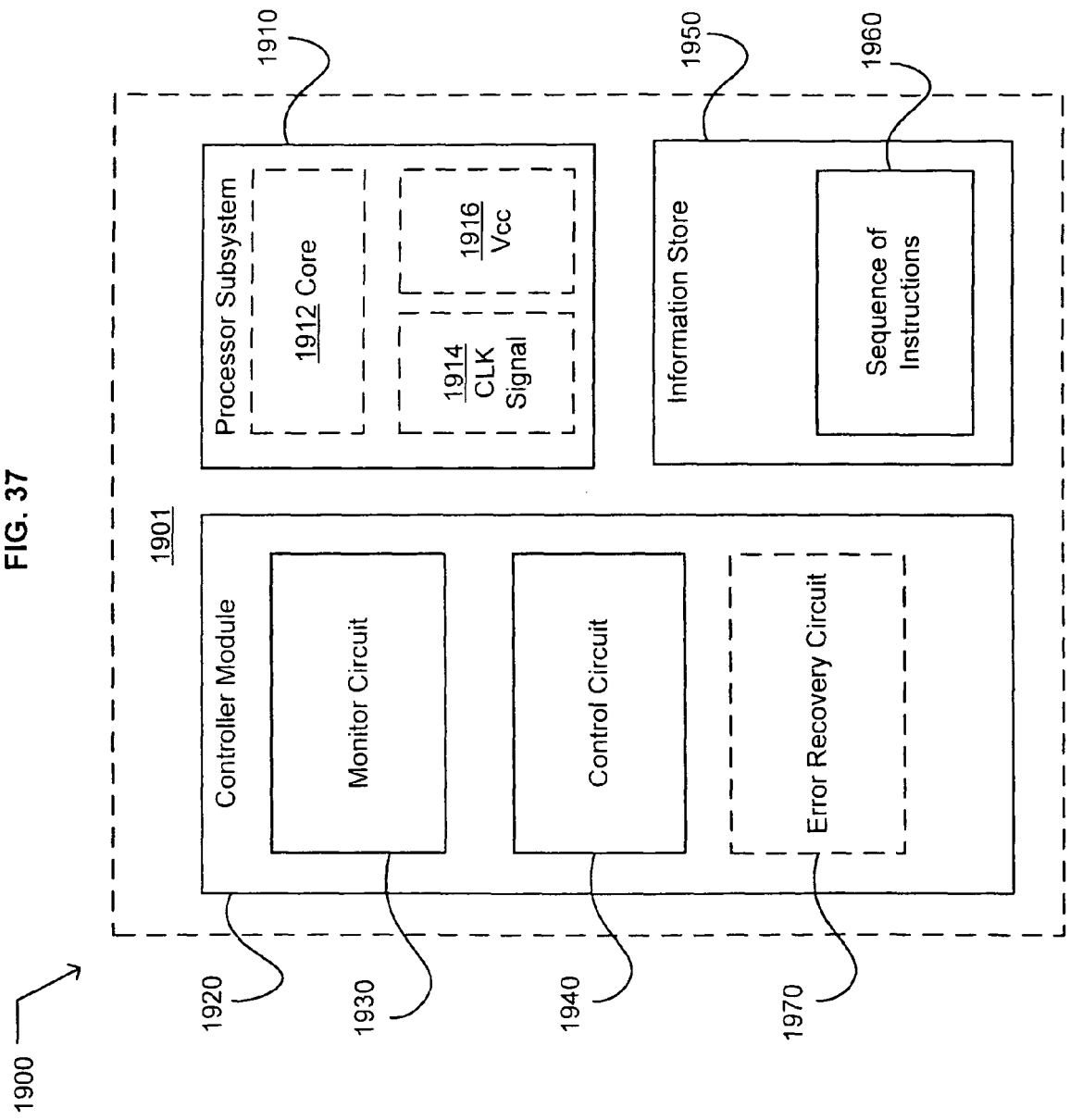
FIG. 37 illustrates a partial view of a computing system in which embodiments may be implemented.

FIG. 37 illustrates a partial view of a computing system 1900 in which embodiments may be implemented. The computing system includes a processor subsystem 1910, an information store 1950, and a controller module 1920. The processor subsystem includes an adjustable operating parameter, illustrated as an adjustable clock signal (CLK) 1914, and/or an adjustable processor voltage (Vcc) 1916. The information store is operable to save a sequence of instructions 1950. The controller module includes a monitor circuit 1930, and a control circuit 1940. The monitor circuit includes a monitor circuit for detecting an incidence of an operating-parameter-caused error corresponding to an execution of an instruction of the sequence of instructions by the processor subsystem. The control circuit includes a control circuit for adjusting the adjustable operating parameter based upon an error-tolerant performance criterion.

In an embodiment, the controller module 1920 including a monitor circuit 1930 further includes a controller module including a monitor circuit for detecting an incidence of a computational error corresponding to an execution of an instruction of the sequence of instructions 1960 by the processor subsystem. In another embodiment, the controller module including a monitor further includes a controller module including a monitor circuit for detecting an incidence of an execution path synchronization error corresponding to an execution of an instruction of the sequence of instructions by the processor subsystem. In a further embodiment, the controller module including a monitor circuit includes a controller module including a hardware-implemented monitor circuit for detecting an incidence of an operating-parameter-caused error corresponding to an execution of an instruction of the sequence of instructions by the processor subsystem.

In an embodiment, the controller module 1920 including a monitor circuit 1930 further includes a controller module including a monitor circuit implemented in at least one of hardware, software, firmware, and/or a microengine for detecting an incidence of an operating-parameter-caused error corresponding to an execution of an instruction of the sequence of instructions by the processor subsystem. In another embodiment, the controller module including a monitor circuit further includes a controller module including a monitor circuit implemented in dynamic implementation verification architecture (DIVA) and for detecting an incidence of an operating-parameter-caused error corresponding to an execution of an instruction of the sequence of instructions by the processor subsystem. In a further embodiment, the controller module including a monitor circuit further includes a controller module including a monitor circuit employing a TEATime execution checker algorithm and for detecting an incidence of an operating-parameter-caused error corresponding to an execution of an instruction of the sequence of instructions by the processor subsystem.

In an embodiment, the controller module 1920 including a control circuit 1940 further includes a control circuit implemented in at least one of hardware, software, firmware, and/or a microengine and for adjusting the adjustable operating parameter based upon an error-tolerant performance criterion. In another embodiment, the controller module including a control circuit further includes a control circuit implemented in software associated with at least one of an operating system and/or a program executable by the processor subsystem and for adjusting the adjustable operating parameter based upon an error-tolerant performance criterion. In a further embodiment, the controller module including a control circuit further includes a controller module including a control circuit for at least one of initiating, activating, causing, facilitating, accomplishing, and/or achieving an adjustment of the adjustable operating parameter based upon an error-tolerant performance criterion.

In an embodiment, the controller module 1920 including a control circuit 1940 further includes a controller module including a control circuit for adjusting a voltage of the processor subsystem based upon an error-tolerant performance criterion. In another embodiment, the controller module including a control circuit further includes a controller module including a control circuit for adjusting a frequency of a timing signal employed by the processor subsystem based upon an error-tolerant performance criterion. In a further embodiment, the controller module including a control circuit further includes a controller module including a control circuit for adjusting a processor clock based upon an error-tolerant performance criterion.

In an embodiment, the controller module 1920 including a control circuit 1940 further includes a controller module including a control circuit for adjusting the adjustable operating parameter to at least substantially minimize a time required to successfully complete an execution of the sequence of instructions. In another embodiment, the controller module including a control circuit further includes a controller module including a control circuit for adjusting the adjustable operating parameter in substantial conformity with an error-tolerant performance criterion that corresponds to $0=\Delta$ time to complete an execution of the sequence of instructions $\Delta$ adjustable operating parameter.

In a further embodiment, the controller module including a control circuit further includes a controller module including a control circuit for adjusting the adjustable operating parameter to substantially minimize a time to complete an execution of the sequence of instructions.

In an embodiment, the controller module 1920 including a control circuit 1940 further includes a controller module including a control circuit for adjusting a processor clock frequency to substantially minimize a time to complete an execution of the sequence of instructions. In another embodiment, the controller module including a control circuit further includes a controller module including a control circuit for adjusting a processor clock frequency in substantial conformity with $0=\Delta$ time to complete an execution of the sequence of instructions $\Delta$ processor clock frequency.

In a further embodiment, the controller module including a control circuit includes a controller module including a control circuit for adjusting a processor clock frequency in substantial conformity with $\pm 0.05=\Delta$ time to complete an execution of the sequence of instructions $\Delta$ processor clock frequency.

In another embodiment, the controller module including a control circuit further includes a controller module including a control circuit for adjusting a processor clock frequency in substantial conformity with $\pm 0.10=\Delta$ time to complete an execution of the sequence of instructions $\Delta$ processor clock frequency.

In a further embodiment, the controller module including a control circuit further includes a controller module including a control circuit for adjusting a processor clock frequency in substantial conformity with $\pm 0.20=\Delta$ time to complete an execution of the sequence of instructions $\Delta$ processor clock frequency.

In an embodiment, the controller module 1920 including a control circuit 1940 further includes a controller module including a control circuit for adjusting a processor voltage to substantially minimize a time to complete an execution of the sequence of instructions. In another embodiment, the controller module including a control circuit further includes a controller module including a control circuit for adjusting a processor clock frequency in substantial conformity with 0=Δ time to complete an execution of the sequence of instructions Δ processor clock frequency.

In another embodiment, the controller module including a control circuit further includes a controller module including a control circuit for adjusting a processor clock frequency to substantially minimize an expected time to successfully complete an execution of the sequence of instructions while at least one other adjustable operating parameter remains substantially constant. In a further embodiment, the controller module including a control circuit further includes a controller module including a control circuit for adjusting the adjustable operating parameter based upon an error-tolerant and dynamically-derived performance criterion. For example, the control circuit may dynamically derive data representative of the time for error-corrected execution line TECE of FIG. 31. The time for error-corrected execution line TECE represents a time for an error-corrected execution of an instruction or instruction sequence as at least one adjustable operating parameter of CLK signal 1914 and/or processor voltage Vcc 1916 is varied for the processor subsystem 1910. This allows the processor subsystem to be tuned for its unique properties and its environment. In an embodiment, the dynamically-derived performance criterion may be derived once for a processor and be available for a future use. In another embodiment, the dynamically-derived performance criterion may be derived periodically for a processor and be available for a future use. In a further embodiment, the dynamically-derived performance criterion may be derived from a processor of a processor class and be available for a future use by other instances of processors of the processor class. In another embodiment, the controller module including a control circuit for adjusting the adjustable operating parameter based upon an error-tolerant dynamically-derived performance criterion further includes a controller module including a control circuit for adjusting the adjustable operating parameter based upon an error-tolerant dynamically-derived performance criterion having an objective to substantially minimize an expected time to successfully complete an execution of the sequence of instruction.

In an embodiment, the controller module 1920 including a control circuit 1940 further includes a controller module including a control circuit for adjusting the adjustable operating parameter based upon an empirically-based error-tolerant performance map. In another embodiment, the controller module including a control circuit further includes a controller module including a control circuit for adjusting the adjustable operating parameter based upon a performance criterion embodied in a lookup table. In a further embodiment, the controller module including a control circuit further includes a controller module including a control circuit for adjusting the adjustable operating parameter based upon a performance criterion embodied in a lookup table and having an objective of substantially minimizing a time to complete an execution of the sequence of instruction.

In an embodiment, the controller module 1920 including a control circuit 1940 further includes a controller module including a control circuit for adjusting the adjustable operating parameter based upon an error-tolerant performance criterion corresponding to an incidence of the detected operating-parameter-caused error. In another embodiment, the controller module further includes an error recovery circuit operable to restore an execution of the sequence of program instructions to a checkpoint based upon the detected operating-parameter-caused error.

Figure 38:
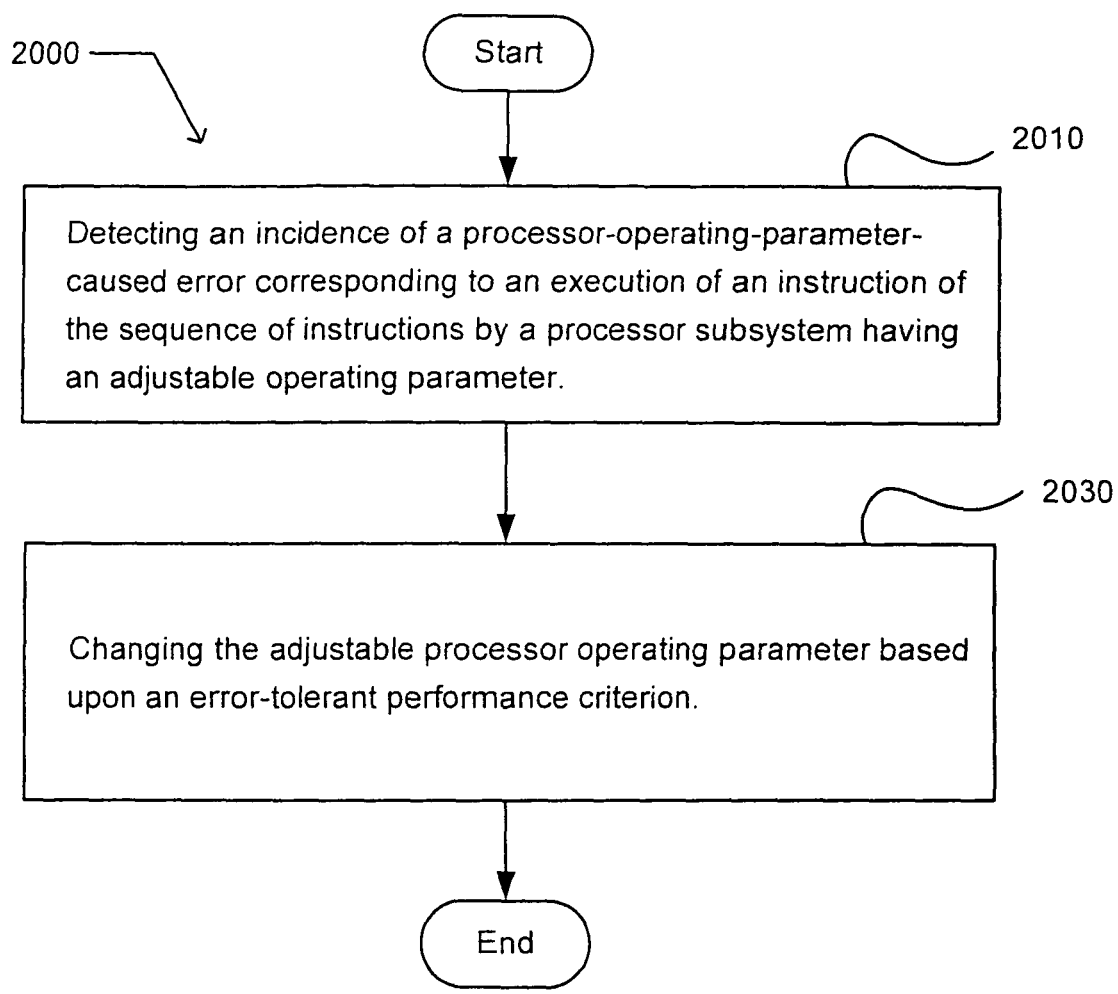
FIG. 38 illustrates an exemplary operational flow implemented in a computerized system.

FIG. 38 illustrates an exemplary operational flow 2000 implemented in a computerized system. After a start operation, the operational flow moves to a sensing operation 2010. The sensing operation detects an incidence of a processor-operating-parameter-caused error corresponding to an execution of an instruction of the sequence of instructions by a processor subsystem having an adjustable operating parameter. A tuning operation 2030 changes the adjustable processor operating parameter based upon an error-tolerant performance criterion. The operational flow then moves to an end operation.

Figure 39:
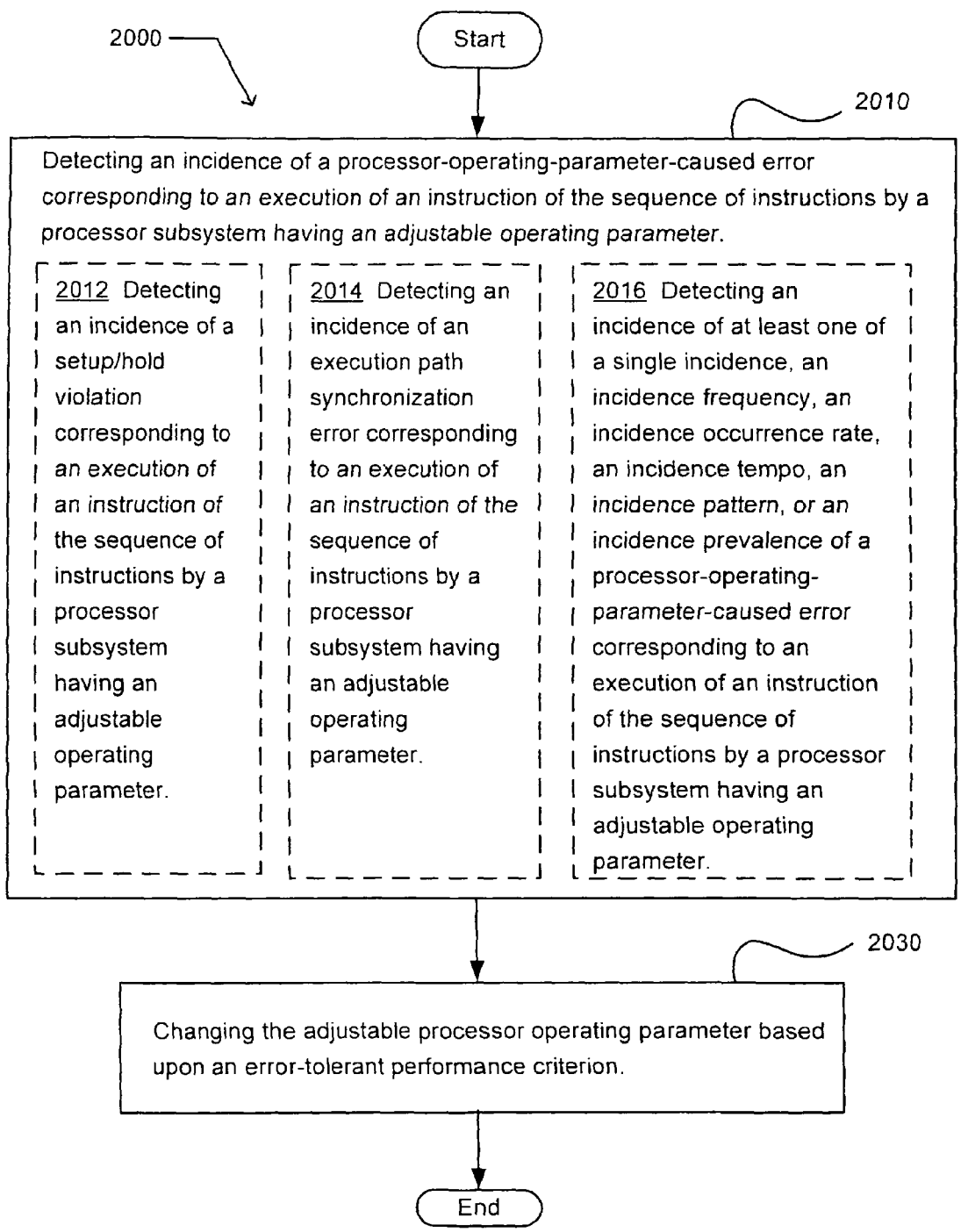
FIG. 39 illustrates an alternative embodiment of the exemplary operational flow of FIG. 38.

FIG. 39 illustrates an alternative embodiment of the exemplary operational flow 2000 of FIG. 38. The sensing operation 2010 may include at least one additional operation. The additional operation may include an operation 2012, and operation 2014, and/or an operation 2016. The operation 2012 detects an incidence of a processor setup/hold violation corresponding to an execution of an instruction of the sequence of instructions by a processor subsystem having an adjustable operating parameter. The operation 2014 detects an incidence of an execution path synchronization error corresponding to an execution of an instruction of the sequence of instructions by a processor subsystem having an adjustable operating parameter. The operation 2016 detects an incidence of at least one of a single incidence, an incidence frequency, an incidence occurrence rate, an incidence tempo, an incidence pattern, or an incidence prevalence of a processor-operating-parameter-caused error corresponding to an execution of an instruction of the sequence of instructions by a processor subsystem having an adjustable operating parameter.

Figure 40:
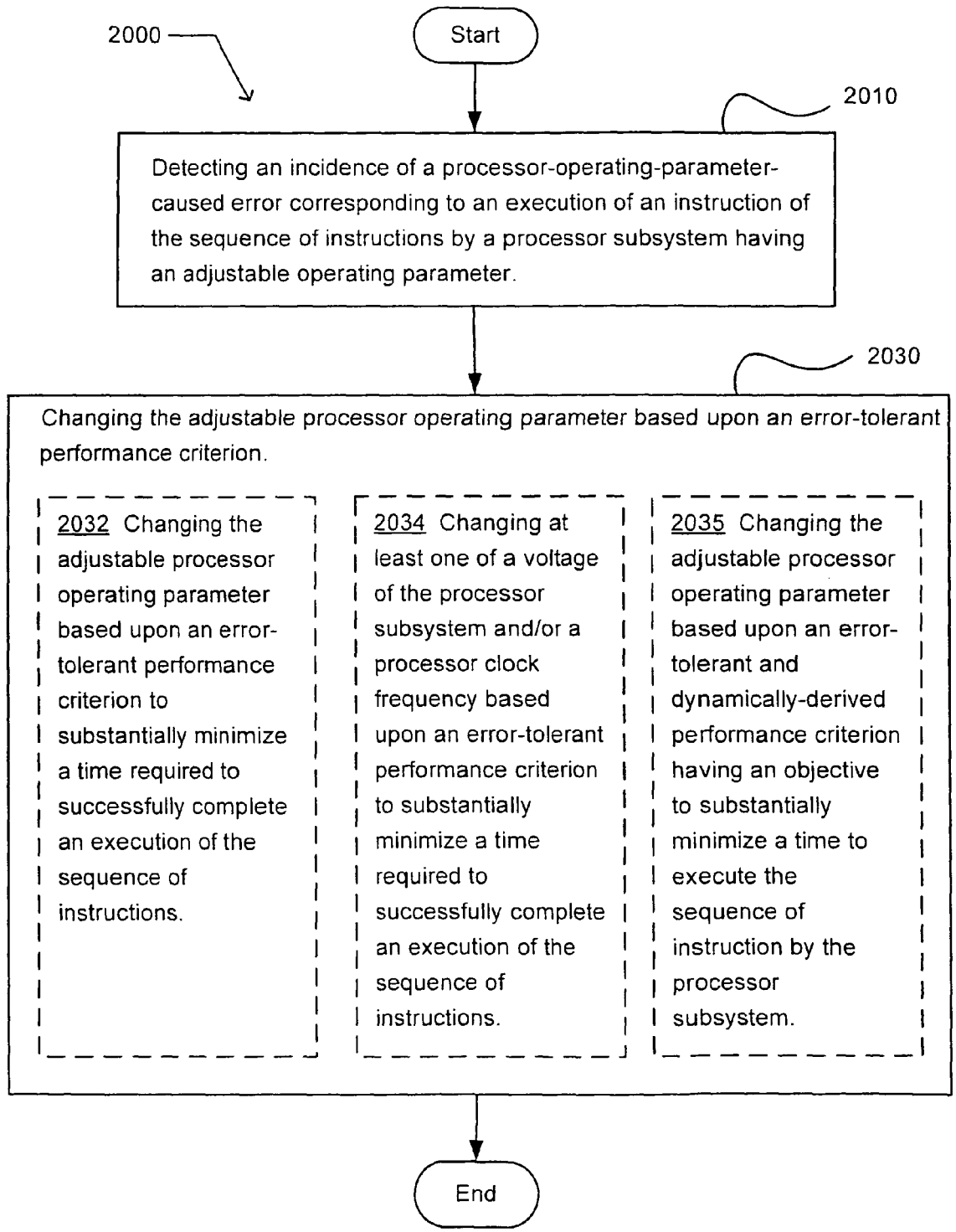
FIG. 40 illustrates another alternative embodiment of the exemplary operational flow of FIG. 38.

FIG. 40 illustrates another alternative embodiment of the exemplary operational flow 2000 of FIG. 38. The tuning operation 2030 may include at least one additional operation. The additional operation may include an operation 2032, and operation 2034, and/or an operation 2035. The operation 2032 changes the adjustable processor operating parameter based upon an error-tolerant performance criterion to substantially minimize a time required to successfully complete an execution of the sequence of instructions. The operation 2034 changes at least one of a voltage of the processor subsystem and/or a processor clock frequency based upon an error-tolerant performance criterion to substantially minimize a time required to successfully complete an execution of the sequence of instructions. The operation 2035 changes the adjustable processor operating parameter based upon an error-tolerant and dynamically-derived performance criterion having an objective to substantially minimize a time to execute the sequence of instruction by the processor subsystem.

Figure 41:
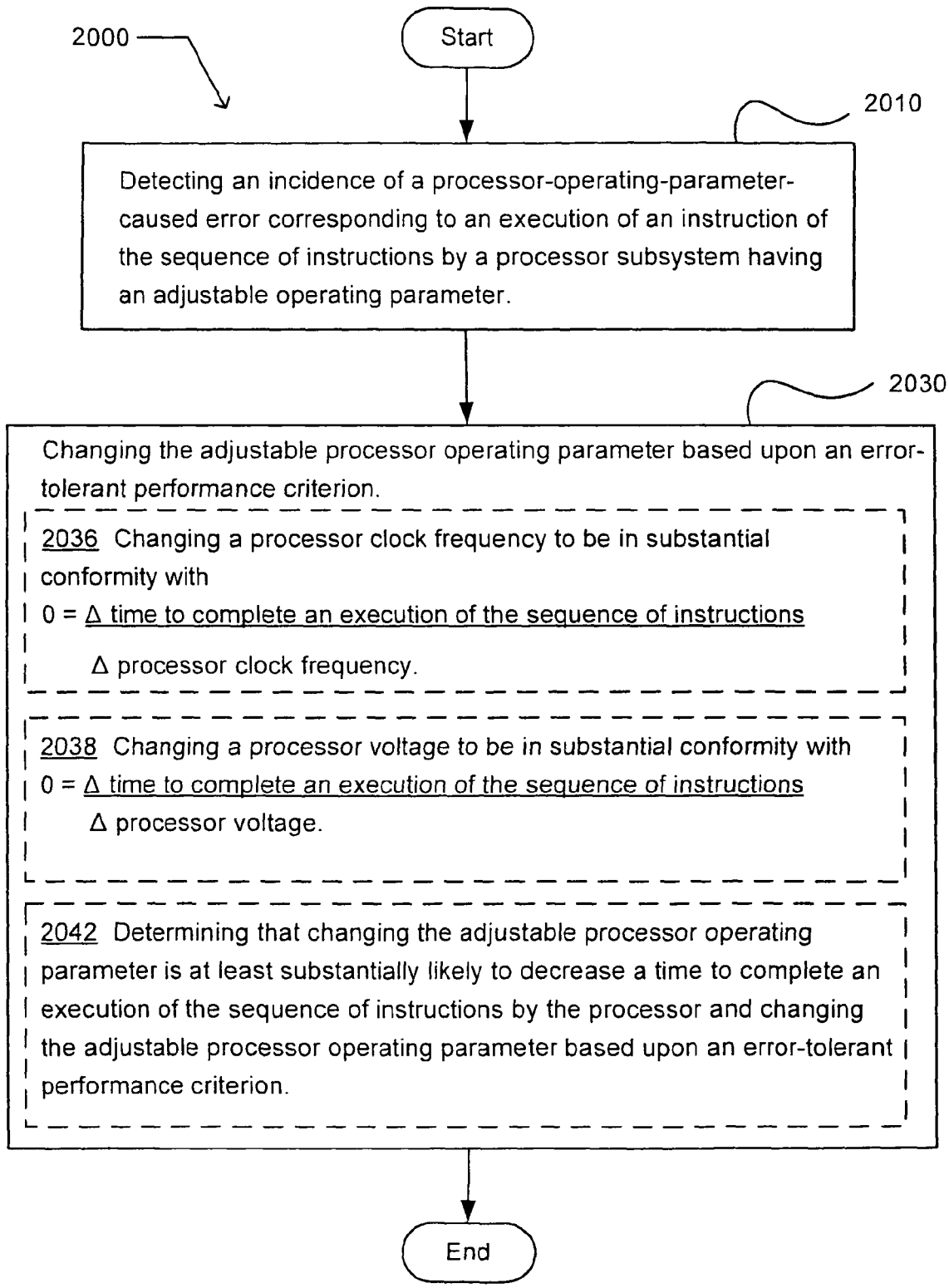
FIG. 41 illustrates another alternative embodiment of the exemplary operational flow of FIG. 38.

FIG. 41 illustrates another alternative embodiment of the exemplary operational flow 2000 of FIG. 38. The tuning operation 2030 may include at least one additional operation. The additional operation may include an operation 2036, an operation 2038, and/or an operation 2042. The operation 2036 changes a processor clock frequency in substantial conformity with 0=Δ time to complete an execution of the sequence of instructions Δ processor clock frequency.

The operation 2038 changes a processor voltage in substantial conformity with 0=Δ time to complete an execution of the sequence of instructions Δ processor voltage.

The operation 2042 determines that changing the adjustable processor operating parameter is at least substantially likely to decrease a time to complete an execution of the sequence of instructions by the processor and changes the adjustable processor operating parameter based upon an error-tolerant performance criterion.

Figure 42:
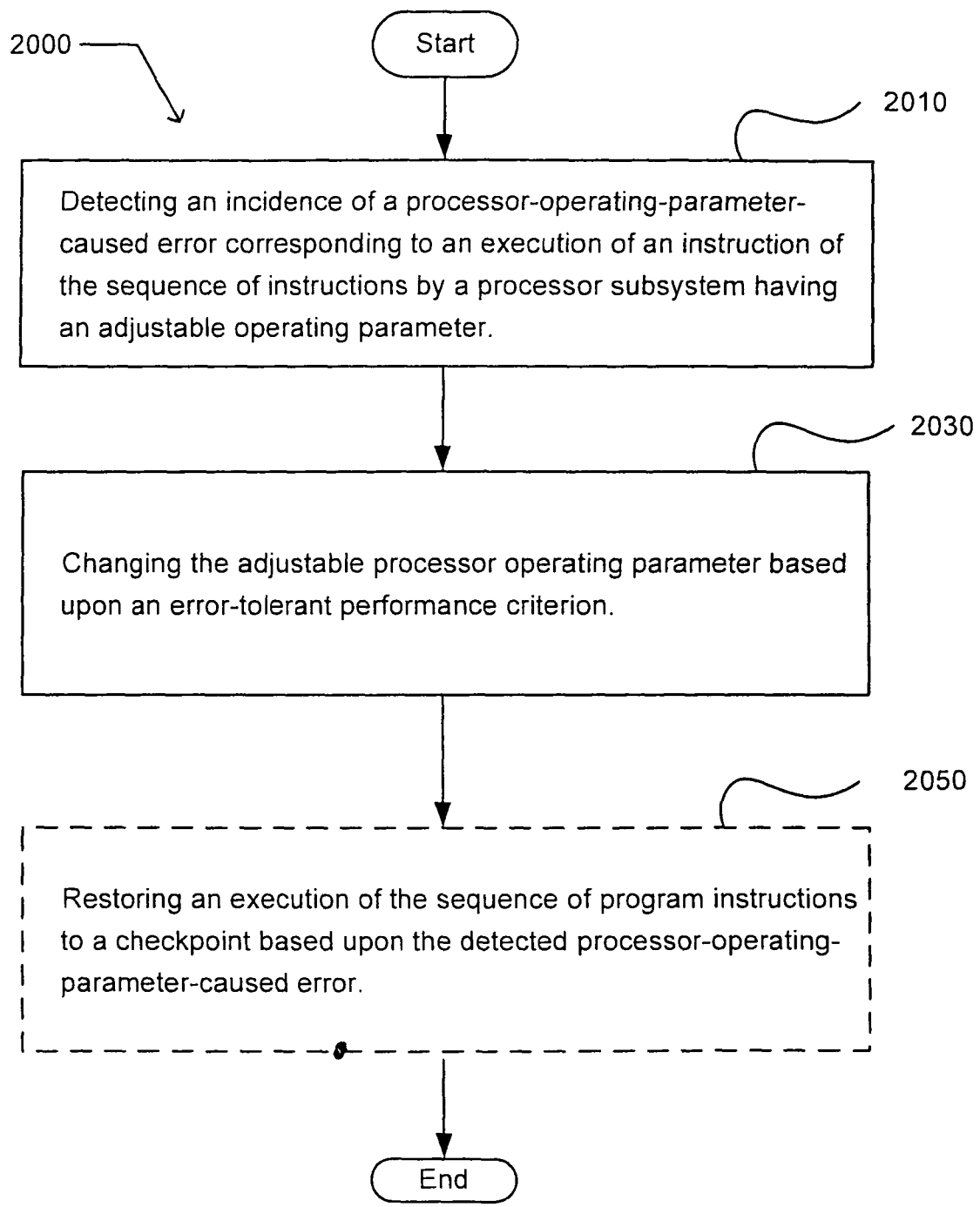
FIG. 42 illustrates another alternative embodiment of the exemplary operational flow of FIG. 38.

FIG. 42 illustrates another alternative embodiment of the exemplary operational flow 2000 of FIG. 38. The operational flow may include at least one additional operation. The additional operation may include an operation 2050. The operation 2050 restores an execution of the sequence of program instructions to a checkpoint based upon the detected processor-operating-parameter-caused error.

FIG. 43 illustrates an exemplary embodiment of a device 2100 in which embodiments may be implemented. The device includes means 2110 for detecting an incidence of a processor-operating-parameter-caused error corresponding to an execution of an instruction of the sequence of instructions by a processor subsystem having an adjustable operating parameter. The device also includes means 2120 for changing the adjustable processor operating parameter based upon an error-tolerant performance criterion. In another embodiment, the device further includes means 2130 for restoring an execution of the sequence of program instructions to a checkpoint based upon the detected processor-operating-parameter-caused error.

Figure 44:
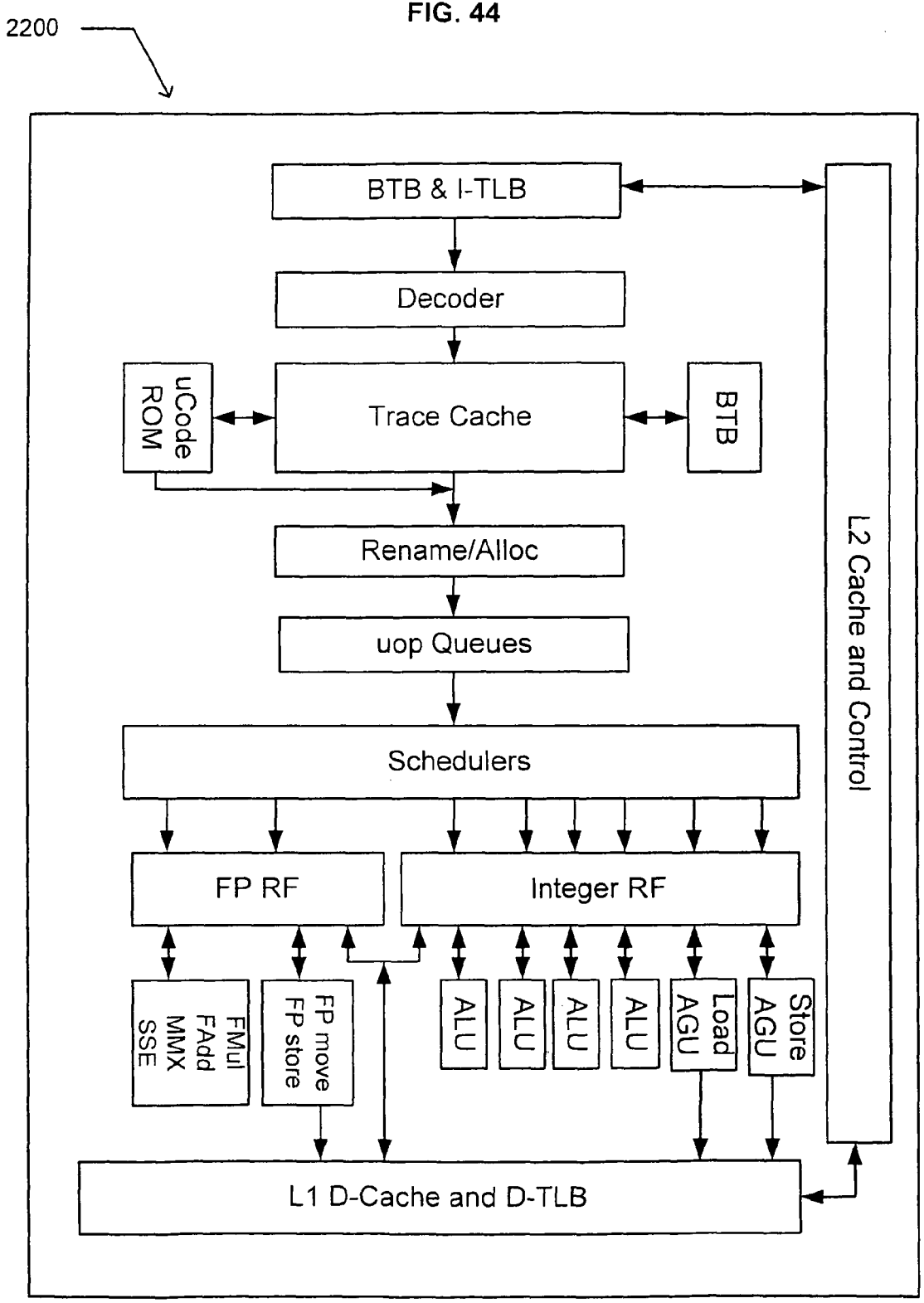
FIG. 44 illustrates an exemplary system that includes synchronous circuit having at least two subcircuit blocks in which embodiments may be implemented.
Figure 45:
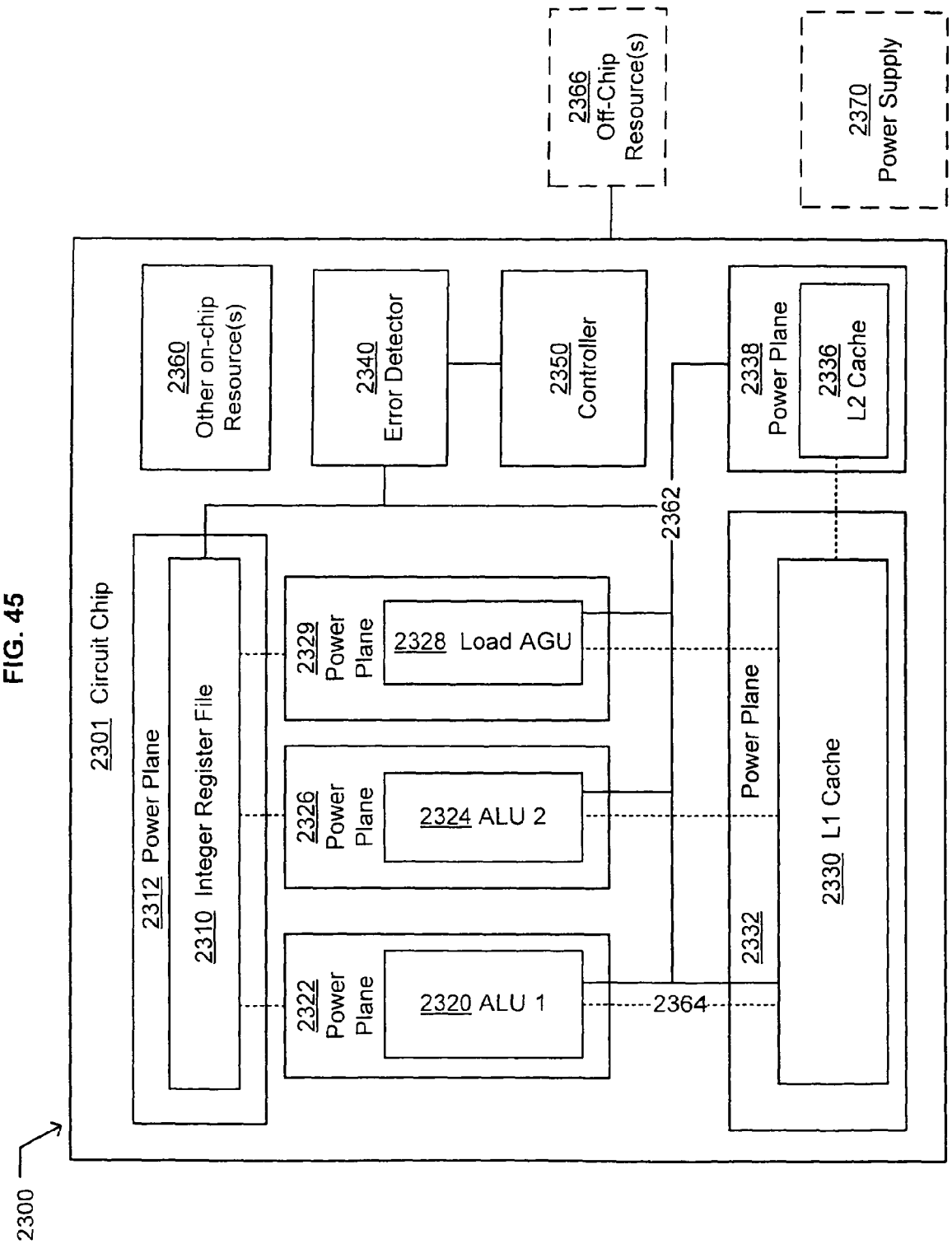
FIG. 45 illustrates an exemplary system that includes a portion of a synchronous circuit having at least two circuit blocks in which embodiments may be implemented.
Figure 46:
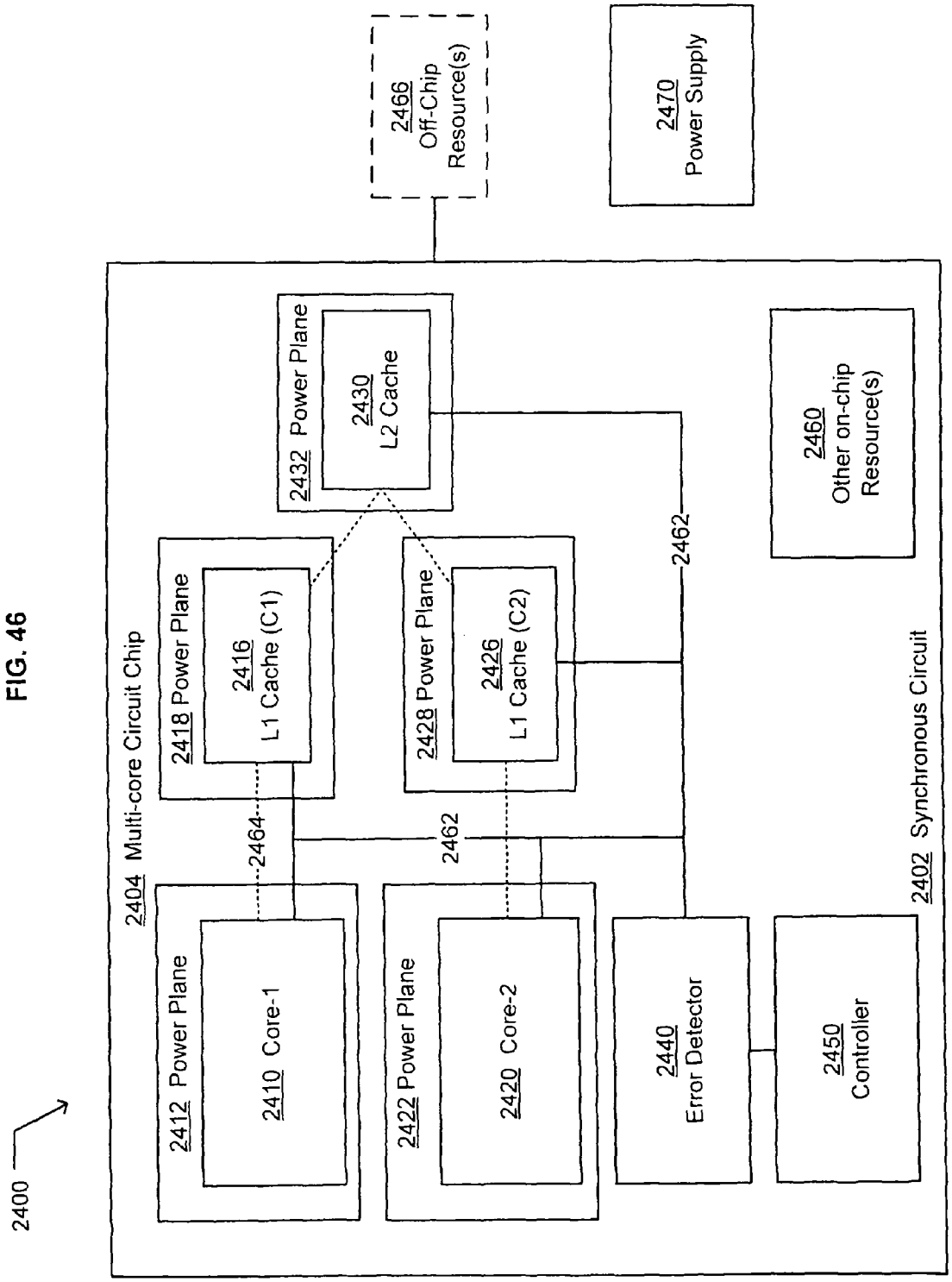
FIG. 46 illustrates an exemplary system that includes a synchronous multicore circuit having at least two subcircuit blocks in which embodiments may be implemented.

FIGS. 44, 45, and 46 include circuit block diagrams illustrating exemplary environments that include synchronous circuits in which embodiments may be implemented. FIG. 44 illustrates an exemplary system 2200 that includes synchronous circuit having at least two subcircuit blocks in which embodiments may be implemented, such as a Pentium® P-4 processor. FIG. 45 illustrates an exemplary system 2300 that includes a portion of a synchronous circuit having at least two circuit blocks in which embodiments may be implemented, such as a portion of the Pentium® P-4 processor illustrated in FIG. 44. FIG. 46 illustrates an exemplary system 2400 that includes a synchronous multicore circuit having at least two subcircuit blocks in which embodiments may be implemented.

An embodiment includes a system. The system may include at least a part of the system 2200 of FIG. 44, the system 2300 of FIG. 45, and/or the system 2400 of FIG. 46. The system includes a synchronous circuit including a first subcircuit powered by a first power plane having a first power plane voltage and a second subcircuit powered by a second power plane having a second power plane voltage. The system also includes an error detector operable to detect an incidence of a computational error occurring in the first subcircuit. The system further includes a controller operable to change the first power plane voltage based upon the detected incidence of a computational error. For example, the first subcircuit may include any circuit block of the circuit blocks illustrated in system 2200 of FIG. 44. The second subcircuit may include any other circuit of the circuit blocks illustrated in FIG. 44.

By way of further example of the above system, the system 2300 of FIG. 45 illustrates six subcircuit blocks in which embodiments may be implemented. The six subcircuits include: an integer register file 2310; an ALU1 2320; an ALU2 2324; a load AGU 2329; an L1 cache 2330; and an L2 cache 2336. The six subcircuit blocks are linked together as appropriate by communications links, illustrated by a communication link 2364. The illustrated embodiment also includes a power plane having a power plane voltage that powers a subcircuit block. A power plane 2312 powers the integer register file 2310; a power plane 2322 powers the ALU1 2320; a power plane 2326 powers the ALU2 2324; a power plane 2329 powers the load AGU 2328; a power plane 2332 powers the L1 cache 2330; and power plane 2338 powers the L2 cache 2336. In an alternative embodiment, one power plane may provide power to two or more subcircuit blocks. A power supply 2370 provides voltages to the power planes via couplers (not illustrated) as appropriate.

Continuing with the further example, the system 2300 further includes an error detector 2340 operable to detect an incidence of a computational error occurring in the first subcircuit. The first subcircuit may include any one or more of the six subcircuit blocks: i.e., the integer register file 2310; the ALU1 2320; the ALU2 2324; the load AGU 2328; the L1 cache 2330; and the L2 cache 2336. The second subcircuit may include any subcircuit block not included in the first subcircuit. The system also includes an error detector 2340. FIG. 45 illustrates an embodiment where a single error detector is coupled to at least two subcircuit blocks via a coupler 2362.

The error detector 2340 may be implemented in any manner and/or technique known to those skilled in the art. In an embodiment, the error detector may be implemented in the DIVA technology. In another embodiment, the error detector may be implemented in the TEATime execution checker algorithm architecture. In a further embodiment, the error detector may be implemented in the RAZOR architectural approach. In another embodiment, the error detector may be implemented employing another synchronous circuit (not shown) operable to execute at least one instruction substantially in parallel with the first subcircuit.

In operation of an embodiment, the system 2300 operates with the power planes receiving a selected voltage or respectively receiving selected voltages from the power supply 2370. For example, an initial operation of the system 2300 may include the power planes each receiving a same voltage, for example 1.40 volts. If the error detector 2340 detects an incidence of a computational error occurring in the ALU2 2324, the controller 2350 causes an increase in the voltage received by the power plane 2326 for the ALU2, for example increasing it to 1.45 volts. In another embodiment, the voltage received by the other power planes remains the same at 1.40 volts. This operational configuration results in less overall power consumption by the system because only the voltage to the power plane 2326 serving ALU2 is increased to address a computational error while the other power plane voltages remain unchanged.

By way of additional example, FIG. 46 illustrates the exemplary system 2400 that includes a synchronous multicore circuit having at least two subcircuit blocks each respectively associated with a power plane. The at least two subcircuit blocks and respectively associated power planes are illustrated as five subcircuit blocks. The five subcircuit blocks include a Core-1 2410 that receives power from a power plane 2412; a Core-2 2420 that receives power from a power plane 2422; an L1 cache 2426 that receives power from a power plane 2428; and a L2 cache 2430 that receives power from a power plane 2432. The system also includes an error detector 2440 operable to detect an incidence of a computational error occurring in the first subcircuit. The system further includes a controller 2450 operable to change the first power plane voltage based upon the detected incidence of a computational error. The system may also include a power supply 2470.

In operation of an embodiment, the system 2400 operates with the power planes receiving a selected voltage or respectively receiving selected voltages from the power supply 2470. For example, an initial operation of the system 2400 may include the power planes each receiving a same voltage, for example 1.10 volts. If the error detector 2440 detects an incidence of a computational error occurring in Core-2 2420, the controller 2450 causes an increase in the voltage received by the power plane 2422 providing power to the Core-2. For example, the voltage of the power plane 2422 may be increased to 1.20 volts. In another embodiment, the voltage received by the other power planes, including the power plane 2412 providing power to the Core-1 2410, remains at 1.10 volts.

The following describes alternative embodiments which may be implemented in the system 2200 described in conjunction with FIG. 44, the system 2300 described in conjunction with FIG. 45, and/or the system 2400 described in conjunction with FIG. 46. Certain reference numbers of one or more of these figures may be cited in the following description as an aid for complying with requirements of §112. However, inclusion of a particular figure, element, and/or reference number in a description is not intended to suggest any limitation as to the structure, scope of use, or functionality of an embodiment. A particular system should not be interpreted as having any dependency or requirement relating to any one or combination of components illustrated in an exemplary operating system. For example, in certain instances, one or more elements of a system may be deemed not necessary and omitted. In other instances, one or more other elements may be deemed necessary and added.

FIG. 45 illustrates an embodiment where the synchronous circuit of the system 2300 includes a synchronous uniprocessor on a chip 2301. The uniprocessor includes a first subsystem powered by a first power plane having a first power plane voltage. The first subsystem may include at least one of the six subcircuit blocks; the integer register file 2310, the ALU1 2320, the ALU2 2324, the load AGU 2328, the L1 cache 2330, and the L2 cache 2336. The second subsystem powered by a second power plane having a second power plane voltage may include any subcircuit block not included as the first subcircuit.

In another embodiment of the system 2300, the synchronous circuit includes a synchronous uniprocessor including a first arithmetic logic unit 2320 powered by a first power plane 2322 having a first power plane voltage and a second arithmetic logic unit 2324 powered by a second power plane 2326 having a second power plane voltage. In a further embodiment, the synchronous circuit includes a synchronous uniprocessor including an arithmetic logic unit powered by a first power plane having a first power plane voltage, such as the ALU1 2320 and/or the ALU2 2324. The synchronous uniprocessor also includes an on-chip cache powered by a second power plane having a second power plane voltage, such as the L1 cache 2330 powered by a power plane 2332 and/or the L2 cache 2336 powered by a power plane 2338.

In an embodiment of the system 2300, the error detector 2340 includes a hardware-implemented error detector operable to detect an incidence of a computational error occurring in the first subcircuit. In another embodiment, the error detector includes one error detector coupled 2362 with both the first subcircuit and the second subcircuit, and operable to detect an incidence of a computational error occurring in the first subcircuit. In a further embodiment, the one error detector includes one error detector coupled with both the first subcircuit and the second subcircuit, and operable to detect an incidence of a computational error occurring in the first subcircuit and/or the second subcircuit. In another embodiment, the error detector includes a first error detector (not shown) coupled with the first subcircuit and a second error detector (not shown) coupled with the second subcircuit. The first error detector and the second error detector are respectfully operable to detect an incidence of a computational error occurring in the first subcircuit and the second subcircuit. In a further embodiment, the error detector includes an error detector coupled with the controller 2350 and operable to detect an incidence of a computational error occurring in the first subcircuit.

In an embodiment, the error detector 2340 includes an error detector operable to detect a computational error corresponding to a setup/hold violation. In another embodiment, the error detector includes an error detector operable to detect at least one incidence of a computational error corresponding to a setup/hold violation, a processor clock speed, a processor voltage, a noise spike, a charged particle, a soft error, a single event upset failure, an unreliable processor hardware, an incorrectly executed instruction, on-chip cache error, an oxide breakdown, an induced error, and/or an electromigration induced error. In a further embodiment, the error detector includes an error detector operable to detect at least one of a single incidence, an incidence frequency, an incidence occurrence rate, an incidence tempo, an incidence pattern, and/or an incidence prevalence of a computational error.

In an embodiment, the controller 2350 operable to change the first power plane voltage based upon the detected incidence of a computational error includes a controller operable to change a first power plane voltage based upon the detected incidence of a computational error without substantially changing the second power plane voltage. In another embodiment, the controller includes a controller implemented in at least one of hardware, software, firmware, and/or a microengine, and operable to change the first power plane voltage based upon the detected incidence of a computational error. In a further embodiment, the controller includes a controller implemented in software associated with at least one of an operating system and/or a program executable by the synchronous circuit and operable to change the first power plane voltage based upon the detected incidence of a computational error. In another embodiment, the controller includes a controller operable to increase the first power plane voltage based upon the detected incidence of a computational error. In a further embodiment, the controller includes a controller operable to decrease the first power plane voltage based upon the detected incidence of a computational error.

In an embodiment of the system, the synchronous circuit, the error detector, and the controller are formed on a single chip. For example, the synchronous circuit, the error detector 2340, and the controller 2350 are formed on a single chip 2301 as illustrated in conjunction with FIG. 45. By way of further example, the synchronous circuit 2402, the error detector 2440, and the controller 2450 are formed on a single chip 2404, as illustrated in conjunction with FIG. 46. In another embodiment, the system further comprises a recovery module (not shown) operable to cause a correction of the computational error.

In a further embodiment, the system further comprises a power supply operable to provide a selected one of at least two voltages to the first power plane in response to the controller. For example, the system may include the system 2300 that includes the power supply 2370, and the controller 2350 of FIG. 45. By way of further example, the system may include the system 2400 that includes the power supply 2470, and the controller 2450 of FIG. 46. In an embodiment, the power supply includes a power supply operable to provide in response to the controller a selected voltage to the first power plane and another selected voltage to the second power plane.

In another embodiment, the power supply includes an on-circuit chip power supply operable to provide a selected one of at least two voltages to the first power plane in response to the controller. In a further embodiment, the power supply includes an off-circuit chip power supply electrically coupled with the circuit and operable to provide a selected one of at least two voltages to the first power plane in response to the controller. In an embodiment, the power supply includes at least one of a DC/DC regulated, a controllable, and/or programmable power supply operable to provide a selected one of at least two voltages to the first power plane in response to the controller. In a further embodiment, the system further includes a power supply configured to electrically engage a portable power source and operable to provide a selected one of at least two voltages to the first power plane in response to the controller.

Embodiments described above in conjunction with FIG. 45 may also be implemented in the exemplary system 2400 of FIG. 46. In addition, FIG. 46 illustrates an embodiment where the synchronous circuit of the system 2400 includes a synchronous processor including a first processor core 2410 powered by a first power plane 2412 having a first power plane voltage and a second processor core 2420 powered by a second power plane 2422 having a second power plane voltage.

Figure 47:
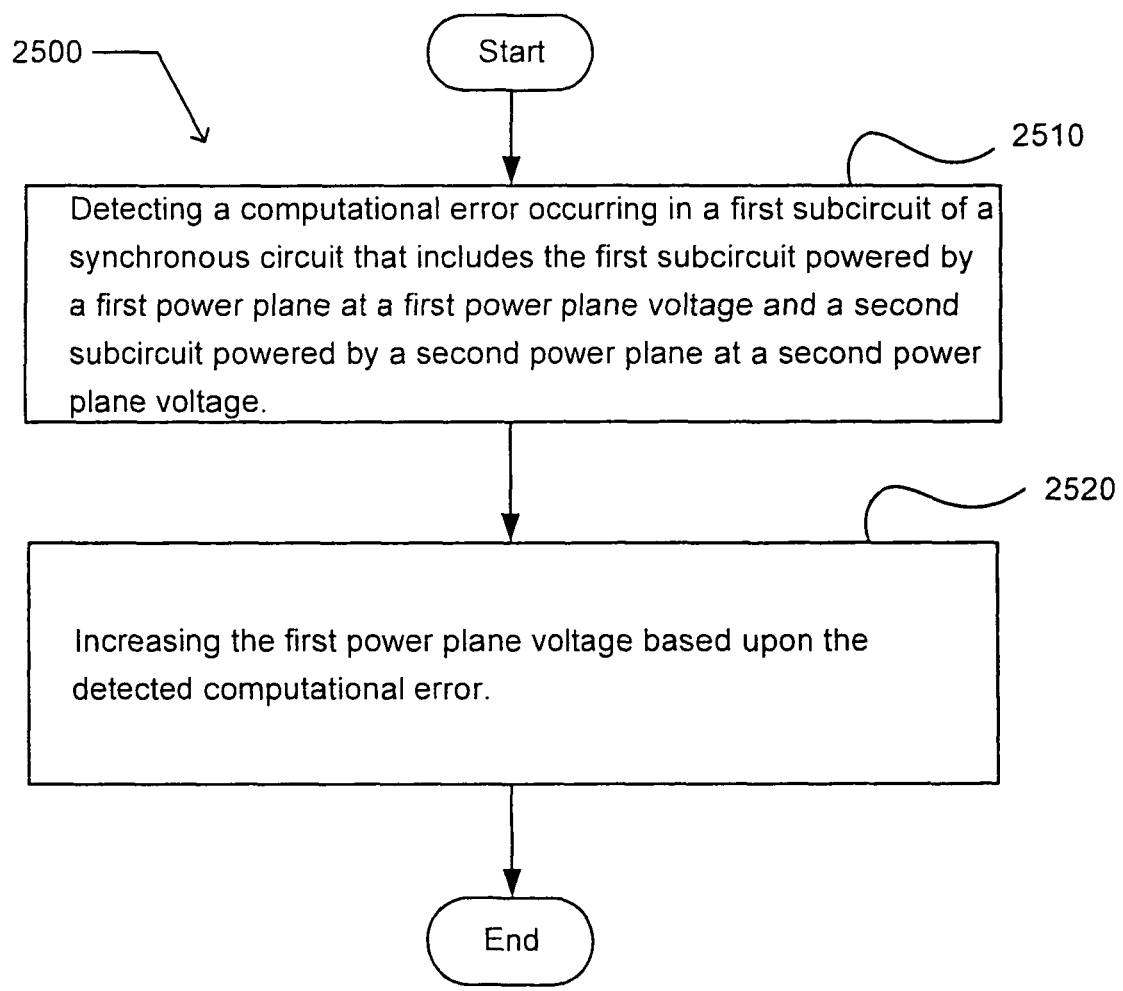
FIG. 47 illustrates an exemplary operational flow.

FIG. 47 illustrates an exemplary operational flow 2500. After a start operation, the flow includes a monitoring operation 2510. The monitoring operation detects a computational error occurring in a first subcircuit of a synchronous circuit. The synchronous circuit includes the first subcircuit powered by a first power plane at a first power plane voltage and a second subcircuit powered by a second power plane at a second power plane voltage. A tuning operation 2520 increases the first power plane voltage based upon the detected computational error. The operational flow then proceeds to an end operation.

Figure 48:
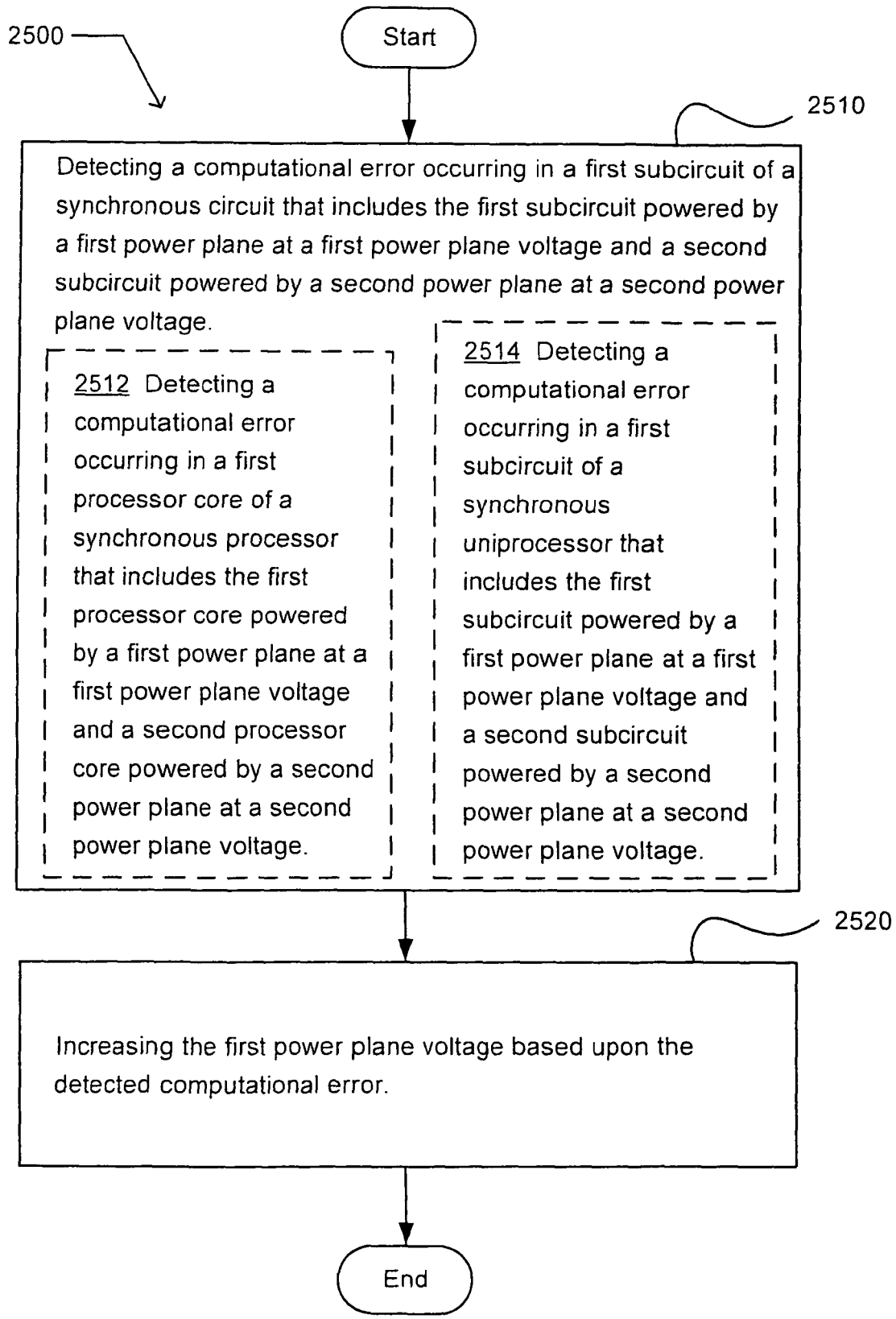
FIG. 48 illustrates an alternative embodiment of the exemplary operational flow of FIG. 47.

FIG. 48 illustrates an alternative embodiment of the exemplary operational flow 2500 of FIG. 47. The monitoring operation 2510 may include at least one additional operation. The at least one additional operation may include an operation 2512, and/or an operation 2514. The operation 2512 detects a computational error occurring in a first processor core of a synchronous processor that includes the first processor core powered by a first power plane at a first power plane voltage and a second processor core powered by a second power plane at a second power plane voltage. The operation 2514 detects a computational error occurring in a first subcircuit of a synchronous uniprocessor that includes the first subcircuit powered by a first power plane at a first power plane voltage and a second subcircuit powered by a second power plane at a second power plane voltage.

Figure 49:
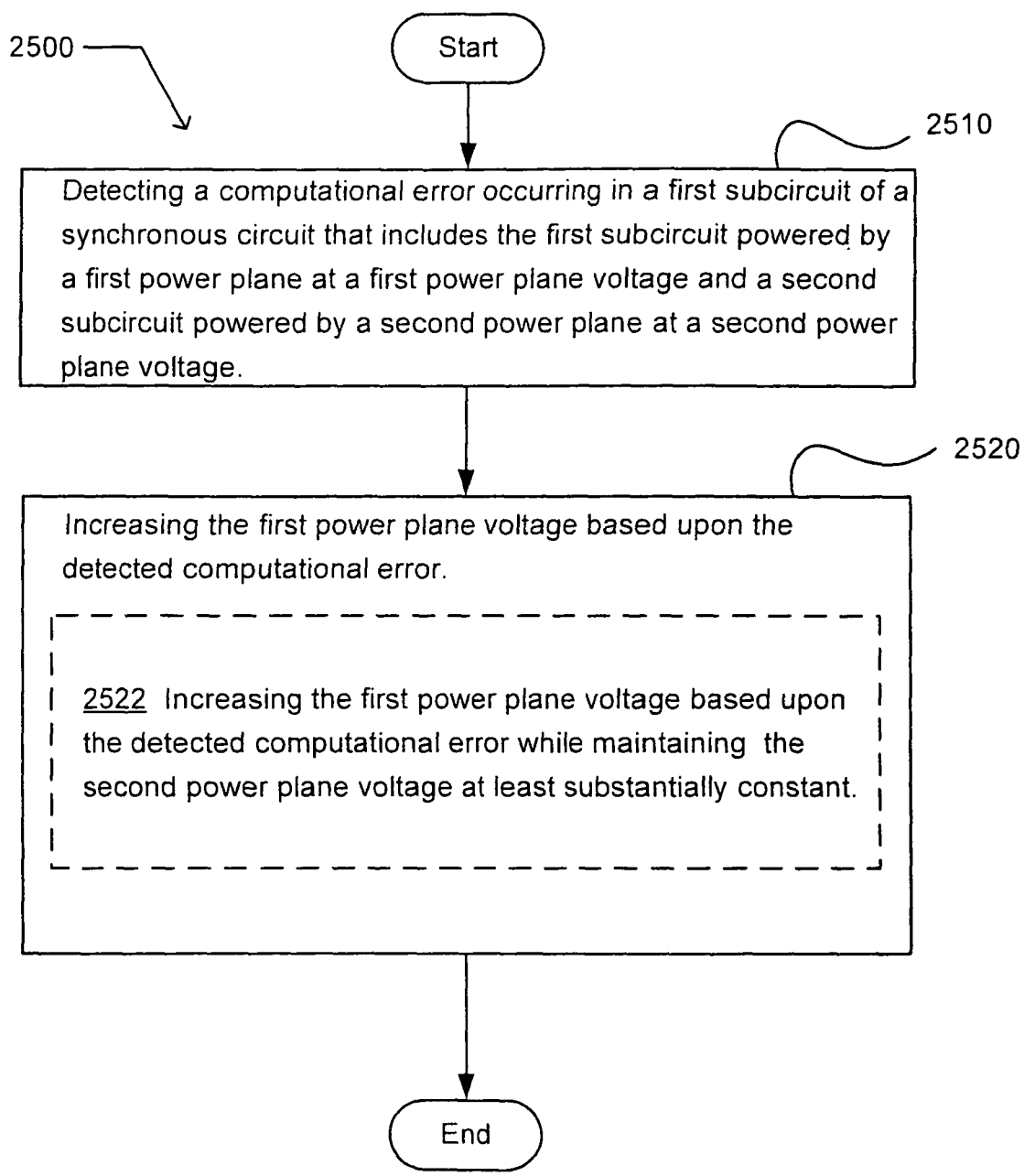
FIG. 49 illustrates another alternative embodiment of the exemplary operational flow of FIG. 47.

FIG. 49 illustrates another alternative embodiment of the exemplary operational flow 2500 of FIG. 47. The tuning operation 2520 may include at least one additional operation, such as an operation 2522. The operation 2522 increases the first power plane voltage based upon the detected computational error while maintaining the second power plane voltage at least substantially constant.

FIG. 50 illustrates a further alternative embodiment of the exemplary operational flow 2500 of FIG. 47. The exemplary operational flow may include at least one additional operation, such as an operation 2530. The operation 2530 operates the first subcircuit at a first power plane voltage. The operation 2530 may include at least one additional operation. The at least one additional operation may include an operation 2532 and/or an operation 2534. The operation 2532 operates the first subcircuit at an initial first power plane voltage. The operation 2534 decreases the first power plane voltage.

FIG. 51 illustrates a partial view of an exemplary device 2550 in which embodiments may be implemented. The device includes means 2560 for detecting a computational error occurring in a first subcircuit of a synchronous circuit. The synchronous including the first subcircuit powered by a first power plane at a first power plane voltage and a second subcircuit powered by a second power plane at a second power plane voltage. The device also includes means 2570 for increasing the first power plane voltage based upon the detected computational error.

In an embodiment, the device 2550 also includes means 2580 for operating the first subcircuit at an initial first power plane voltage. In another embodiment, the device also includes means 2590 for decreasing the first power plane voltage.

Figure 52:
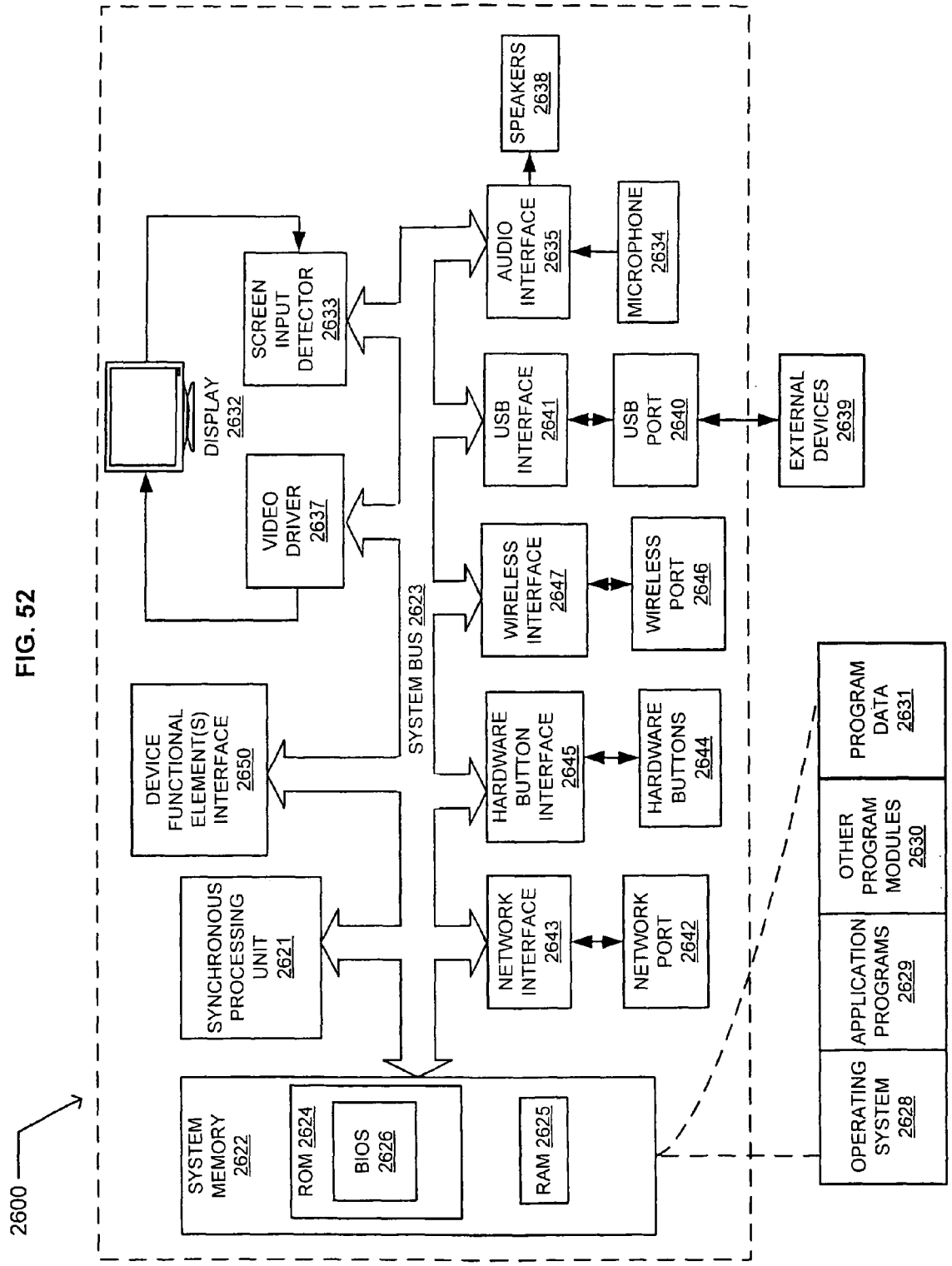
FIG. 52 illustrates a partial view of an exemplary environment in which embodiments may be implemented.

FIG. 52 illustrates a partial view of an exemplary environment in which embodiments may be implemented. FIG. 52 and the following discussion are intended to provide a brief, general description of the environment. FIG. 52 illustrates an exemplary thin computing device 2600 that interfaces with an electronic device (not shown) that includes one or more functional elements. For example, the electronic device may include any item having electrical and/or electronic components playing a role in a functionality of the item, such as a portable electronic device, a limited resource computing device, a digital camera, a cell phone, a printer, a refrigerator, a car, and an airplane. The thin computing device 2600 includes a synchronous processing unit 2621, a system memory 2622, and a system bus 2623 that couples various system components including the system memory 2622 to the synchronous processing unit 2621. The system bus 2623 may be any of several types of bus structures including a memory bus or memory controller, a peripheral bus, and a local bus using any of a variety of bus architectures. The system memory includes read-only memory (ROM) 2624 and random access memory (RAM) 2625. A basic input/output system (BIOS) 2626, containing the basic routines that help to transfer information between sub-components within the thin computing device 2600, such as during start-up, is stored in the ROM 2624. A number of program modules may be stored in the ROM 2624 and/or RAM 2625, including an operating system 2628, one or more application programs 2629, other program modules 2630 and program data 2631.

A user may enter commands and information into the computing device 2600 through input devices, such as a number of switches and buttons, illustrated as hardware buttons 2644, connected to the electronic device via a suitable interface 2645. Input devices may further include a touch-sensitive display screen 2632 with suitable input detection circuitry 2633. The output circuitry of the touch-sensitive display 2632 is connected to the system bus 2623 via a video driver 2637. Other input devices may include a microphone 2634 connected through a suitable audio interface 2635, and a physical hardware keyboard (not shown). In addition to the display 2632, the computing device 2600 may include other peripheral output devices, such as at least one speaker 2638.

Other external input or output devices 2639, such as a joystick, game pad, satellite dish, scanner or the like may be connected to the processing unit 2621 through a USB port 2640 and USB port interface 2641, to the system bus 2623. Alternatively, the other external input and output devices 2639 may be connected by other interfaces, such as a parallel port, game port or other port. The computing device 2600 may further include or be capable of connecting to a flash card memory (not shown) through an appropriate connection port (not shown). The computing device 2600 may further include or be capable of connecting with a network through a network port 2642 and network interface 2643, and/or connecting through wireless port 2646 and corresponding wireless interface 2647. In addition, these connections may facilitate communication with other peripheral devices, including other computers, printers, and so on (not shown). It will be appreciated that the various components and connections shown are exemplary and other components and means of establishing communications links may be used.

The computing device 2600 may be primarily designed to include a user interface having a character, key-based, user input, or user data input via the touch sensitive display 2632 using a stylus (not shown). Moreover, the user interface is not limited to an actual touch-sensitive panel arranged for directly receiving input, but may alternatively or in addition respond to another input device, such as the microphone 2634. For example, spoken words may be received at the microphone 2634 and recognized. Alternatively, the computing device 2600 may be designed to include a user interface having a physical keyboard (not shown).

The thin computing device 2600 functional elements (not shown) may be typically application specific and related to a function of the electronic device. The device functional elements are driven by a device functional element(s) interface 2650, which coupled with the system bus 2623. A functional element may typically perform a single well-defined task with little or no user configuration or setup, such as a refrigerator keeping food cold, a cell phone connecting with an appropriate tower and transceiving voice or data information, and/or a camera capturing and saving an image.

Figure 53:
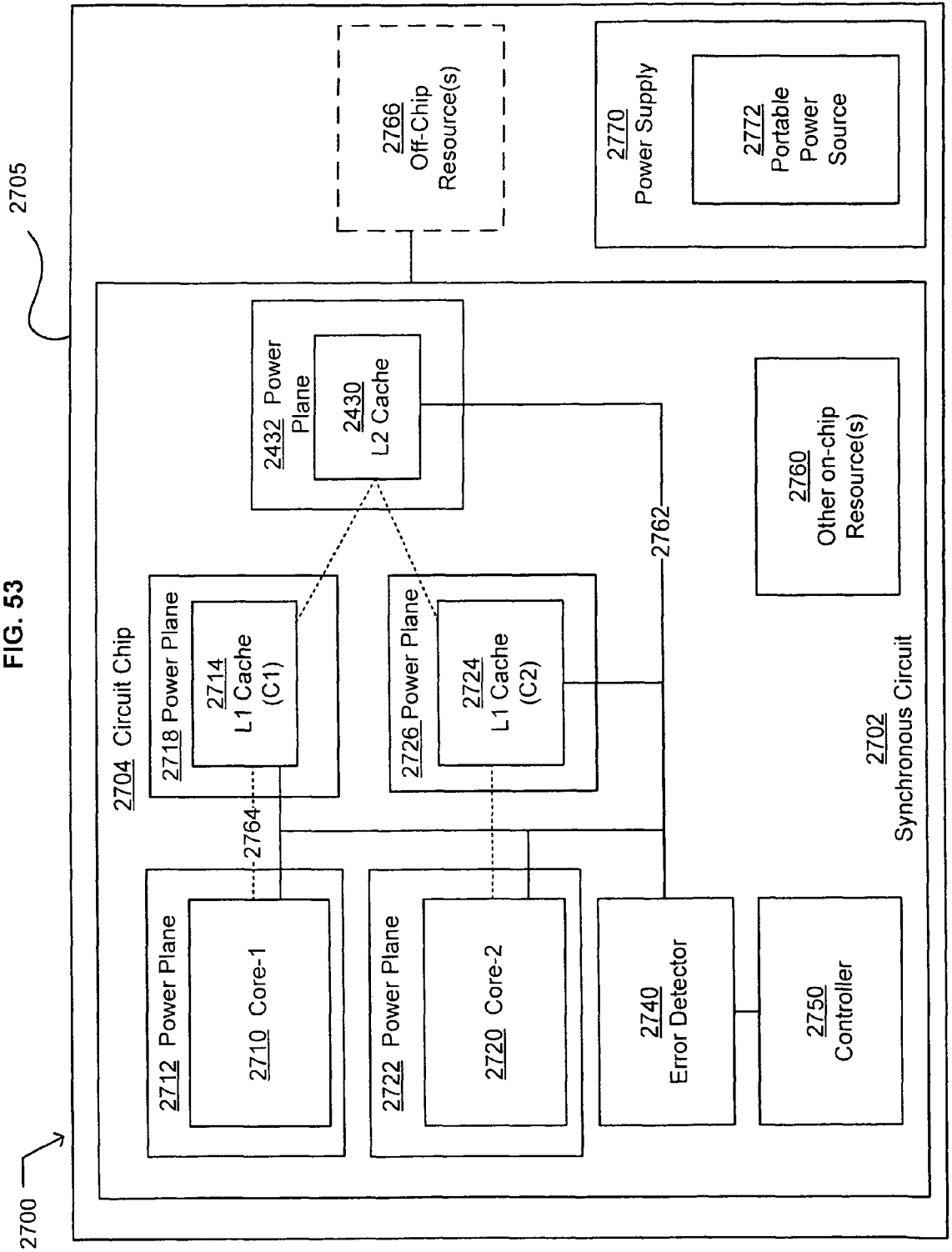
FIG. 53 illustrates an exemplary system in which embodiments may be implemented.

FIG. 53 illustrates an exemplary system 2700 in which embodiments may be implemented. The system includes an apparatus 2705. The apparatus includes a synchronous circuit 2702. The synchronous circuit includes a first subcircuit powered by a first power plane having a first power plane voltage and a second subcircuit powered by a second power plane having a second power plane voltage. The first subcircuit includes at least one of a Core-1 2710 having a power plane 2712; a L1 cache (C1) having a power plane 2718; a Core-2 2720 having a power plane 2722; a L1 cache (C2) and/or an L2 cache 2430 having a power plane 2432. The second subcircuit may include at least one subcircuit not selected as the first subcircuit. In an embodiment, the thin computing device 2600 described in conjunction with FIG. 52 may include the synchronous circuit. The apparatus 2705 also includes an error detector 2740 operable to detect an incidence of a computational error occurring in the first subcircuit. The apparatus further includes a controller 2750 operable to change the first power plane voltage based upon the detected incidence of a computational error.

The apparatus also includes a power supply 2770. The power supply is configured to electrically couple with a portable power source 2772 and operable to provide a selected one of at least two voltages to the first power plane in response to the controller. In an embodiment, the apparatus 2705 powered by the power supply may include the thin computing device of FIG. 52 that interfaces with an electronic device. In an embodiment, the configuration of the power supply to accept the portable power source imparts mobility and/or portability to the thin computing device and thus the electronic device. The electronic device may include a handheld device, a wireless device, a camera, a laptop computer, a game console, a cell phone, a pager, a PDA, a global positioning unit, a satellite, media player, an electronic scanner, an electronic book reader, and/or a browsing device.

In an embodiment, the synchronous circuit further includes a synchronous processor including a first processor core powered by a first power plane having a first power plane voltage and a second processor core powered by a second power plane having a second power plane voltage. In another embodiment, the synchronous circuit further includes a synchronous uniprocessor including a first subcircuit powered by a first power plane having a first power plane voltage and a second subcircuit powered by a second power plane having a second power plane voltage. In an embodiment, the error detector includes a hardware-implemented error detector operable to detect an incidence of a computational error occurring in the first subcircuit.

In another embodiment, the power supply includes a power supply configured to electrically couple with a replaceable portable power source and operable to provide a selected one of at least two voltages to the first power plane in response to the controller. In a further embodiment, the power supply includes a power supply configured to electrically couple with a selectively replaceable portable power source and operable to provide a selected one of at least two voltages to the first power plane in response to the controller. In an embodiment, the power supply includes a power supply configured to electrically couple with a rechargeable portable power source and operable to provide a selected one of at least two voltages to the first power plane in response to the controller. In another embodiment, the power supply includes a power supply configured to electrically couple with at least one of a battery, a rechargeable battery, a replaceable battery, a fuel cell, an energy harvesting system, a capacitor, and/or a selectively removable power source and operable to provide a selected one of at least two voltages to the first power plane in response to the controller.

In an embodiment, the power supply includes a power supply electrically coupled with at least one of a battery, a rechargeable battery, a replaceable battery, a fuel cell, an energy harvesting system, a capacitor, and/or a selectively removable power source and operable to provide a selected one of at least two voltages to the first power plane in response to the controller. In another embodiment, the power supply includes a power supply configured to electrically couple with a portable power source and operable to provide a selected one of at least two voltages to the first power plane in response to the controller and another selected voltage to the second power plane. In a further embodiment, the power supply includes at least one of a DC/DC regulated, a controllable, and/or programmable power supply configured to electrically couple with a portable power source and operable to provide a selected one of at least two voltages to the first power plane in response to the controller.

Figure 54:
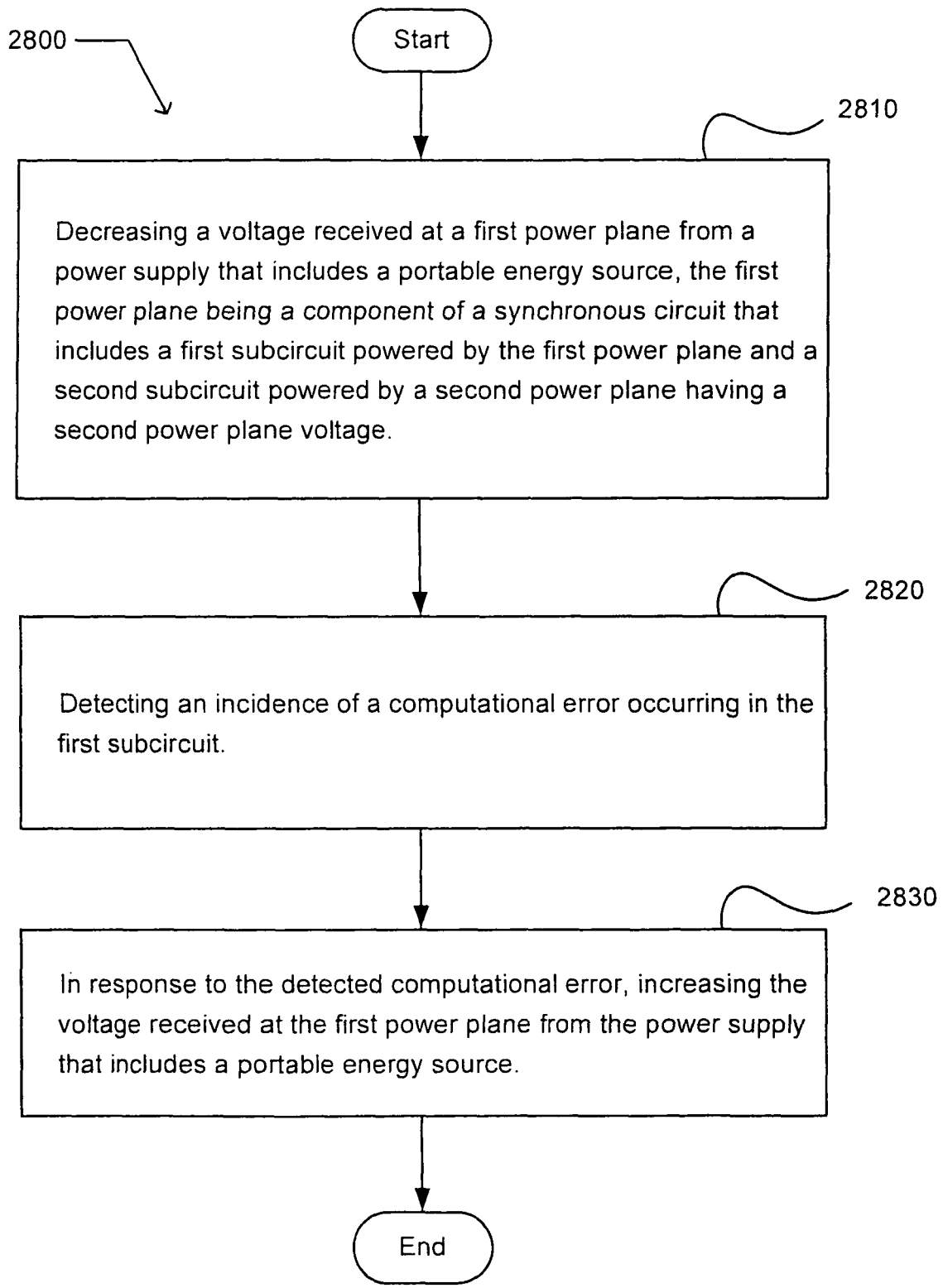
FIG. 54 illustrates an exemplary operational flow.

FIG. 54 illustrates an exemplary operational flow 2800. After a start operation, the operational flow includes a conservation operation 2810. The conservation operation decreases a voltage received at a first power plane from a power supply that includes a portable energy source. The first power plane is a component of a synchronous circuit that includes a first subcircuit powered by the first power plane and a second subcircuit powered by a second power plane having a second power plane voltage. A monitoring operation 2820 detects an incidence of a computational error occurring in the first subcircuit. An adjustment operation 2830 increases the voltage received at the first power plane from the power supply that includes a portable energy source in response to the detected computational error.

Operation of an embodiment may be illustrated with reference to the system 2700 of FIG. 53. An initial voltage is supplied to the first power plane of the synchronous circuit from the power supply that includes an energy source. For example, a voltage of 1.60 volts may be initially supplied to the power plane 2722 associated with the Core-2 2720 described in conjunction with FIG. 53. The energy source may include a replaceable battery and/or rechargeable battery. The conservation operation 2810 decreases the voltage received at the first power plane in an increment of 0.10 volts to 1.50 volts. Decreasing the voltage received at the first power plane reduces electrical power supplied by the power supply, and correspondingly, reduces power drawn from an energy source coupled to the power supply. The monitoring operation monitors operations related to the Core-2, and detects an incidence of a computational error occurring in the Core-2. For example, the incidence may include an incidence rate of computational errors exceeding a predetermined number of computational errors per $10^{10}$ clock cycles, such as 10 computational errors per $10^{10}$ clock cycles. The adjustment operation 2830 increases the voltage received at the first power plane in response to the detected computational error. The voltage received may be increased to the previous 1.60 volts from the 1.50 volts, or increased to another value.

Operation of another embodiment may be illustrated with reference to the system 2700. The conservation operation 2810 decreases the 1.60 voltage received at the first power plane in increments of 0.05 volts until a selected incidence of a computational error is detected occurring in the Core-2 by the monitoring operation 2820. Assuming for illustrative purposes that the predetermined incidence of computational errors is detected at a first power plane voltage of 1.45 volts. In response to the detection of the predetermined incidence of computational errors corresponding to the Core-2, the adjustment operation 2830 increases the first power plane voltage. For example, the adjustment operation may increase the first power plane voltage to 1.50, and the monitoring operation continues detection for the selected incidence of computational errors. If the selected incidence of predetermined computational errors is detected at 1.50 volts, the adjustment operation may increase the first power plane voltage to 1.55. In another alternative embodiment, if the monitoring operation does not detect the selected incidence of computational errors corresponding to Core-2, the conservation operation again decreases the first power plane voltage and the operational flow 2800 repeated.

Figure 55:
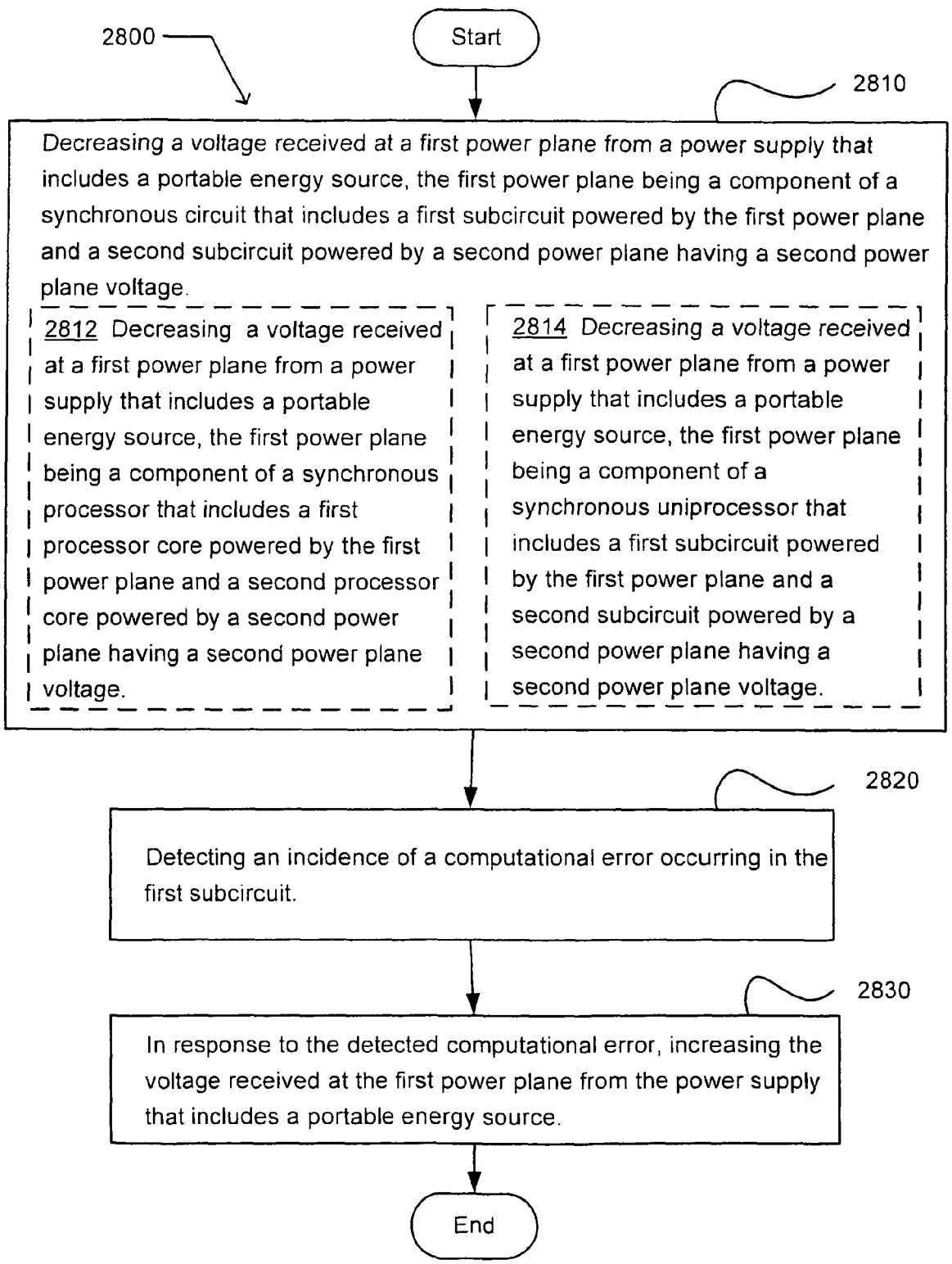
FIG. 55 illustrates an alternative embodiment of the exemplary operational flow of FIG. 54.

FIG. 55 illustrates an alternative embodiment of the exemplary operational flow 2800 of FIG. 54. The conservation operation 2810 may include at least one additional operation. The at least one additional operation may include an operation 2812 and/or an operation 2814. The operation 2812 decreases a voltage received at a first power plane from a power supply that includes a portable energy source. The first power plane being a component of a synchronous processor that includes a first processor core powered by the first power plane and a second processor core powered by a second power plane having a second power plane voltage. The operation 2814 decreases a voltage received at a first power plane from a power supply that includes a portable energy source. The first power plane being a component of a synchronous uniprocessor that includes a first subcircuit powered by the first power plane and a second subcircuit powered by a second power plane having a second power plane voltage.

Figure 56:
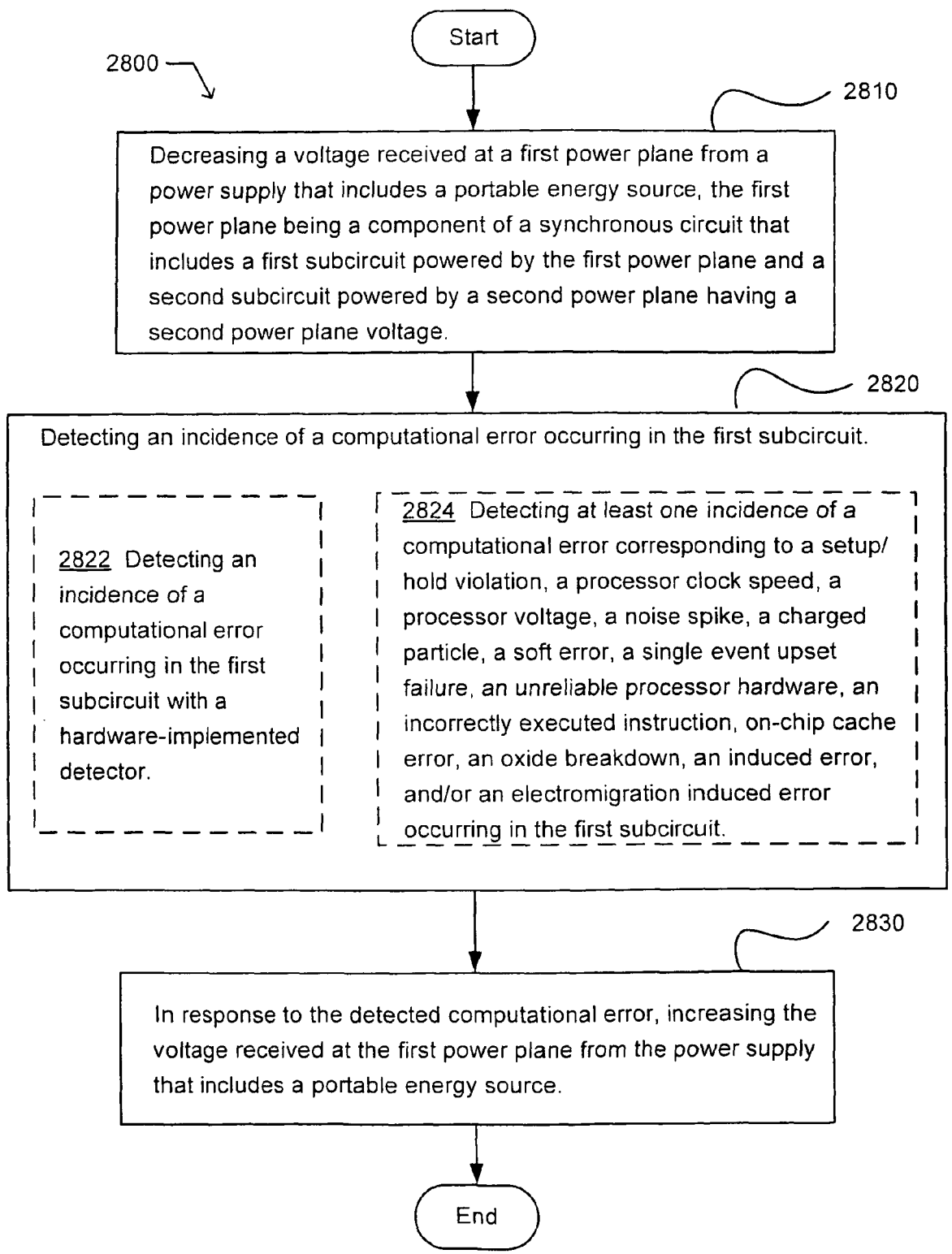
FIG. 56 illustrates an alternative embodiment of the exemplary operational flow of FIG. 54.

FIG. 56 illustrates an alternative embodiment of the exemplary operational flow 2800 of FIG. 54. The monitoring operation 2820 may include at least one additional operation. The at least one additional operation may include an operation 2822 and/or an operation 2824. The operation 2822 detects an incidence of a computational error occurring in the first subcircuit with a hardware-implemented detector. The operation 2824 detects at least one incidence of a computational error corresponding to a setup/hold violation, a processor clock speed, a processor voltage, a noise spike, a charged particle, a soft error, a single event upset failure, an unreliable processor hardware, an incorrectly executed instruction, on-chip cache error, an oxide breakdown, an induced error, and/or an electromigration induced error occurring in the first subcircuit.

Figure 57:
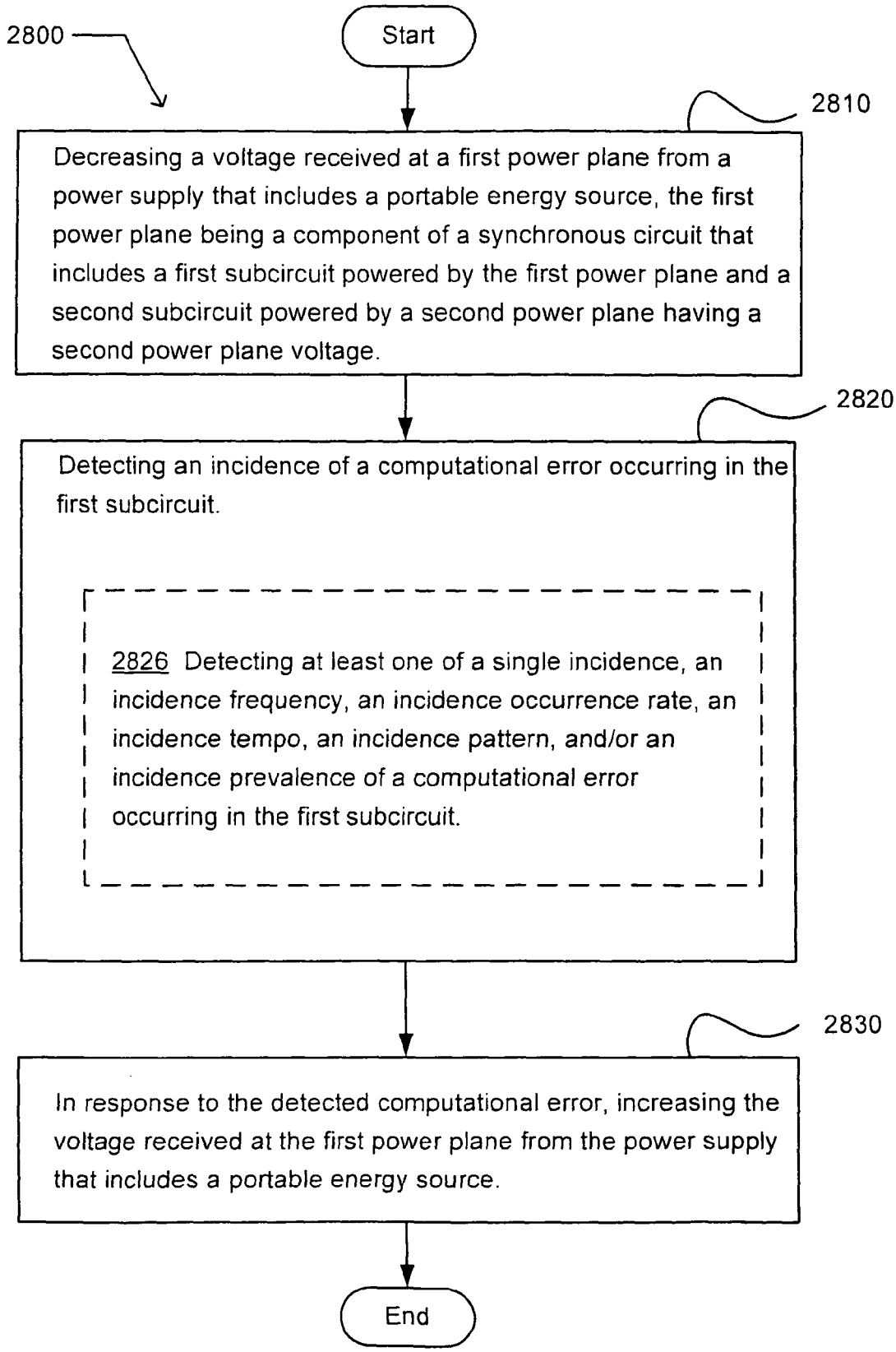
FIG. 57 illustrates an alternative embodiment of the exemplary operational flow of FIG. 54.

FIG. 57 illustrates an alternative embodiment of the exemplary operational flow 2800 of FIG. 54. The monitoring operation 2820 may include at least one additional operation, such as the operation 2826. The operation 2826 detects at least one of a single incidence, an incidence frequency, an incidence occurrence rate, an incidence tempo, an incidence pattern, and/or an incidence prevalence of a computational error occurring in the first subcircuit.

Figure 58:
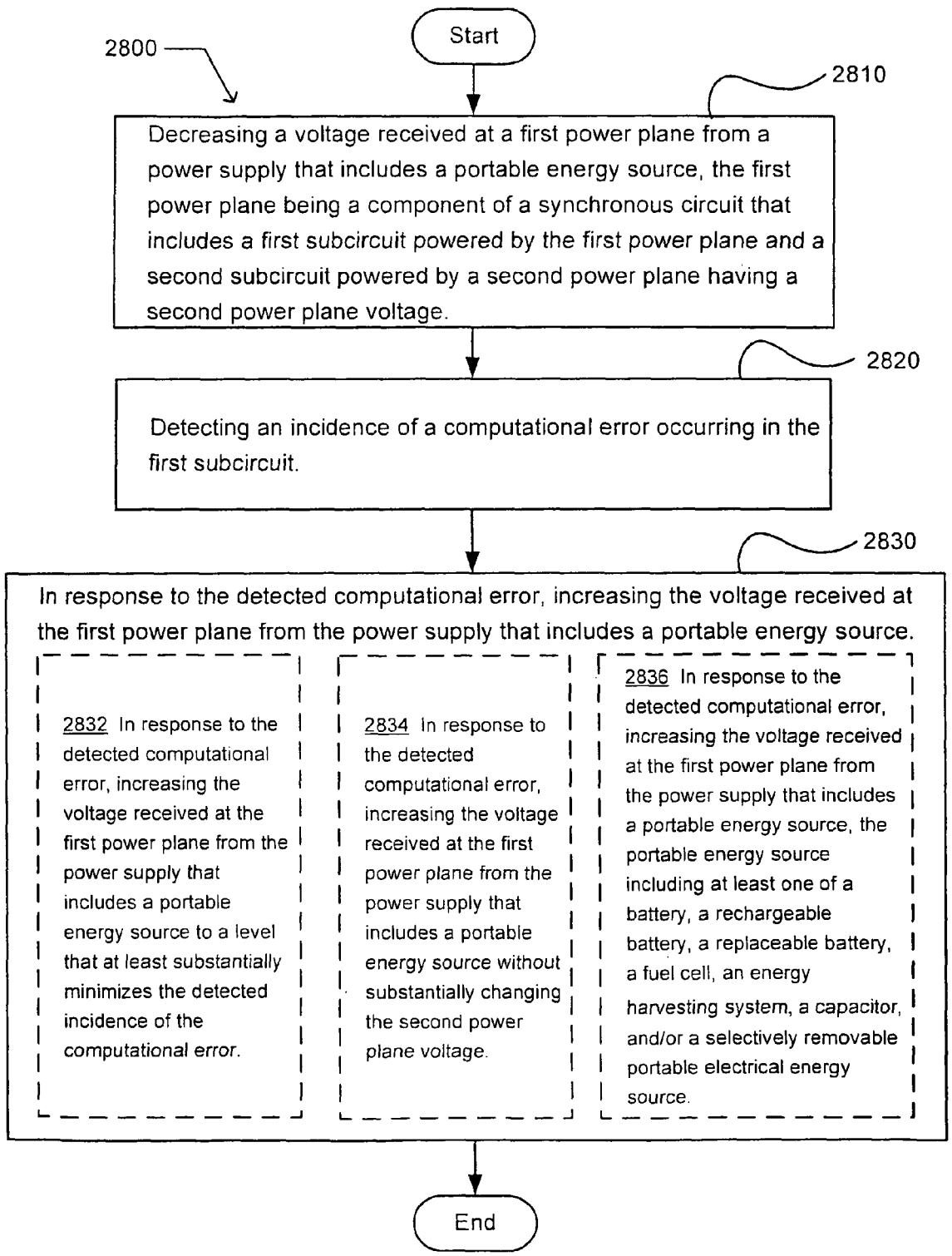
FIG. 58 illustrates an alternative embodiment of the exemplary operational flow of FIG. 54.

FIG. 58 illustrates an alternative embodiment of the exemplary operational flow 2800 of FIG. 54. The adjustment operation 2830 may include at least one additional operation. The at least one additional operation may include an operation 2832, an operation 2834, and/or an operation 2836. The operation 2832, in response to the detected computational error, increases the voltage received at the first power plane from the power supply that includes a portable energy source to a level that at least substantially minimizes the detected incidence of the computational error. The operation 2834, in response to the detected computational error, increases the voltage received at the first power plane from the power supply that includes a portable energy source without substantially changing the second power plane voltage. The operation 2836, in response to the detected computational error, increases the voltage received at the first power plane from the power supply that includes a portable energy source, the portable energy source including at least one of a battery, a rechargeable battery, a replaceable battery, a fuel cell, an energy harvesting system, a capacitor, and/or a selectively removable portable electrical energy source.

FIG. 59 illustrates an exemplary apparatus 2900 in which embodiments may be implemented. The apparatus includes means 2910 for decreasing a voltage received at a first power plane from a power supply that includes a portable energy source. The first power plane is a component of a synchronous circuit that includes a first subcircuit powered by the first power plane and a second subcircuit powered by a second power plane having a second power plane voltage. The apparatus also includes means 2920 for detecting an incidence of a computational error occurring in the first subcircuit. The apparatus further includes means 2930 for increasing in response to the detected computational error the voltage received at the first power plane from the power supply that includes a portable energy source.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof.

In addition, those skilled in the art will appreciate that the mechanisms of the subject matter described herein are capable of being distributed as a program product in a variety of forms, and that an illustrative embodiment of the subject matter described herein applies equally regardless of the particular type of signal-bearing media used to actually carry out the distribution. Examples of a signal-bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computing system comprising:
    an integrated circuit chip including at least one synchronous circuit including (i) a first subcircuit powered by a first power plane having a first power plane voltage and (ii) a second subcircuit powered by a second power plane having a second power plane voltage;
    an error detector operable to execute a process to detect an incidence of a computational error occurring in the first subcircuit; and
    a controller operable to increase the first power plane voltage based upon the detected incidence of a computational error without a logically corresponding increase in the second power plane voltage.

2. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
    a synchronous processor including (i) a first processor core powered by a first power plane having a first power plane voltage and (ii) a second processor core powered by a second power plane having a second power plane voltage.

3. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
   a synchronous uniprocessor including (i) a first subsystem powered by a first power plane having a first power plane voltage and (ii) a second subsystem powered by a second power plane having a second power plane voltage.

4. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
   a synchronous uniprocessor including (i) a first arithmetic logic unit powered by a first power plane having a first power plane voltage and (ii) a second arithmetic logic unit powered by a second power plane having a second power plane voltage.

5. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
   a synchronous uniprocessor including (i) an arithmetic logic unit powered by a first power plane having a first power plane voltage and (ii) an on-chip cache powered by a second power plane having a second power plane voltage.

6. The computing system of claim 1, wherein the error detector operable to execute a process to detect an incidence of a computational error occurring in the first subcircuit comprises:
   a hardware-implemented error detector operable to detect an incidence of a computational error occurring in the first subcircuit.

7. The computing system of claim 1, wherein the error detector operable to execute a process to detect an incidence of a computational error occurring in the first subcircuit comprises:
   one error detector (i) coupled with both the first subcircuit and the second subcircuit and (ii) operable to detect an incidence of a computational error occurring in the first subcircuit.

8. The computing system of claim 7, wherein the one error detector (i) coupled with both the first subcircuit and the second subcircuit and (ii) operable to detect an incidence of a computational error occurring in the first subcircuit comprises:
   one error detector (i) coupled with both the first subcircuit and the second subcircuit and (ii) operable to detect an incidence of a computational error occurring in the first subcircuit or the second subcircuit.

9. The computing system of claim 1, wherein the error detector operable to execute a process to detect an incidence of a computational error occurring in the first subcircuit comprises:
   a first error detector coupled with the first subcircuit and a second error detector coupled with the second subcircuit, the first error detector and the second error detector respectively being operable to detect an incidence of a computational error occurring in the first subcircuit and the second sub circuit.

10. The computing system of claim 1, wherein the error detector operable to execute a process to detect an incidence of a computational error occurring in the first subcircuit comprises:
    an error detector coupled with the controller and operable to detect an incidence of a computational error occurring in the first subcircuit.

11. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
    an integrated circuit chip including at least one synchronous circuit including (i) a first arithmetic logic unit powered by a first power plane having a first power plane voltage and (ii) a second arithmetic logic unit powered by a second power plane having a second power plane voltage.

12. The computing system of claim 1, wherein the detected incidence of a computational error corresponds to at least one of a setup/hold violation, a noise spike, a charged particle, a single event upset failure, an unreliable processor hardware, an incorrectly executed instruction, an oxide breakdown, an electromigration induced error, a processor clock speed, a processor voltage, a soft error, an on-chip cache error, or an induced error.

13. The computing system of claim 1, wherein the error detector operable to execute a process to detect an incidence of a computational error occurring in the first subcircuit comprises:
    an error detector operable to detect at least one of a single incidence, an incidence frequency, an incidence occurrence rate, an incidence tempo, an incidence pattern, or an incidence prevalence of a computational error.

14. The computing system of claim 1, wherein the controller operable to increase the first power plane voltage based upon the detected incidence of a computational error without a logically corresponding increase in the second power plane voltage comprises:
    a controller operable to increase the first power plane voltage based upon the detected incidence of a computational error without substantially increasing the second power plane voltage.

15. The computing system of claim 1, wherein the controller operable to increase the first power plane voltage based upon the detected incidence of a computational error without a logically corresponding increase in the second power plane voltage comprises:
    a controller operable to decrease the first power plane voltage based upon a detected incidence of a computational error occurring in the first subcircuit without a logically corresponding decrease in the second power plane voltage.

16. The computing system of claim 1, wherein the controller operable to increase the first power plane voltage based upon the detected incidence of a computational error without a logically corresponding increase in the second power plane voltage comprises:
    a controller (i) implemented in at least one of hardware, software, firmware, or a microengine and (ii) operable to increase the first power plane voltage based upon the detected incidence of a computational error without a logically corresponding increase in the second power plane voltage.

17. The computing system of claim 1, wherein the controller operable to increase the first power plane voltage based upon the detected incidence of a computational error without a logically corresponding increase in the second power plane voltage comprises:
a controller implemented in software associated with at least one of an operating system or a program executable by the integrated circuit chip and operable to increase the first power plane voltage based upon the detected incidence of a computational error without a logically corresponding increase in the second power plane voltage.

18. The computing system of claim 1, wherein the integrated circuit chip including at least one synchronous circuit including (i) a first subcircuit powered by a first power plane having a first power plane voltage and (ii) a second subcircuit powered by a second power plane having a second power plane voltage comprises:
an integrated circuit chip including at least one synchronous circuit including (i) an arithmetic logic unit powered by a first power plane having a first power plane voltage and (ii) a cache powered by a second power plane having a second power plane voltage.

19. The computing system of claim 1, wherein the controller operable to increase the first power plane voltage based upon the detected incidence of a computational error without a logically corresponding increase in the second power plane voltage comprises:
a controller operable to decrease the first power plane voltage based upon a detected incidence of a computational error occurring in the first subcircuit.

20. The computing system of claim 1, wherein the at least one synchronous circuit, the error detector, and the controller are formed on the integrated circuit chip.

21. The computing system of claim 1, further comprising:
a recovery module operable to cause a correction of the computational error.

22. The computing system of claim 1, further comprising:
a power supply operable to provide a selected one of at least two voltages to the first power plane in response to the controller.

23. The computing system of claim 22, wherein the power supply operable to provide a selected one of at least two voltages to the first power plane in response to the controller comprises:
a power supply operable to provide in response to the controller a selected voltage to the first power plane and another selected voltage to the second power plane.

24. The computing system of claim 22, wherein the power supply operable to provide a selected one of at least two voltages to the first power plane in response to the controller comprises:
a power supply, which is on the integrated circuit chip, operable to provide a selected one of at least two voltages to the first power plane in response to the controller.

25. The computing system of claim 22, wherein the power supply operable to provide a selected one of at least two voltages to the first power plane in response to the controller comprises:
a power supply, which is off the integrated circuit chip and electrically coupled with the integrated circuit chip, operable to provide a selected one of at least two voltages to the first power plane in response to the controller.

26. The computing system of claim 22, wherein the power supply operable to provide a selected one of at least two voltages to the first power plane in response to the controller comprises:
at least one of a DC/DC regulated, a controllable, or a programmable power supply operable to provide a selected one of at least two voltages to the first power plane in response to the controller.

27. The computing system of claim 1, further comprising:
a power supply configured to electrically engage a portable power source and operable to provide a selected one of at least two voltages to the first power plane in response to the controller.

28. A method implemented in a computing system, the method comprising:
detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage; and
increasing the first power plane voltage based upon the detected computational error without a logically corresponding increase in the second power plane voltage.

29. The method of claim 28, wherein the detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
detecting a computational error occurring in a first processor core of a synchronous processor of an integrated circuit chip, the synchronous processor including (i) the first processor core powered by a first power plane at a first power plane voltage and (ii) a second processor core powered by a second power plane at a second power plane voltage.

30. The method of claim 28, wherein the detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
detecting a computational error occurring in a first subcircuit of a synchronous uniprocessor of an integrated circuit chip, the synchronous uniprocessor including (i) the first subcircuit powered by a first power plane at a first power plane voltage and (ii) a second subcircuit powered by a second power plane at a second power plane voltage.

31. The method of claim 28, wherein the increasing the first power plane voltage based upon the detected computational error without a logically corresponding increase in the second power plane voltage comprises:
increasing the first power plane voltage based upon the detected computational error while maintaining the second power plane voltage at least substantially constant.

32. The method of claim 28, wherein the increasing the first power plane voltage based upon the detected computational error without a logically corresponding increase in the second power plane voltage comprises:
increasing the first power plane voltage based upon the detected computational error without a logically corresponding change in the second power plane voltage.

33. The method of claim 28, further comprising:
operating the first subcircuit at a first power plane voltage.

34. The method of claim 33, wherein the operating the first subcircuit at a first power plane voltage comprises:
operating the first subcircuit at an initial first power plane voltage.

35. The method of claim 28, further comprising:
decreasing the first power plane voltage.

36. The method of claim 28, wherein the detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
detecting a computational error occurring in a first arithmetic logic unit of a synchronous circuit of an integrated circuit chip, the synchronous circuit including (i) the first arithmetic logic unit powered by a first power plane at a first power plane voltage and (ii) a second arithmetic logic unit powered by a second power plane at a second power plane voltage.

37. The method of claim 28, wherein the detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
detecting a computational error occurring in an arithmetic logic unit of a synchronous circuit of an integrated circuit chip, the synchronous circuit including (i) the arithmetic logic unit powered by a first power plane at a first power plane voltage and (ii) a cache powered by a second power plane at a second power plane voltage.

38. A computing device comprising:
means for detecting, at least partially by executing a process, a computational error occurring in a first subcircuit of a synchronous circuit that includes the first subcircuit powered by a first power plane at a first power plane voltage and a second subcircuit powered by a second power plane at a second power plane voltage, wherein the means for detecting is capable of detecting computational errors that correspond to a setup/hold violation, a noise spike, a charged particle, a single event upset failure, an unreliable processor hardware, an incorrectly executed instruction, an oxide breakdown, and an electromigration induced error; and
means for increasing the first power plane voltage based upon the detected computational error.

39. The computing device of claim 38, further comprising:
means for operating the first subcircuit at an initial first power plane voltage.

40. The computing device of claim 38, further comprising:
means for decreasing the first power plane voltage.

41. A computing device comprising:
means for detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage; and
means for increasing the first power plane voltage based upon the detected computational error without a logically corresponding increase in the second power plane voltage.

42. The computing device of claim 41, wherein the means for detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
means for detecting a computational error occurring in a first arithmetic logic unit of a synchronous circuit of an integrated circuit chip, the synchronous circuit including (i) the first arithmetic logic unit powered by a first power plane at a first power plane voltage and (ii) a second arithmetic logic unit powered by a second power plane at a second power plane voltage.

43. The computing device of claim 41, wherein the means for detecting, at least partially by executing a process, a computational error occurring in a first subcircuit of a synchronous circuit of an integrated circuit chip, the synchronous circuit including (i) the first subcircuit powered by a first power plane at a first power plane voltage and (ii) a second subcircuit powered by a second power plane at a second power plane voltage, comprises:
means for detecting a computational error occurring in an arithmetic logic unit of a synchronous circuit of an integrated circuit chip, the synchronous circuit including (i) the arithmetic logic unit powered by a first power plane at a first power plane voltage and (ii) a cache powered by a second power plane at a second power plane voltage.

44. A method implemented in a computing system, the method comprising:
detecting, at least partially by executing a process, a computational error occurring in a first subcircuit of a synchronous circuit that includes the first subcircuit powered by a first power plane at a first power plane voltage and a second subcircuit powered by a second power plane at a second power plane voltage, wherein the detecting is capable of detecting computational errors that correspond to a setup/hold violation, a noise spike, a charged particle, a single event upset failure, an unreliable processor hardware, an incorrectly executed instruction, an oxide breakdown, and an electromigration induced error; and
increasing the first power plane voltage based upon the detected computational error.

45. A computing system comprising:
a synchronous circuit including a first subcircuit powered by a first power plane at a first power plane voltage and a second subcircuit powered by a second power plane at a second power plane voltage;
an error detector operable to execute a process to detect a computational error occurring in the first subcircuit of the synchronous circuit, wherein the error detector is capable of detecting computational errors that correspond to a setup/hold violation, a noise spike, a charged particle, a single event upset failure, an unreliable processor hardware, an incorrectly executed instruction, an oxide breakdown, and an electromigration induced error; and
a controller operable to increase the first power plane voltage based upon the detected computational error.

* * * * *

UNITED STATES PATENT AND TRADEMARK OFFICE
CERTIFICATE OF CORRECTION

| | |
|---|---|
| PATENT NO. | : 8,516,300 B2 |
| APPLICATION NO. | : 12/321027 |
| DATED | : August 20, 2013 |
| INVENTOR(S) | : William Henry Mangione-Smith |

It is certified that error appears in the above-identified patent and that said Letters Patent is hereby corrected as shown below:

On the title page, item (54) and in the specification, column 1, the title is incorrect delete text "Multi-Votage" and replace with --Multi-Voltage--

In the Claims

In Column 47, Line 67, Claim 9 delete text "sub circuit" and replace with --subcircuit--

Signed and Sealed this
Twenty-second Day of October, 2013

Teresa Stanek Rea
*Deputy Director of the United States Patent and Trademark Office*